(12) United States Patent
Snyder et al.

(10) Patent No.: US 11,694,119 B1
(45) Date of Patent: Jul. 4, 2023

(54) MULTIDIMENSIONAL MACHINE LEARNING DATA AND USER INTERFACE SEGMENT TAGGING ENGINE APPARATUSES, METHODS AND SYSTEMS

(71) Applicant: Momentum NA, Inc., New York, NY (US)

(72) Inventors: Jason Alan Snyder, Ridgewood, NJ (US); Manuel De Araujo Pedreira Neto, New York, NY (US); Elena Klau Silverman, New York, NY (US); Stephen Michael Gorman, Hastings on Hudson, NY (US); Michael Clark, Saint Charles, MO (US)

(73) Assignee: Momentum NA, INC., New York, NY (US)

( * ) Notice: Subject to any disclaimer, the term of this patent is extended or adjusted under 35 U.S.C. 154(b) by 0 days.

(21) Appl. No.: 17/111,475

(22) Filed: Dec. 3, 2020

Related U.S. Application Data

(63) Continuation-in-part of application No. 16/221,437, filed on Dec. 14, 2018.
(Continued)

(51) Int. Cl.
*G06N 20/00* (2019.01)
*G06F 16/835* (2019.01)
(Continued)

(52) U.S. Cl.
CPC ........... *G06N 20/00* (2019.01); *G06F 16/835* (2019.01); *G06F 16/838* (2019.01); *G06Q 30/0203* (2013.01); *G06F 3/04842* (2013.01)

(58) Field of Classification Search
CPC ..... G06N 20/00; G06F 16/835; G06F 16/838; G06F 3/04842; G06Q 30/0203
(Continued)

(56) References Cited

U.S. PATENT DOCUMENTS

2019/0172045 A1   6/2019   Dunjic

FOREIGN PATENT DOCUMENTS

WO   2007143020   12/2007
WO   WO-2007143020 A2 *  12/2007   ............. G06Q 30/06

OTHER PUBLICATIONS

Jason Brownlee, Making Predictions with Sequences, 2017 (Year: 2017).*

(Continued)

*Primary Examiner* — Tarek Elchanti
(74) *Attorney, Agent, or Firm* — Hanchuk Kheit LLP; Walter G. Hanchuk

(57) ABSTRACT

The Multidimensional Machine Learning Data and User Interface Segment Tagging Engine Apparatuses, Methods and Systems ("MLUI") transforms ambient condition data, sales data, user interface selections, cognitive intelligence question input inputs via MLUI components into project projections, campaigns, user interface visualizations, cognitive intelligence question output outputs. A category identifier selection is obtained via a category selection interaction interface mechanism. Entity segment identifier selections are obtained via entity segment selection interaction interface mechanisms. A set of visualization cognitive intelligence (CI) datapoint identifiers is determined as CI datapoint identifiers associated with each combination of a selected entity segment identifier and the selected category identifier. CI datapoint values corresponding to the set of visualization CI datapoint identifiers are retrieved from a NoSQL database configured to act as cache for generating visualizations based on metrics calculated using survey data. A visualization is generated using the retrieved CI datapoint values.

13 Claims, 52 Drawing Sheets

Related U.S. Application Data

(60) Provisional application No. 62/598,847, filed on Dec. 14, 2017, provisional application No. 63/051,873, filed on Jul. 14, 2020.

(51) Int. Cl.
    *G06Q 30/02*     (2012.01)
    *G06F 16/838*     (2019.01)
    *G06F 3/04842*     (2022.01)
    *G06Q 30/0203*     (2023.01)

(58) Field of Classification Search
    USPC .......................................................... 706/11
    See application file for complete search history.

(56) References Cited

OTHER PUBLICATIONS

"Making Predictions with Sequence" Sep. 4, 2017, Jason Browniee, Long Short-Term Memory Networks.
Wai-xi Liu, Content Popularity Prediction and Caching for ICN: A deep Learning Approach with SDN, 2017.

\* cited by examiner

Fig.1: MLUI—screenshot

Fig.2: MLUI—screenshot
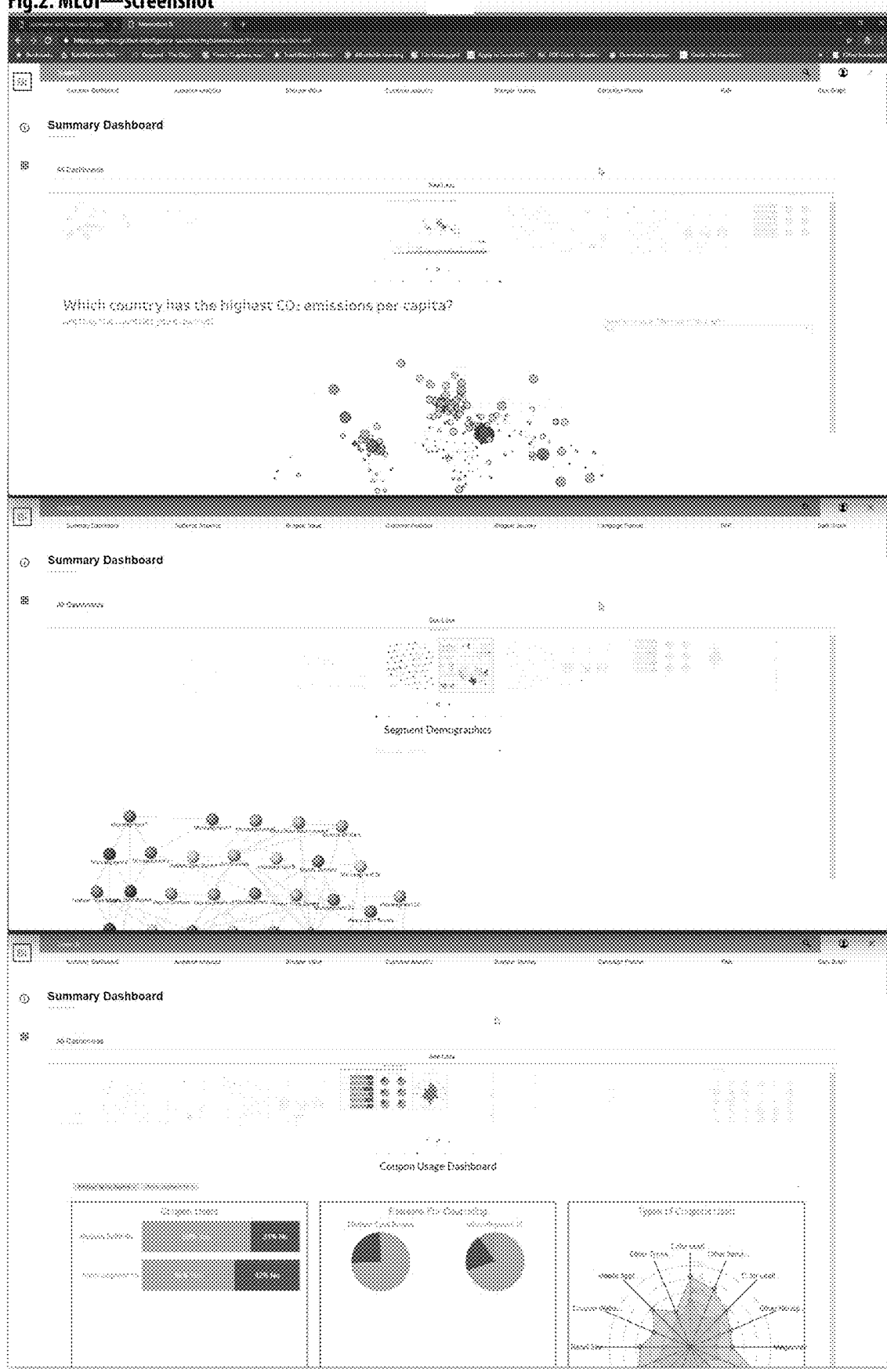

Fig.3: MLUI—screenshot
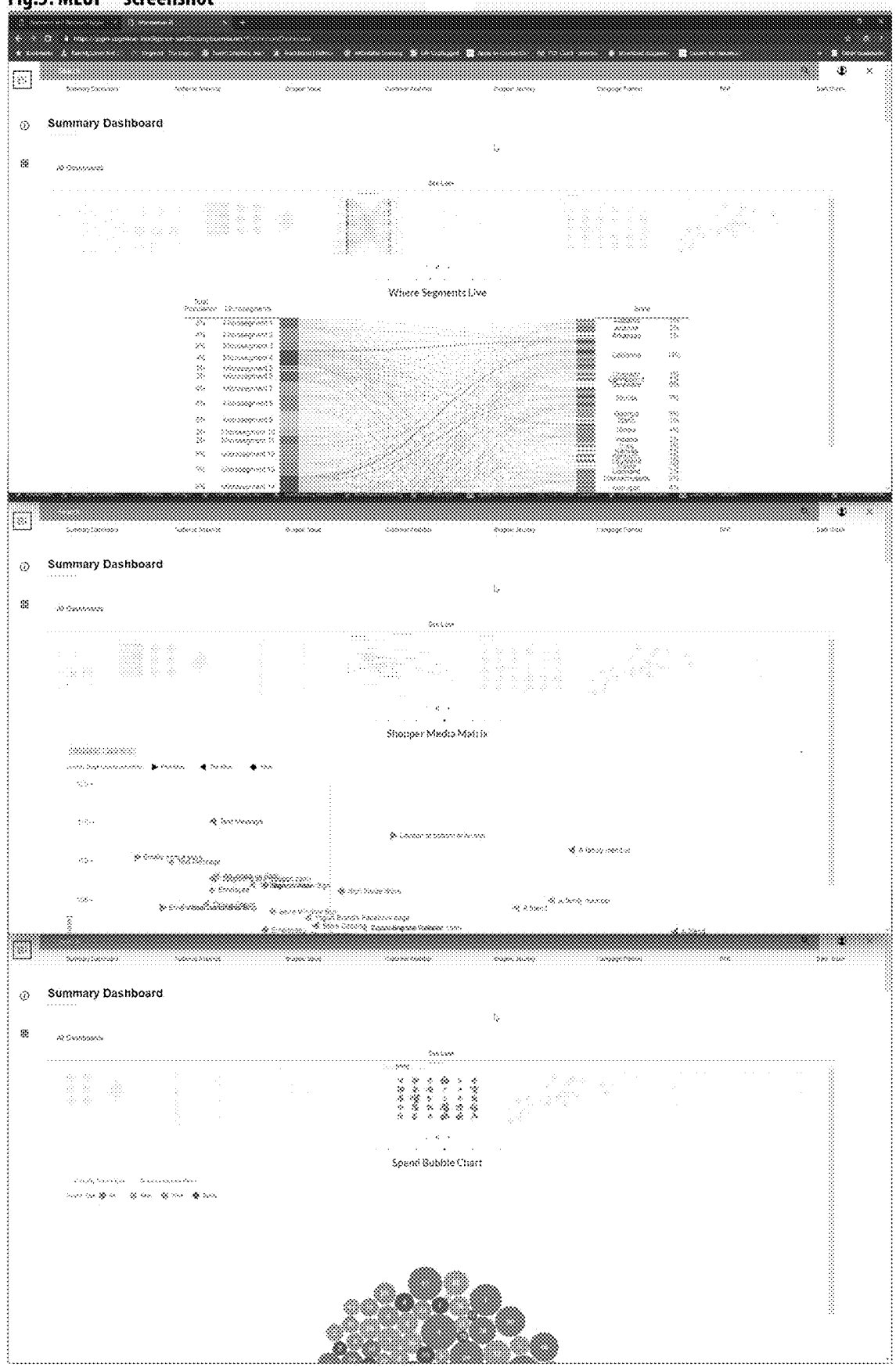

Fig.4: MLUI—screenshot
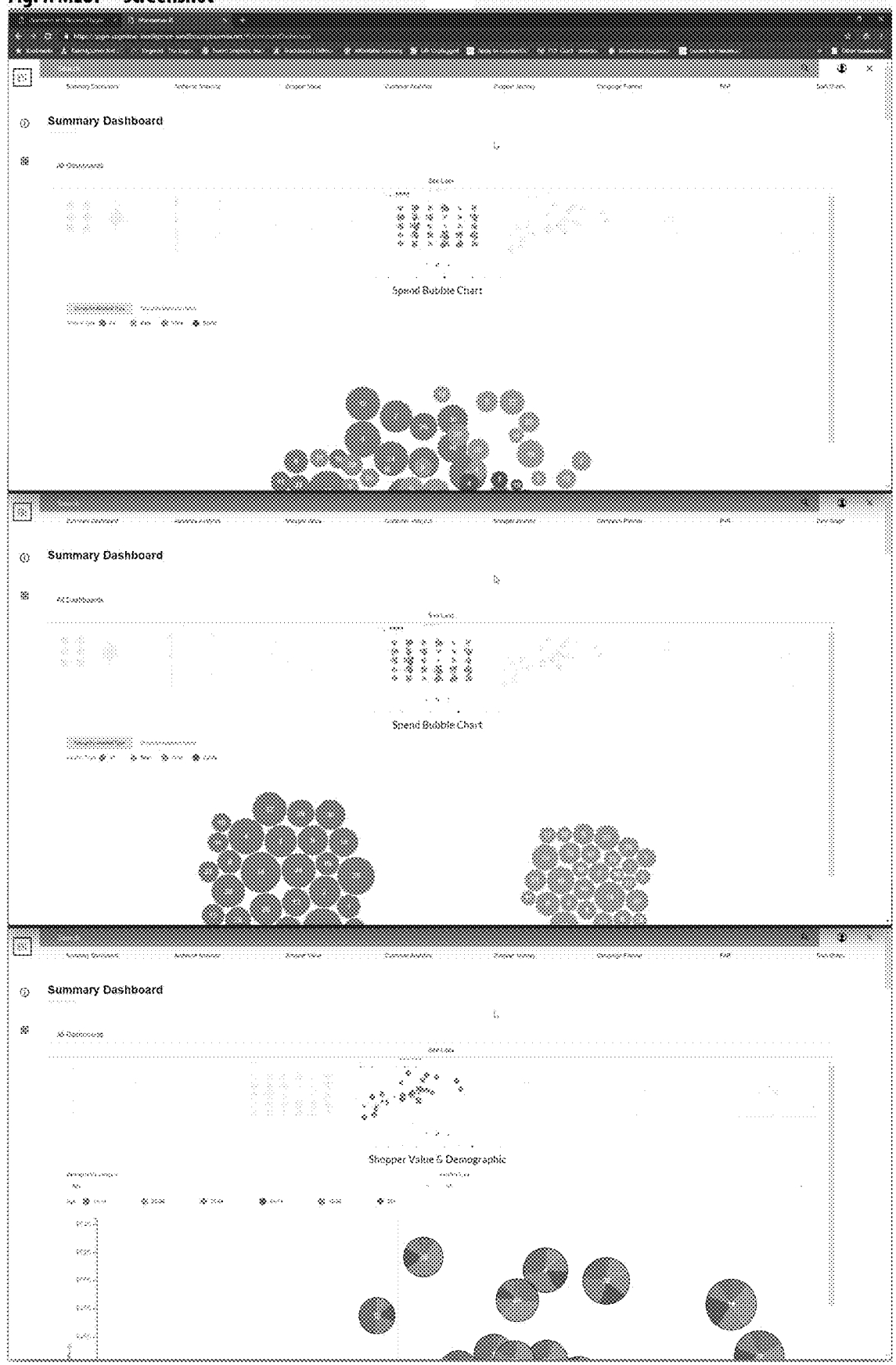

Fig.5: MLUI—screenshot
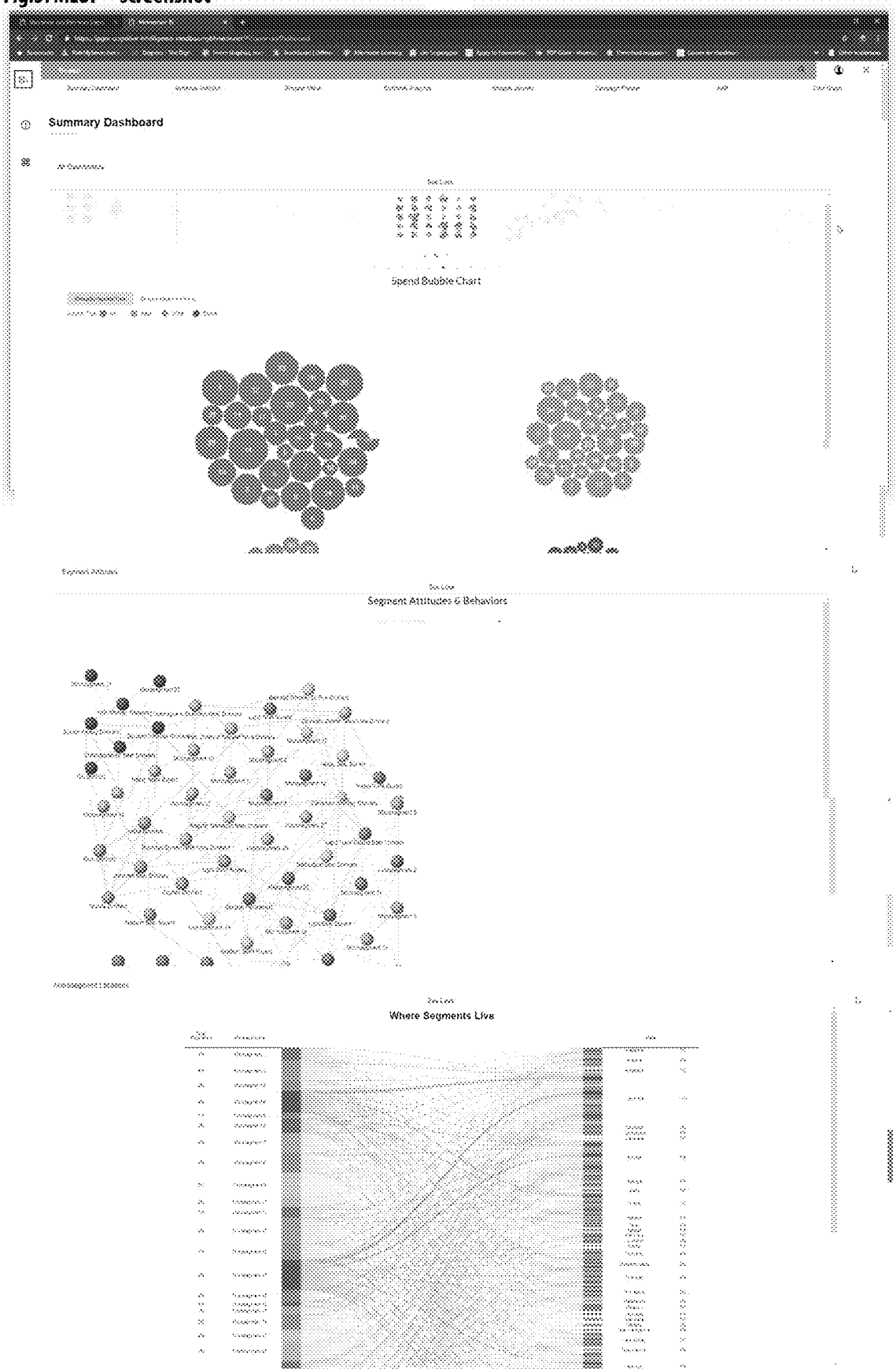

Fig.6: MLUI—screenshot
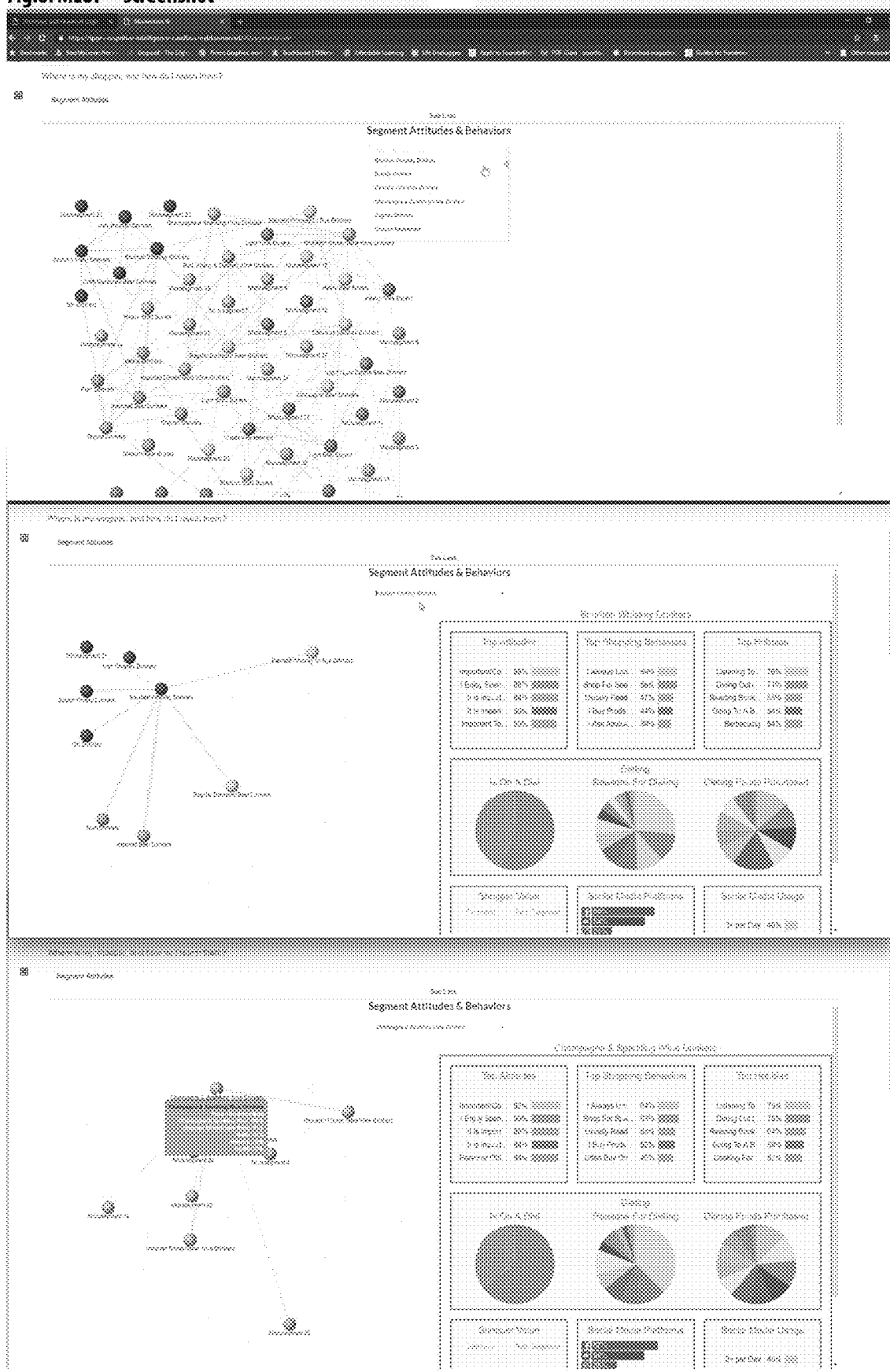

Fig.7: MLUI—screenshot
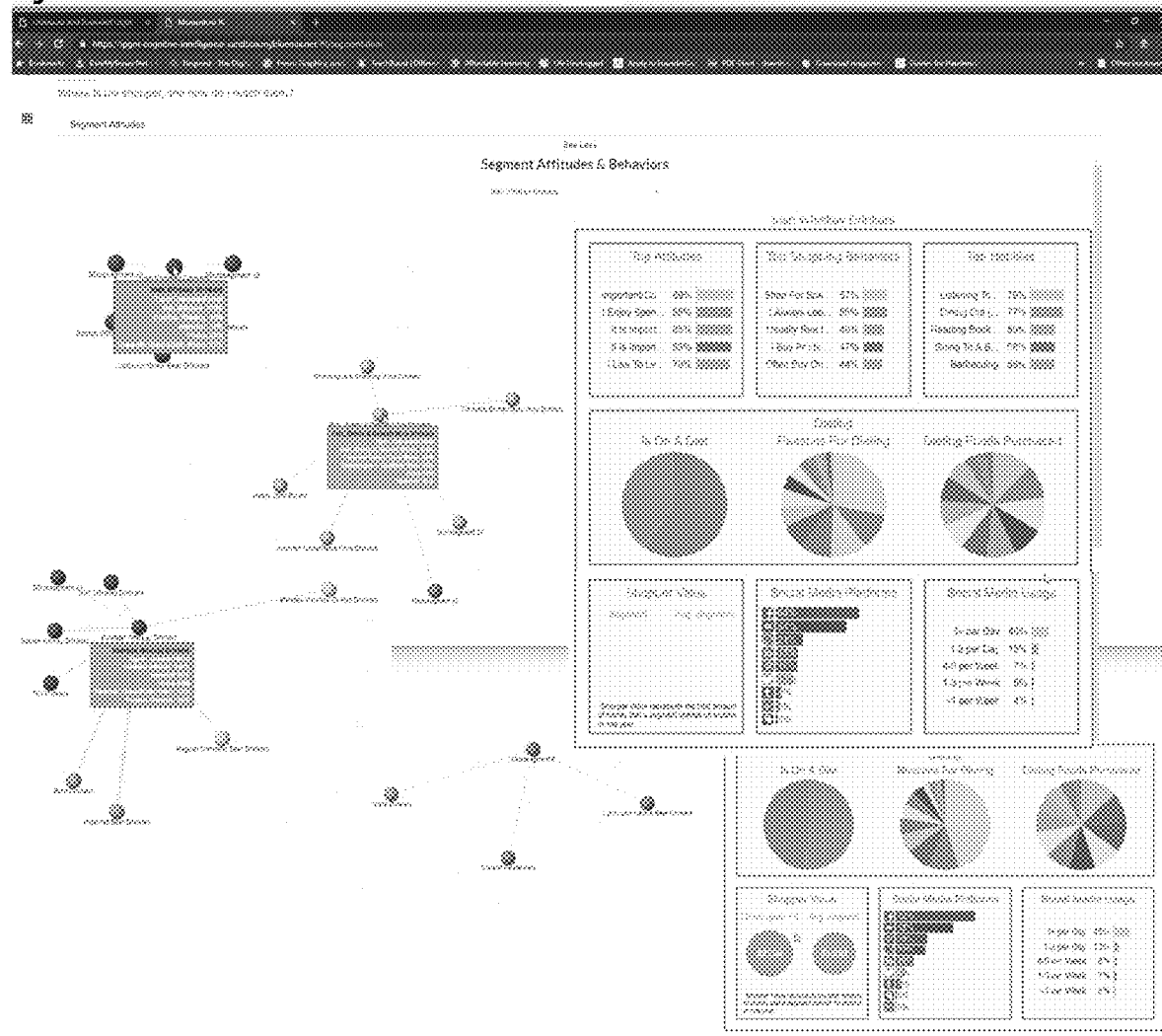

Fig.8: MLUI—screenshot
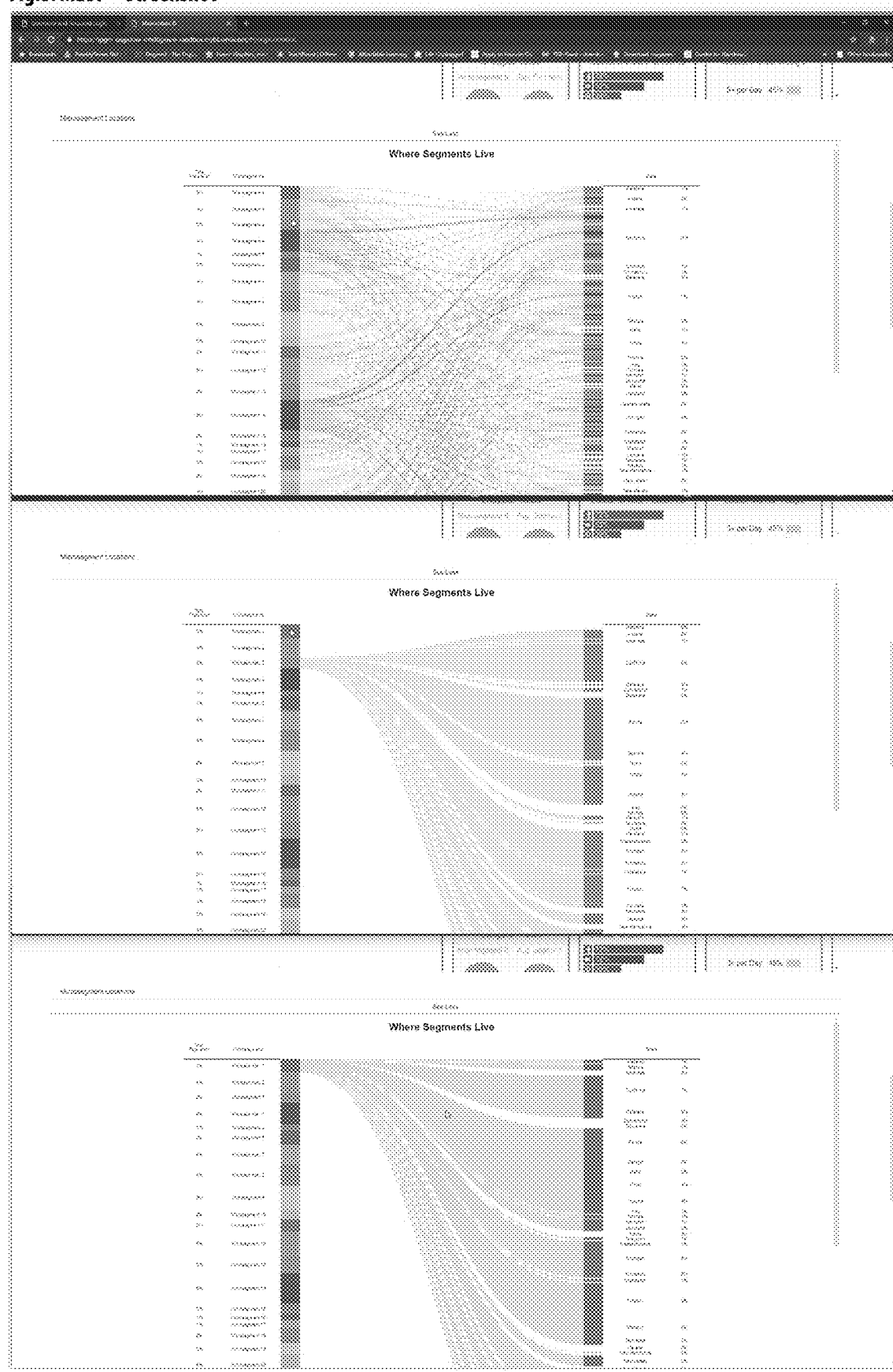

Fig.9: MLUI—screenshot
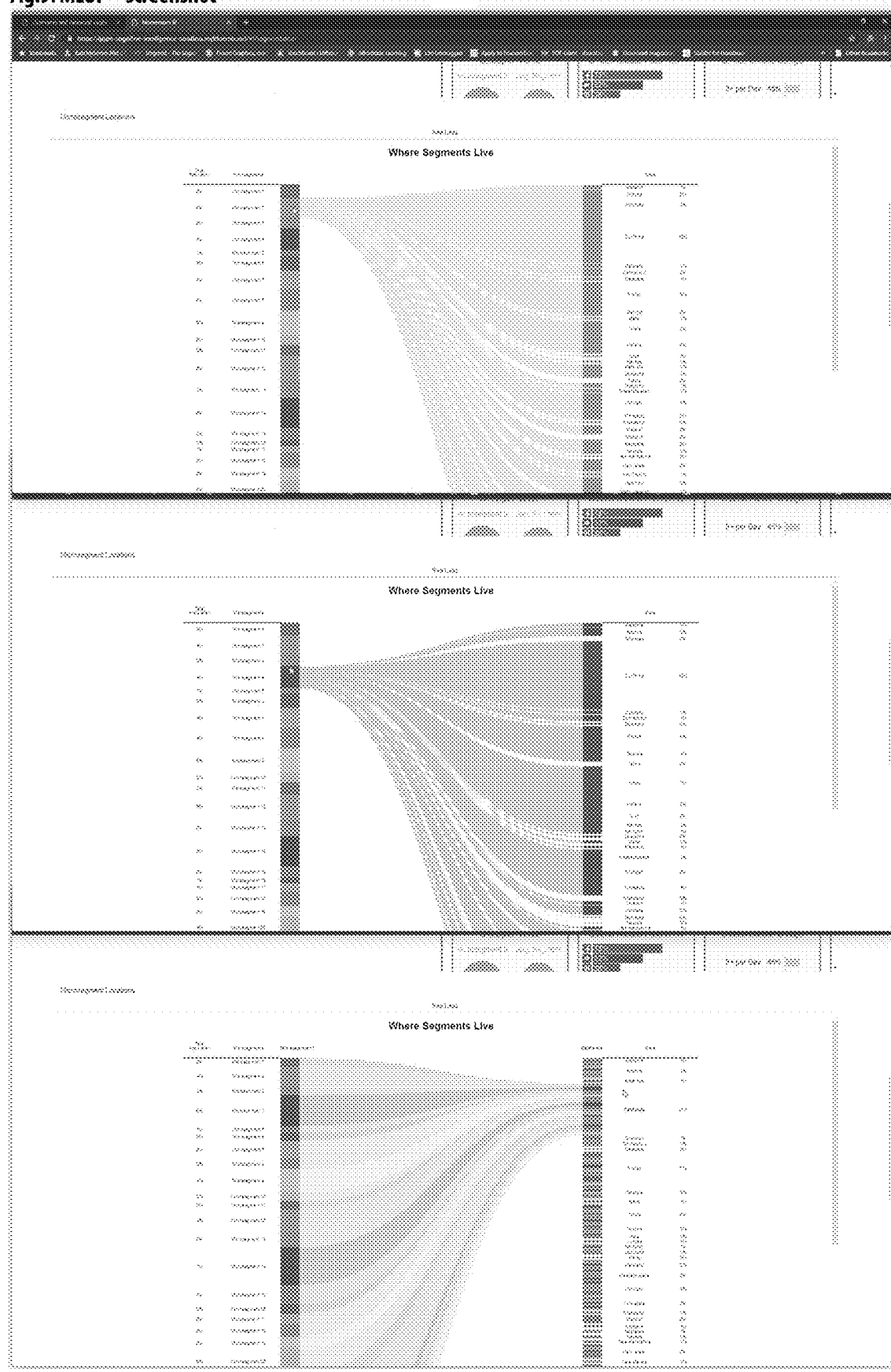

Fig.10: MLUI—screenshot
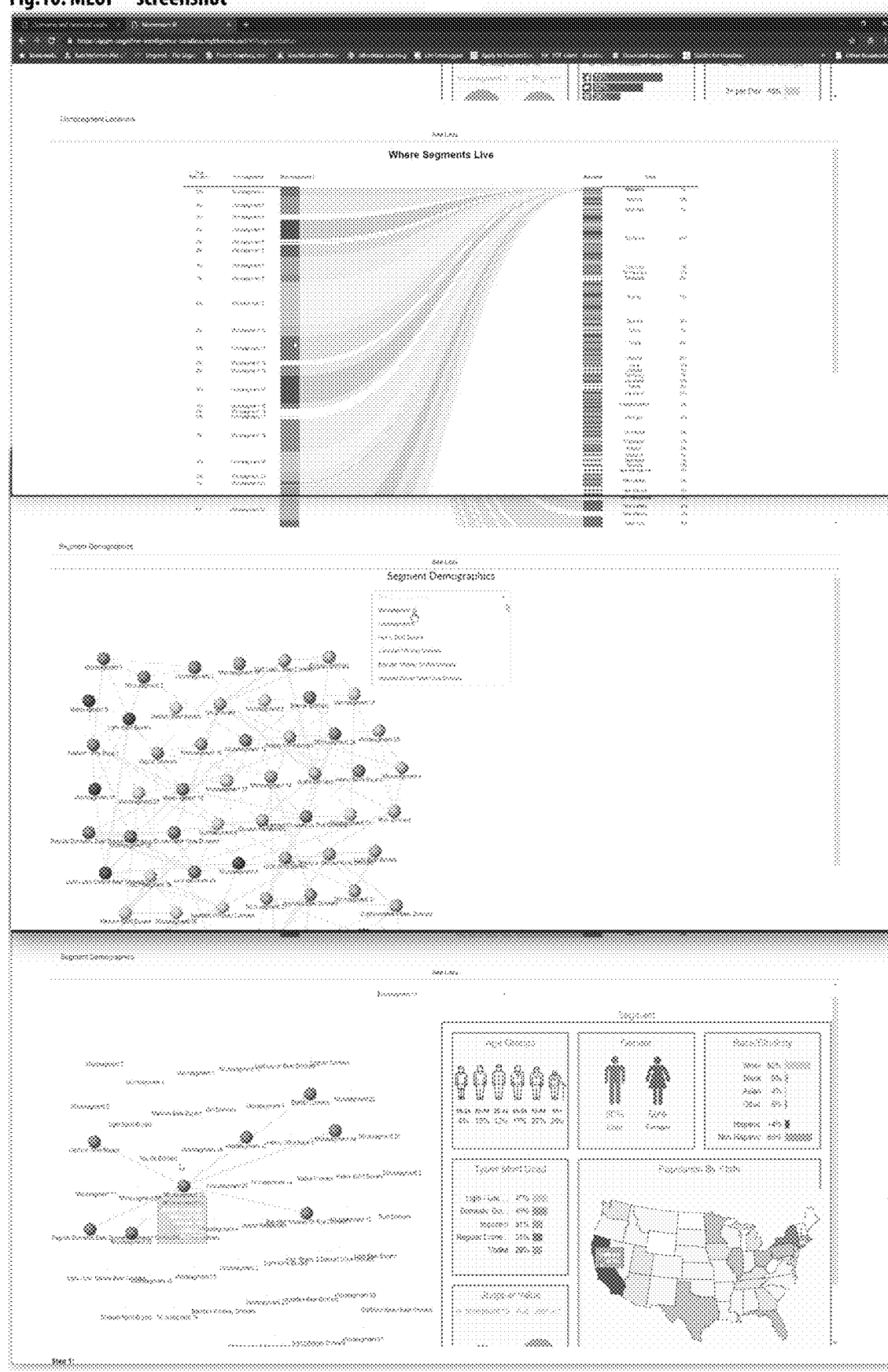

Fig.11: MLUI—screenshot
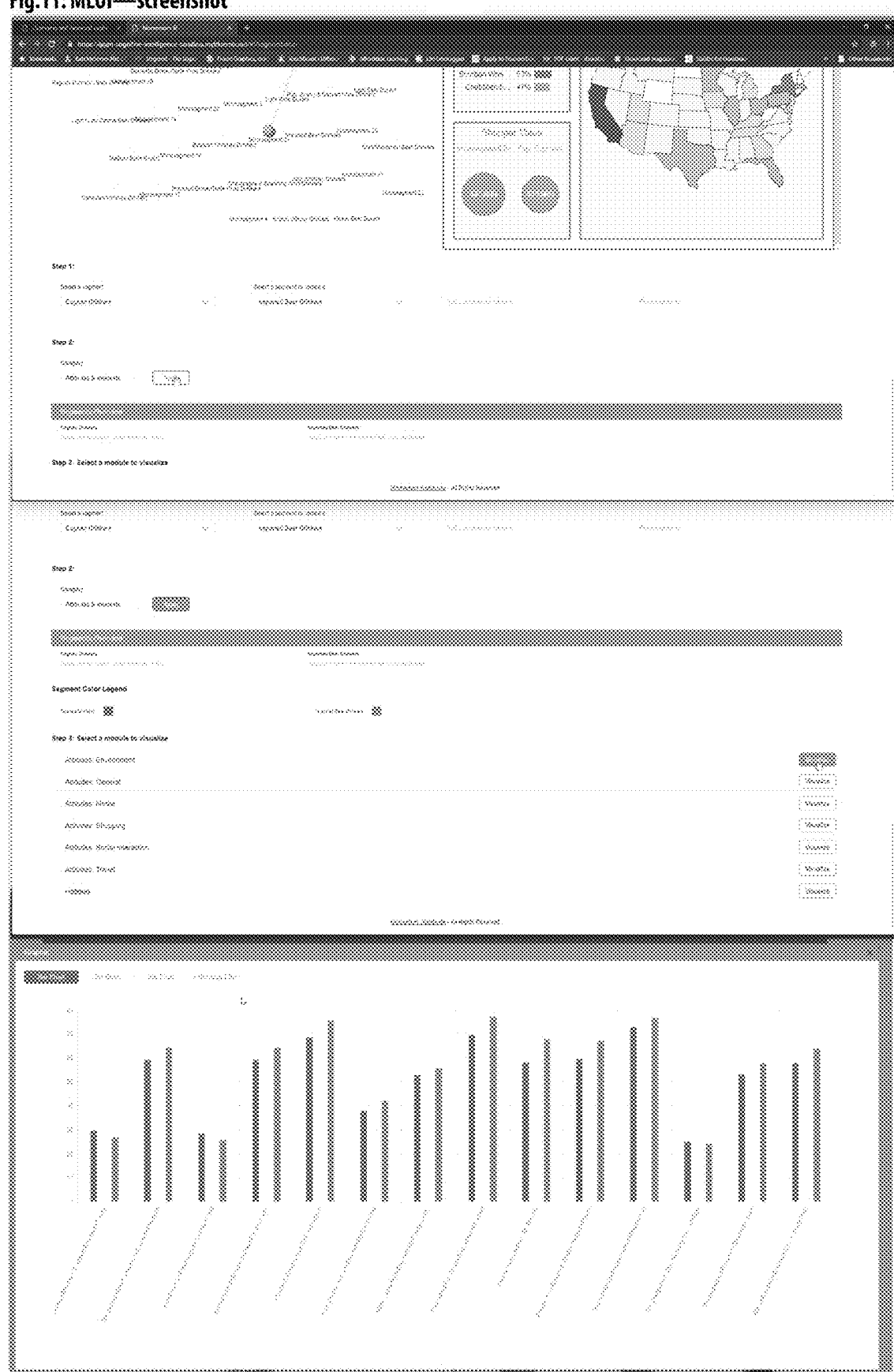

Fig.12: MLUI—screenshot
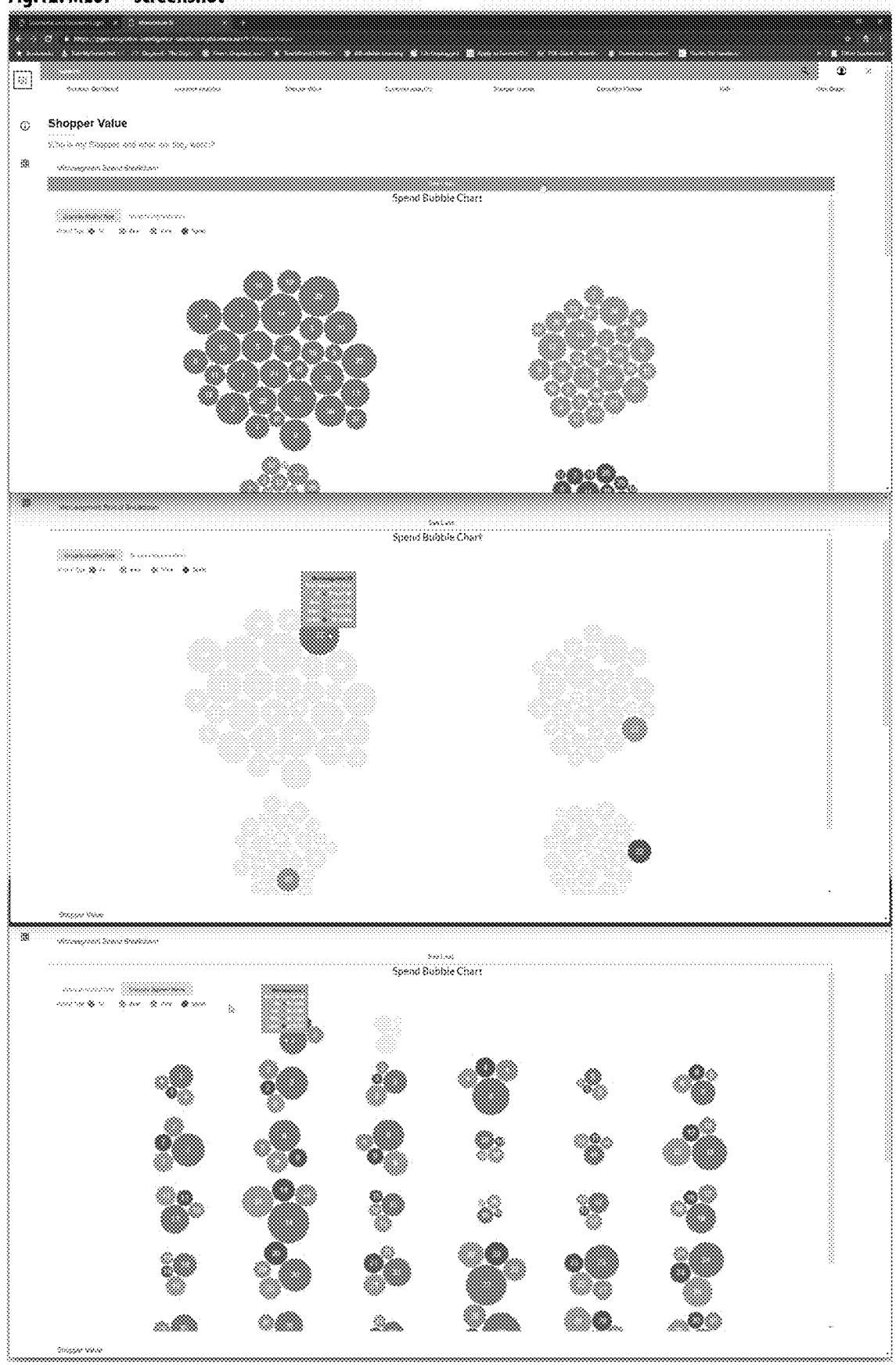

Fig.13: MLUI—screenshot
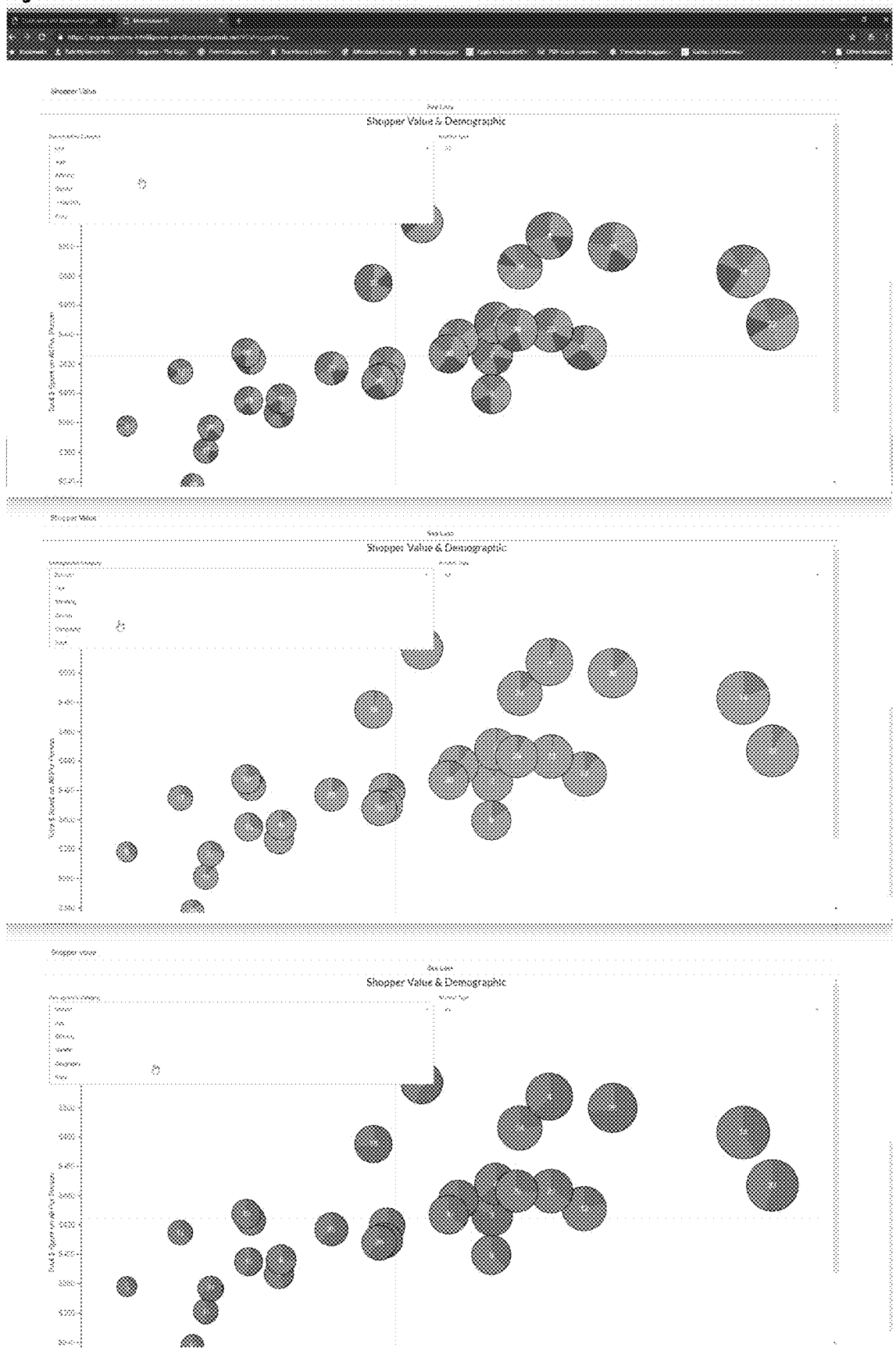

Fig.14: MLUI—screenshot
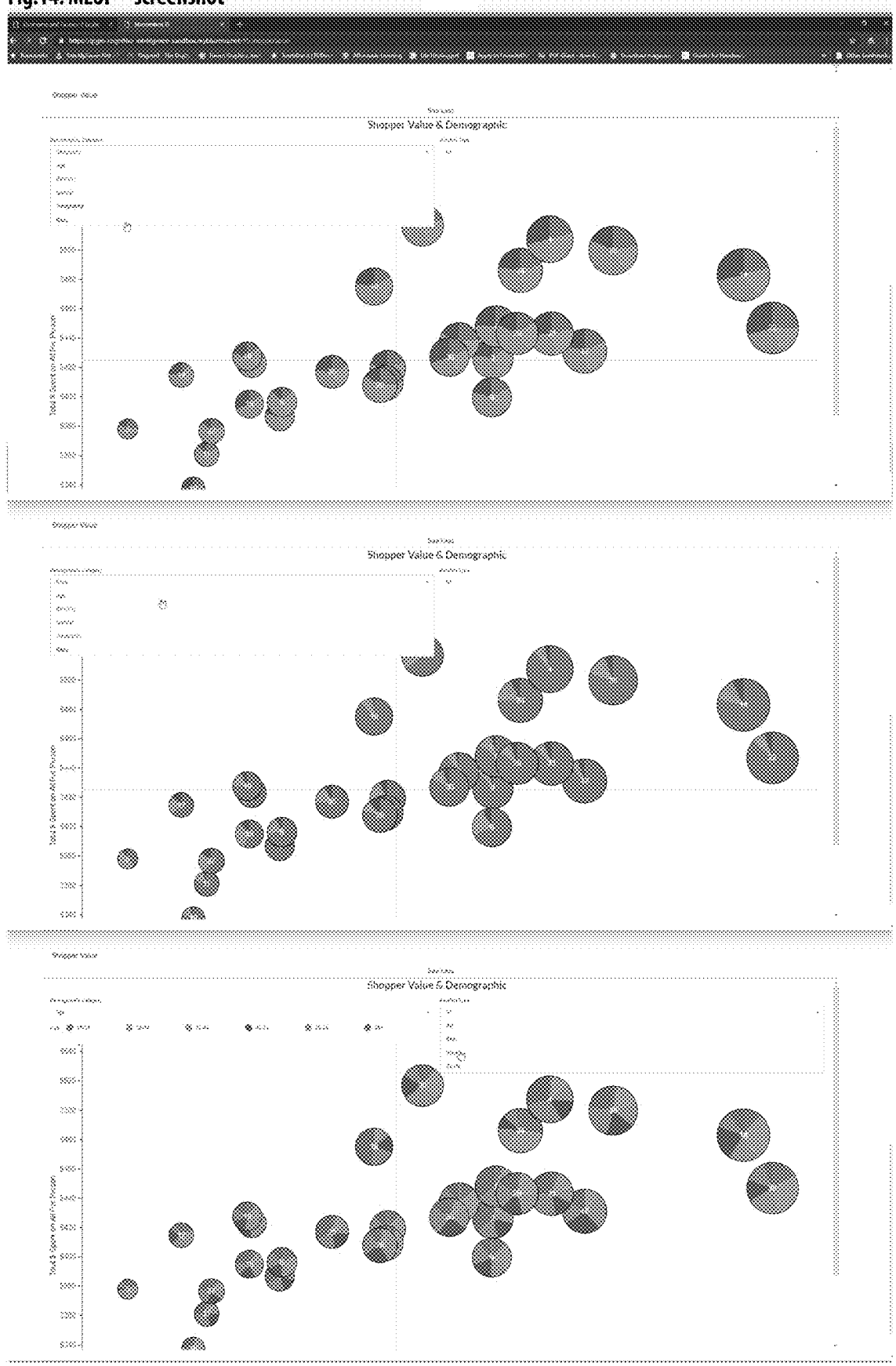

Fig.15: MLUI—screenshot
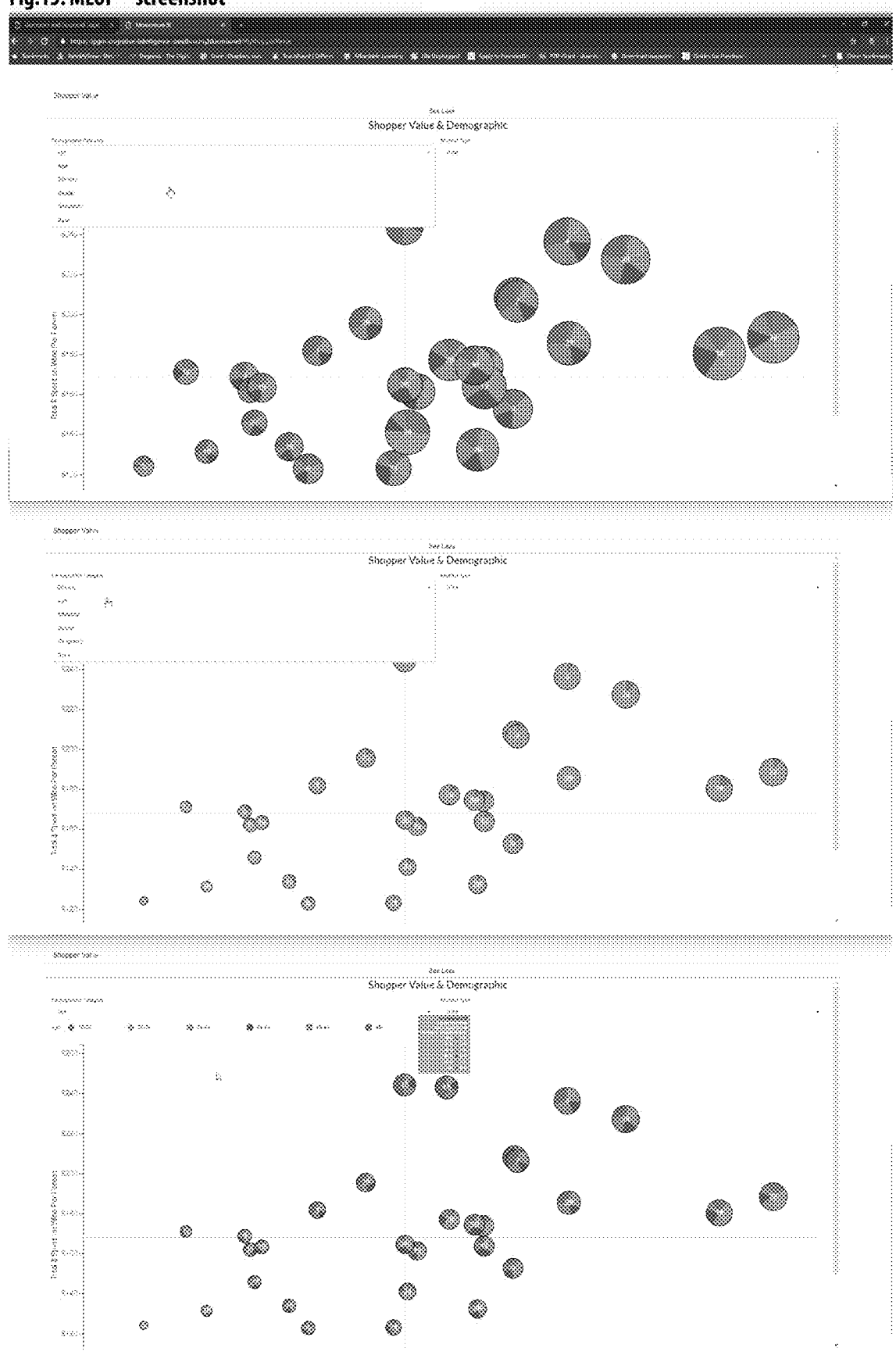

Fig.16: MLUI—screenshot
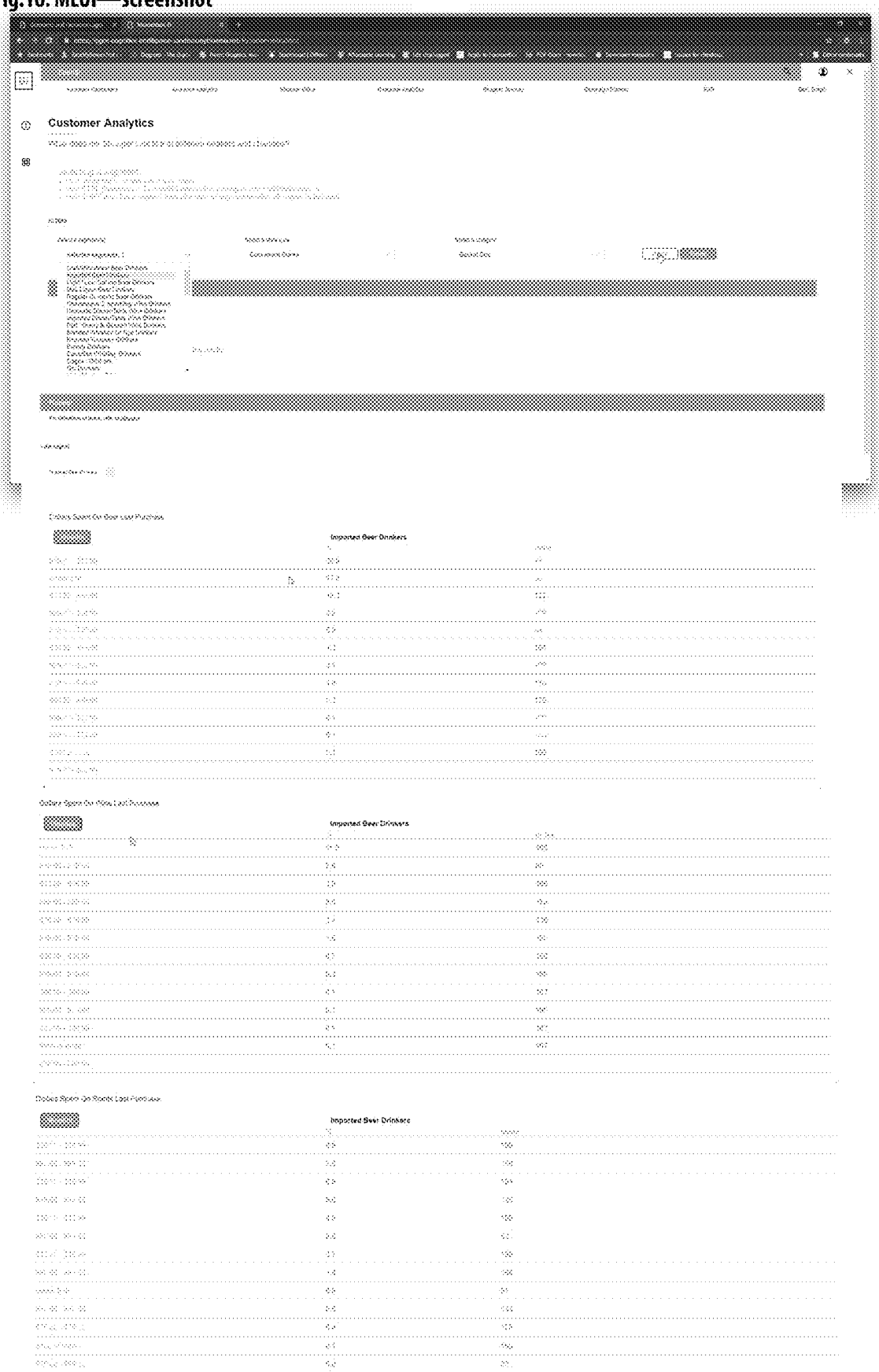

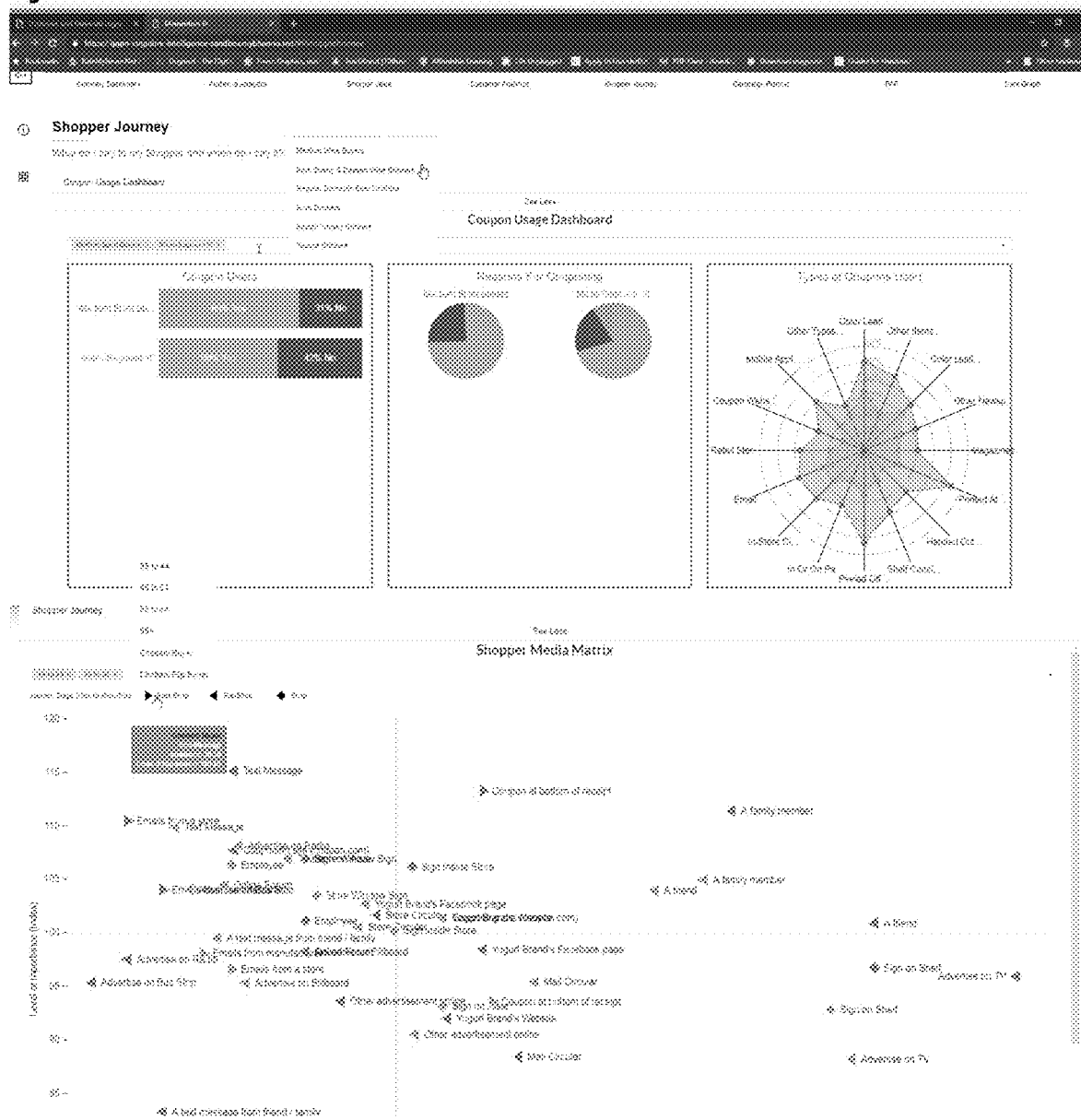
Fig. 17: MLUI—screenshot

Fig.18: MLUI—screenshot
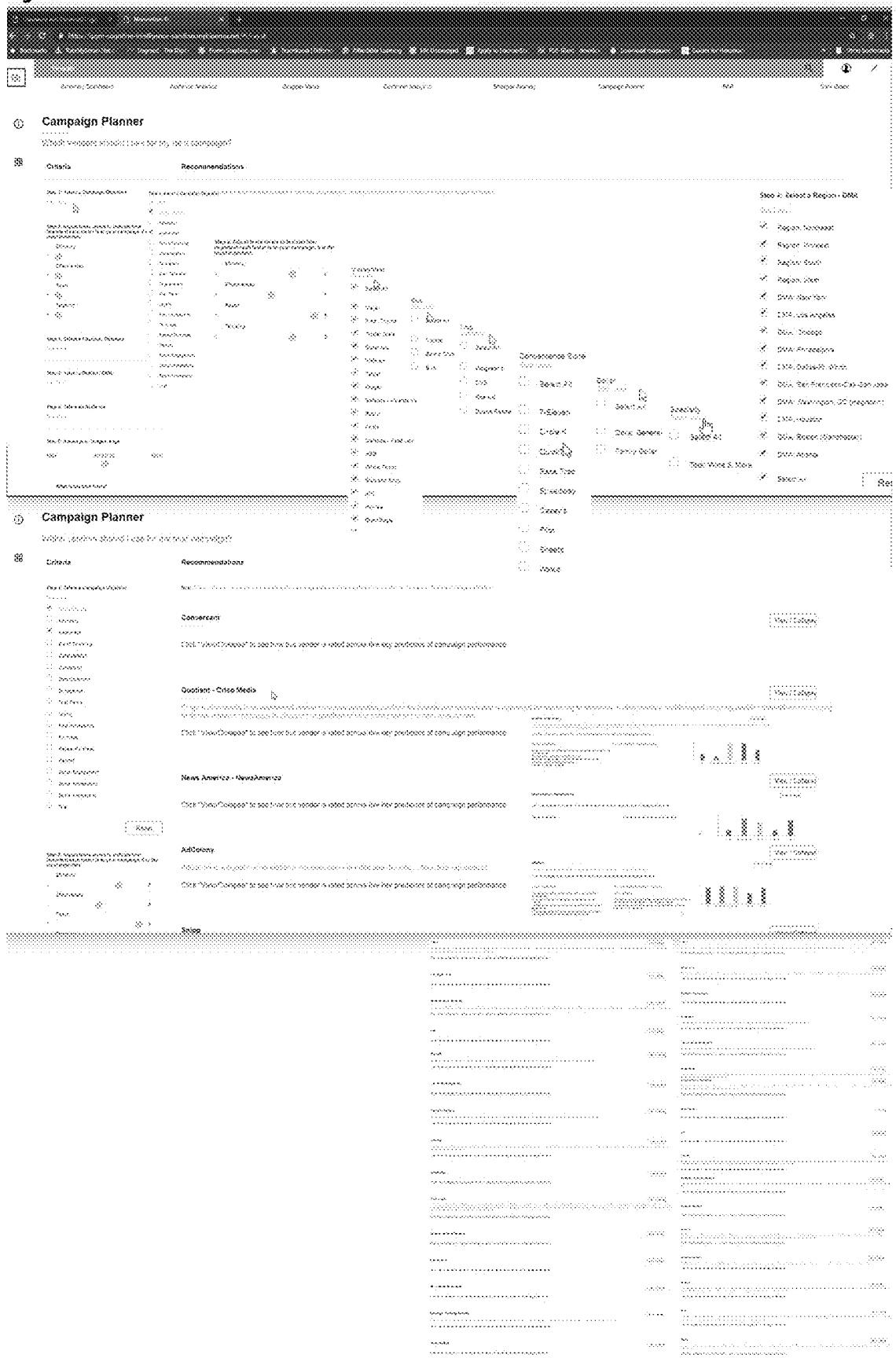

Fig.19: MLUI—screenshot
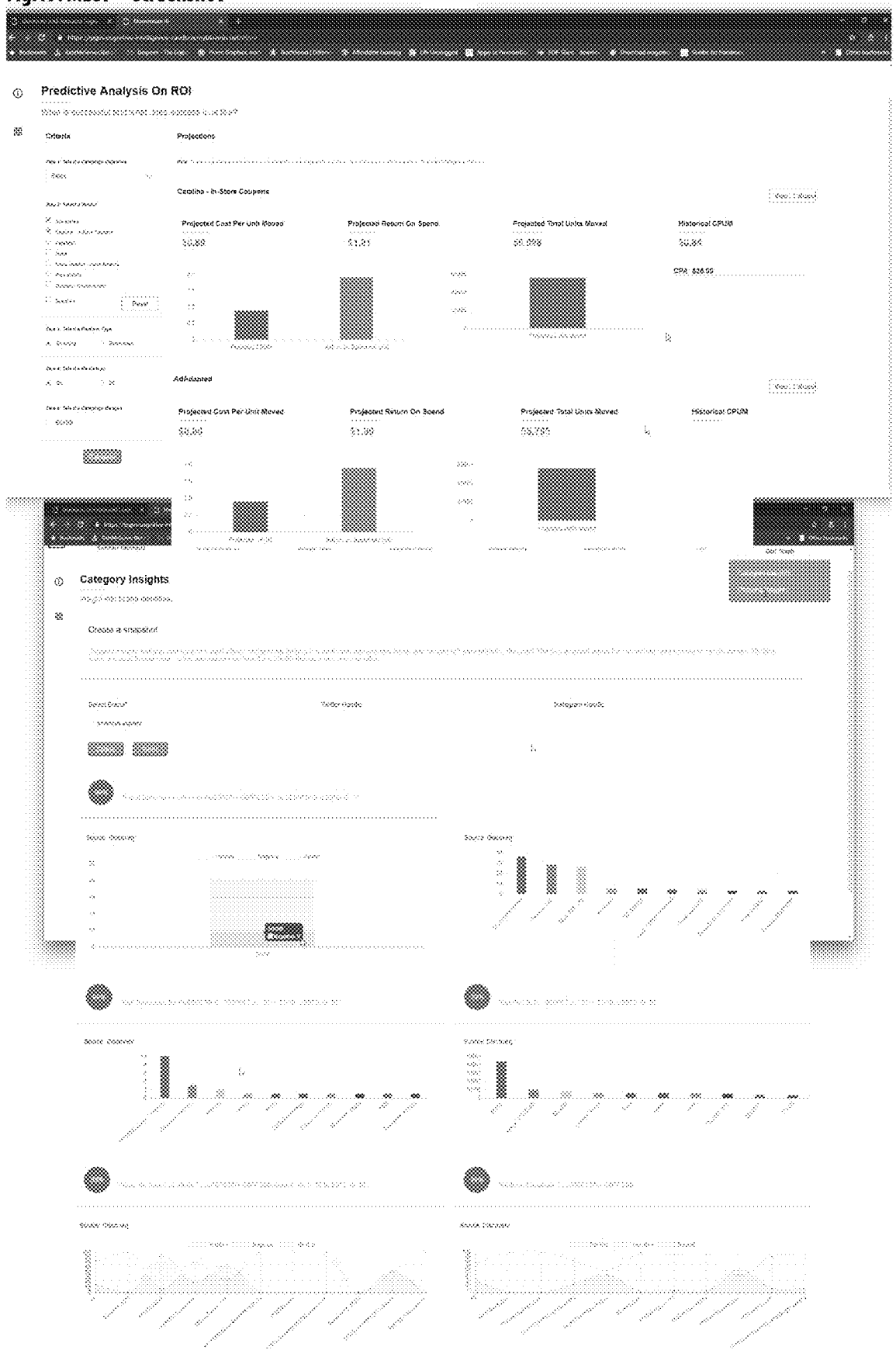

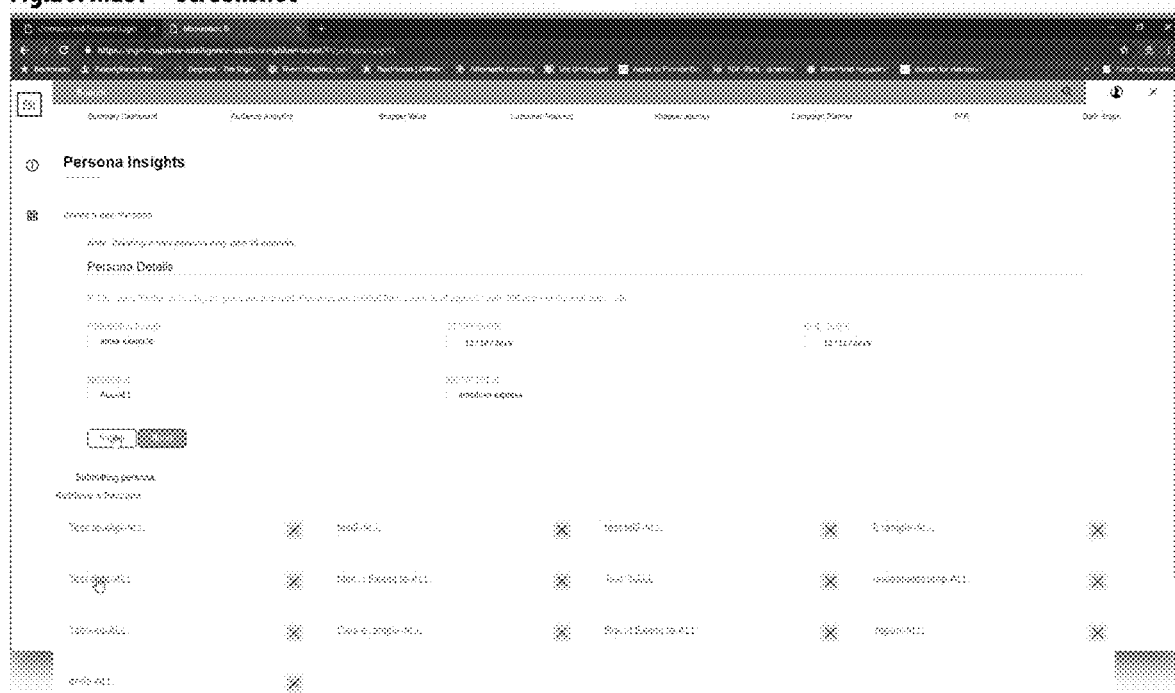
Fig.20: MLUI—screenshot

Fig.21: MLUI—screenshot 2
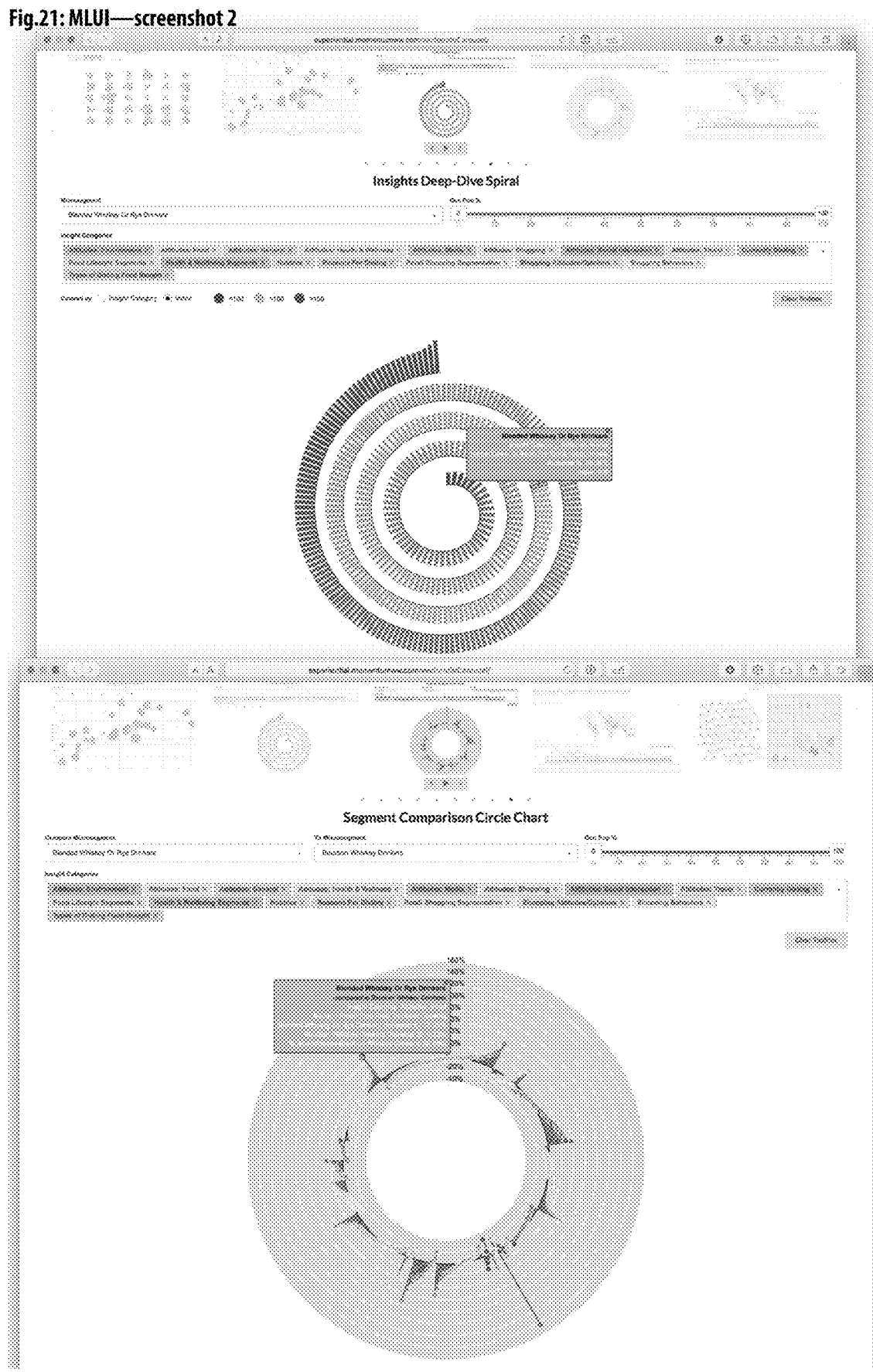

Fig.22: MLUI—screenshot 3
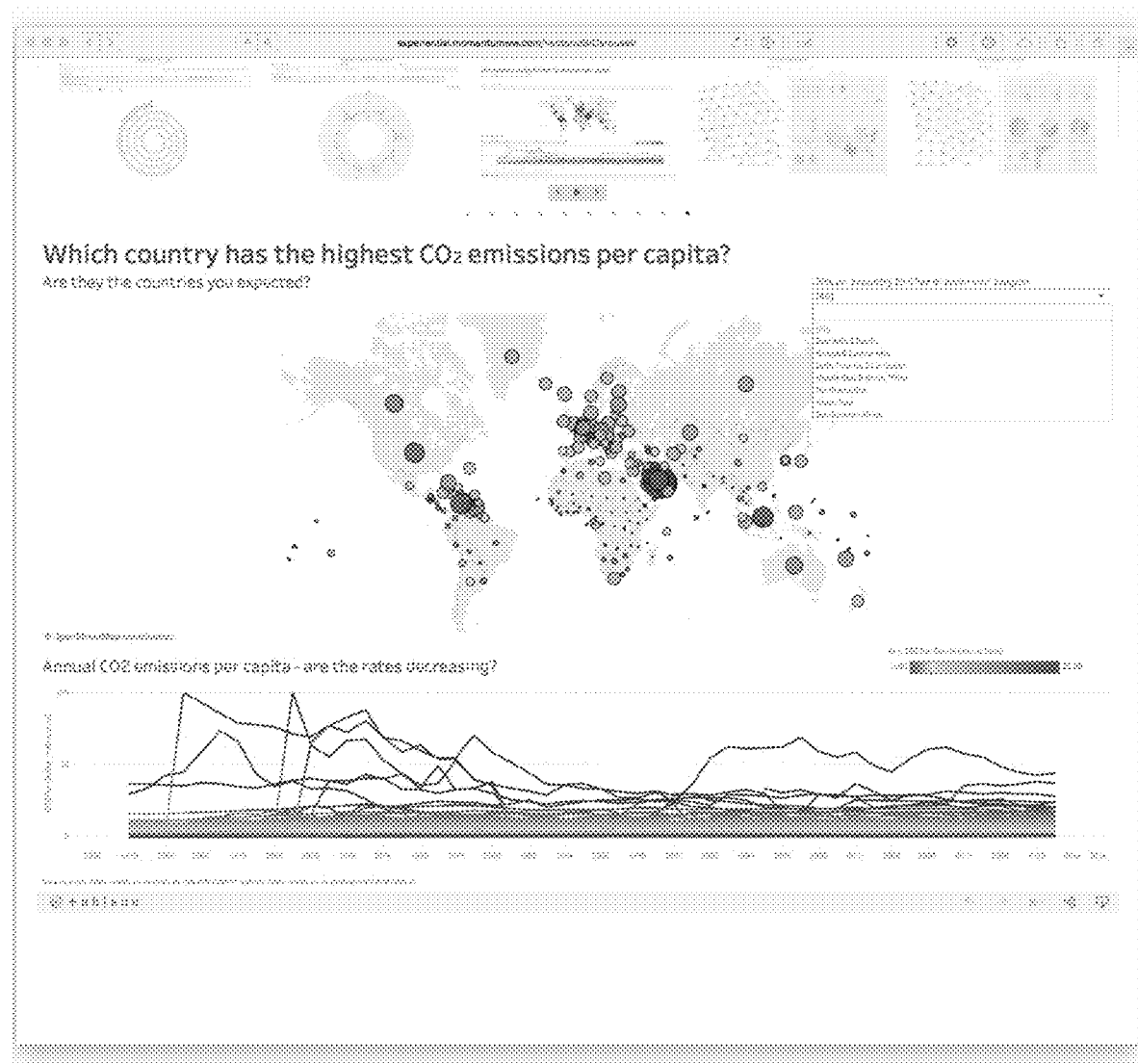

Fig.23: MLUI—screenshot 2.0 audiance analytics
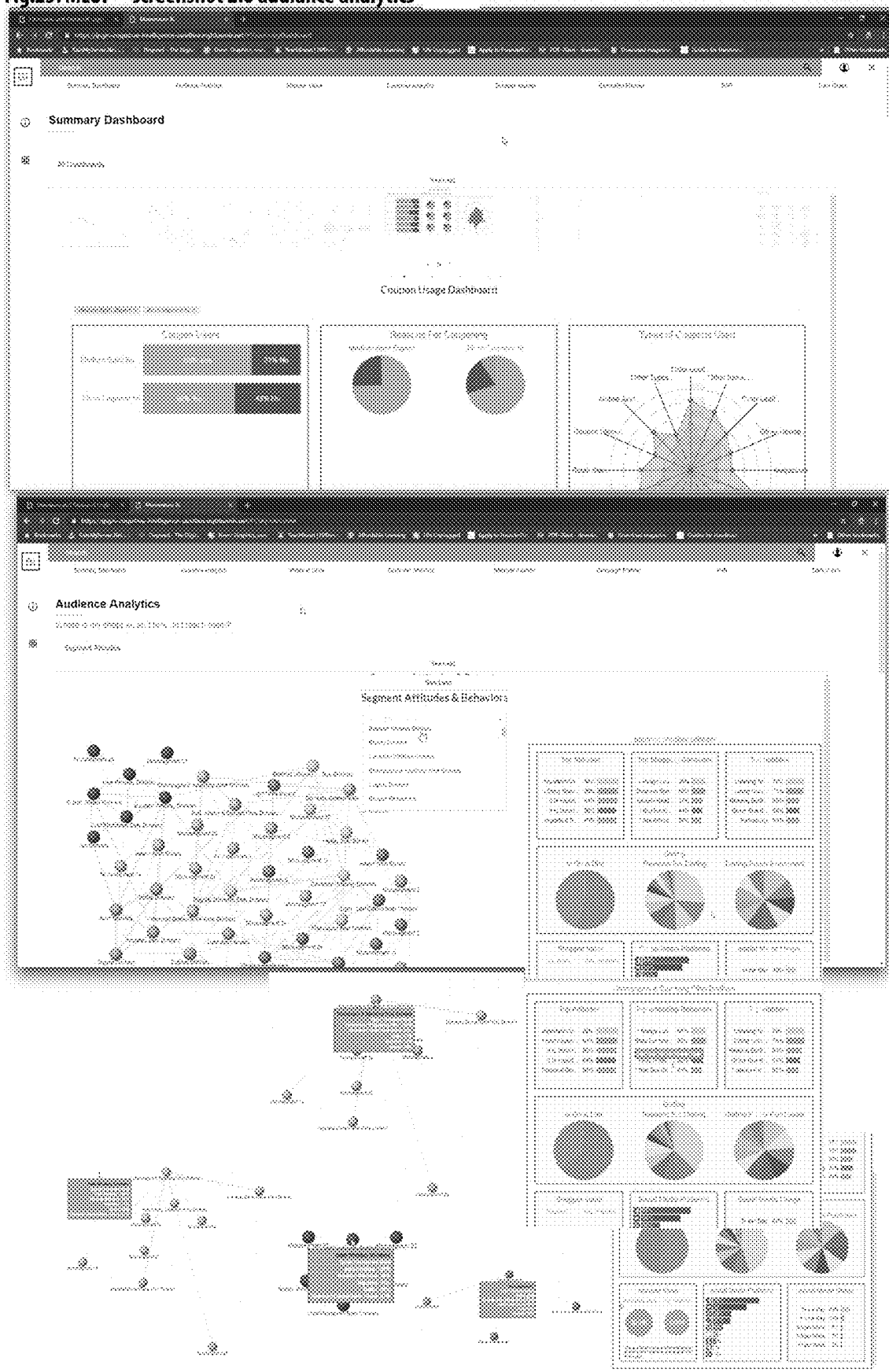

Fig.24: MLUI—screenshot audiance analytics
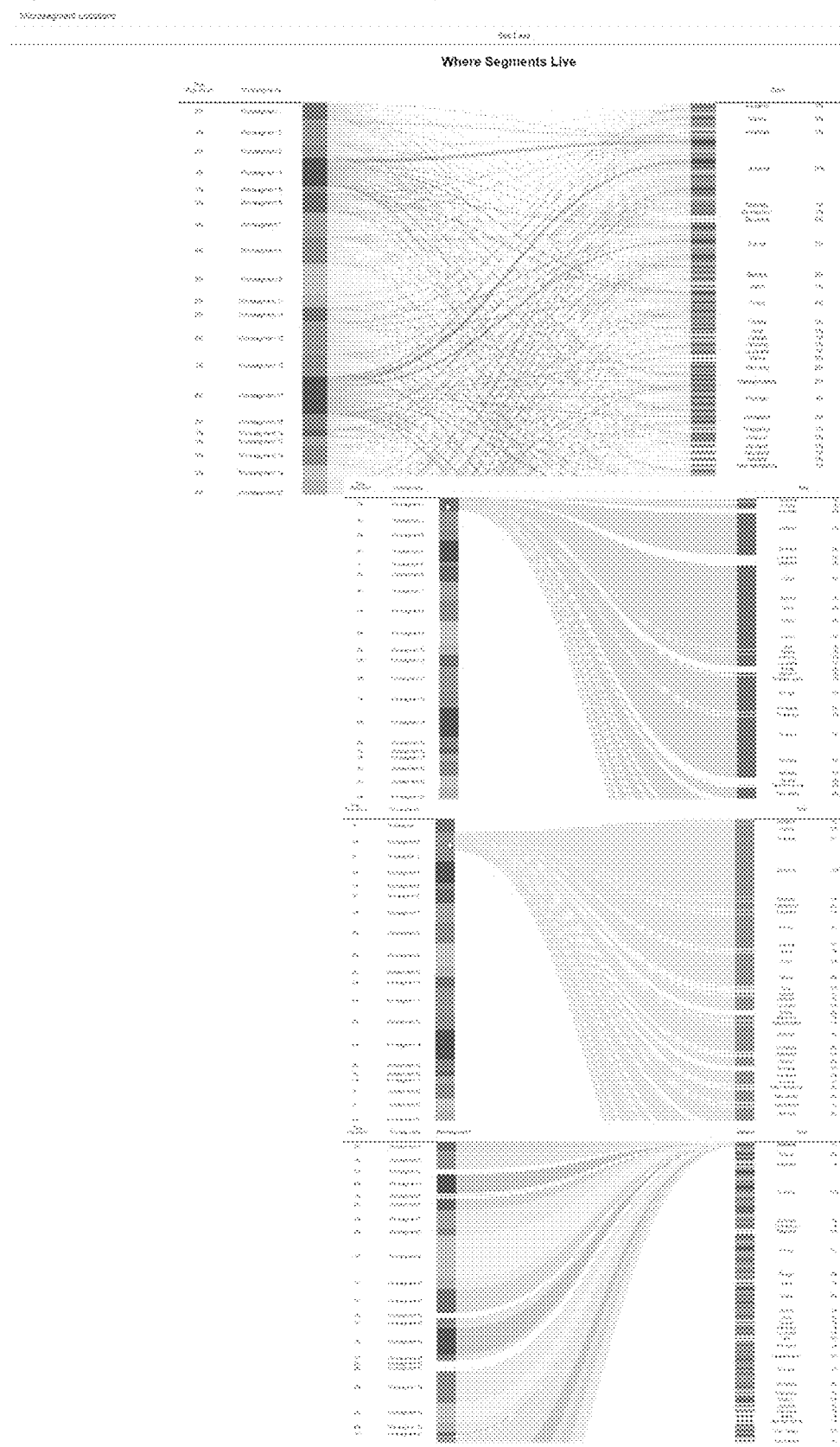

Fig.25: MLUI—screenshot audiance analytics
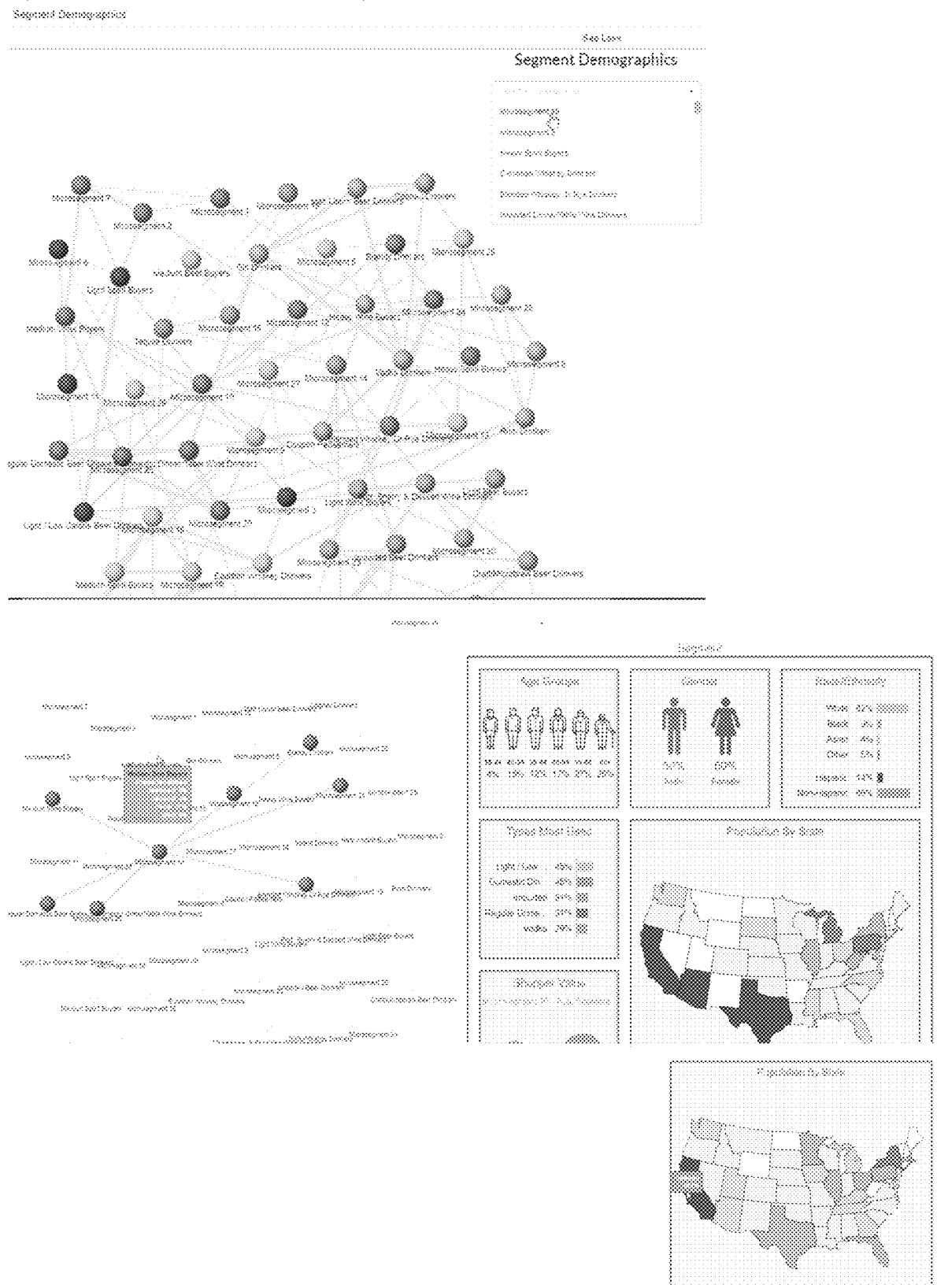

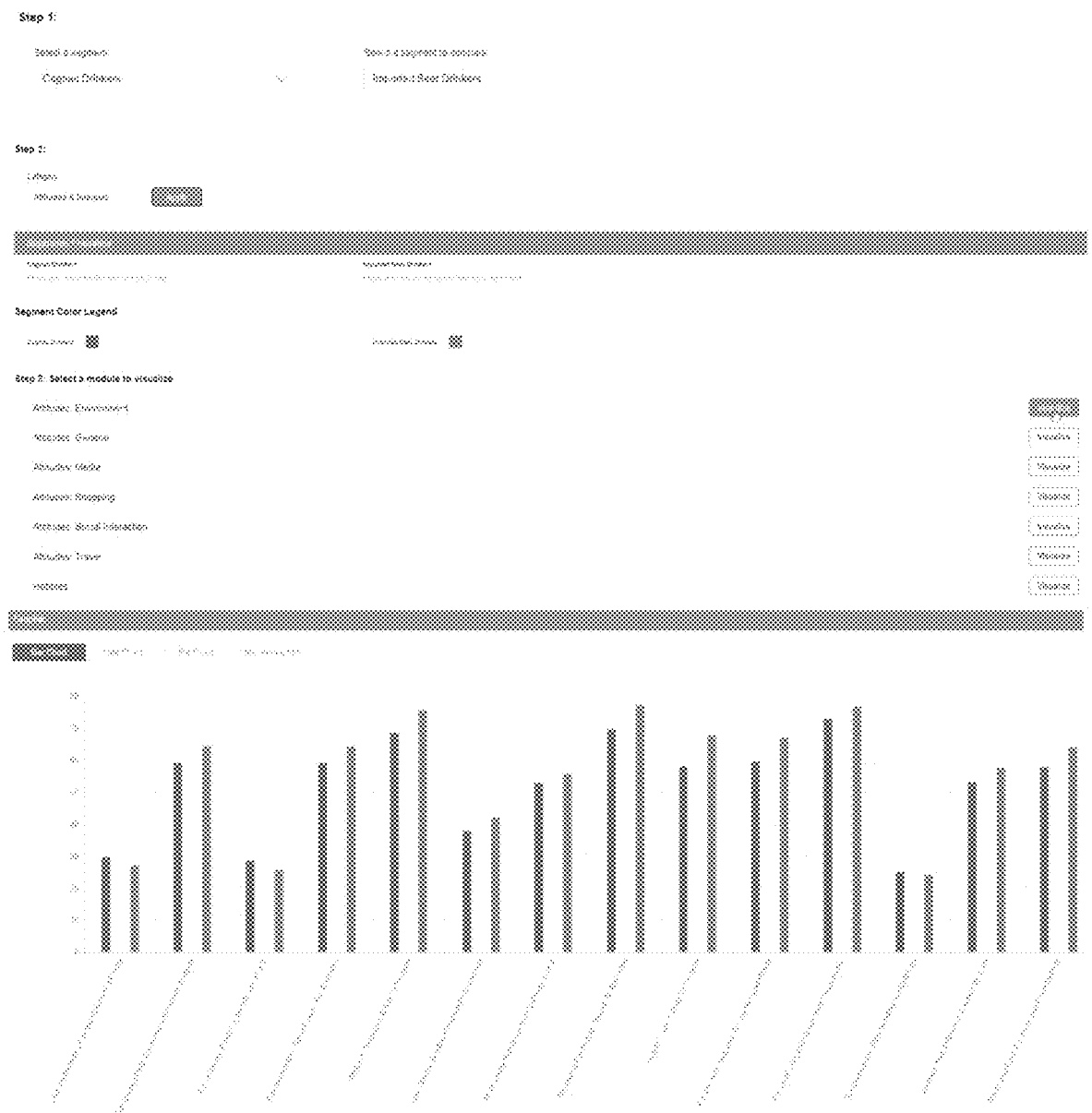
Fig.26: MLUI—screenshot audiance analytics

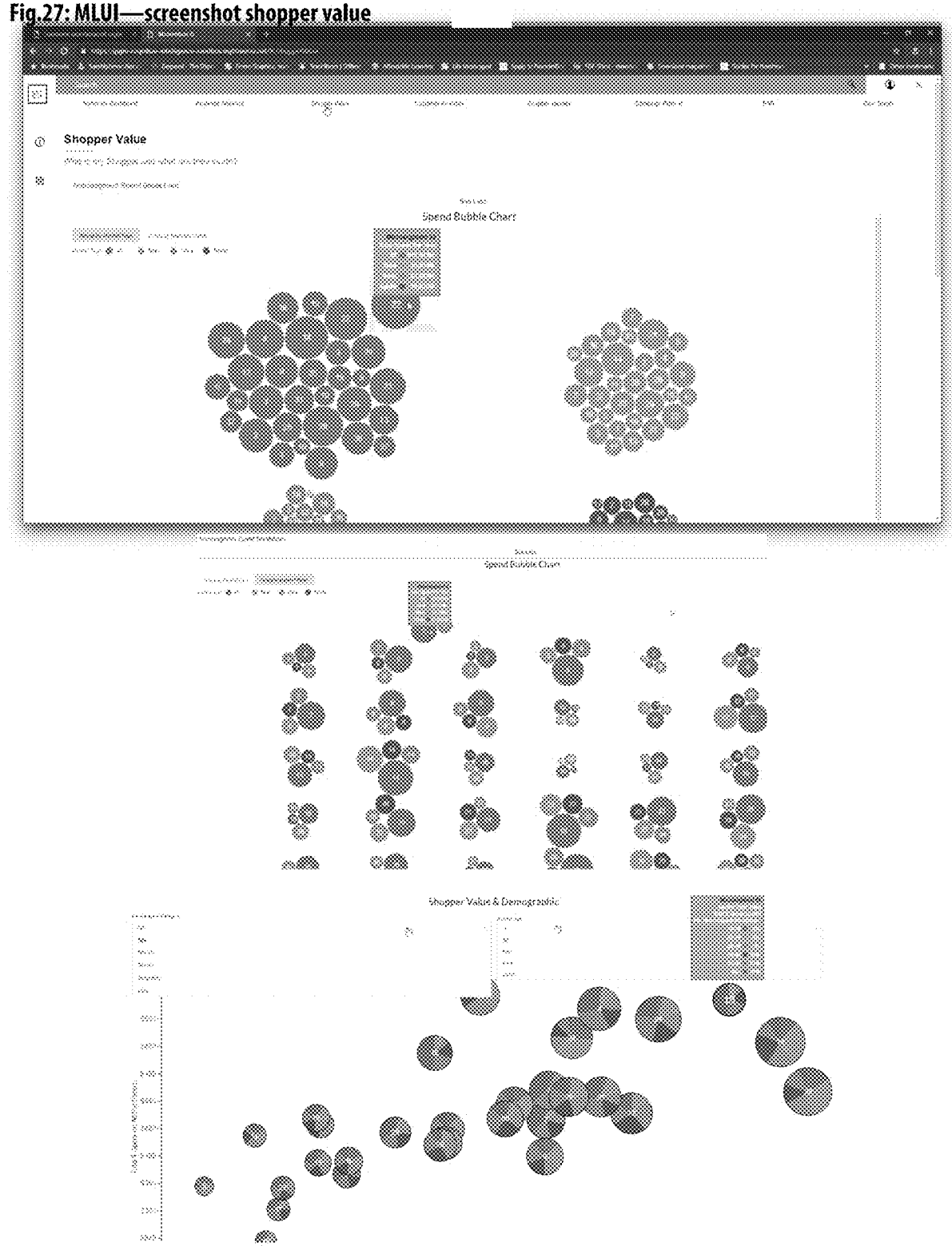
Fig.27: MLUI—screenshot shopper value

Fig.28: MLUI—screenshot customer analytics
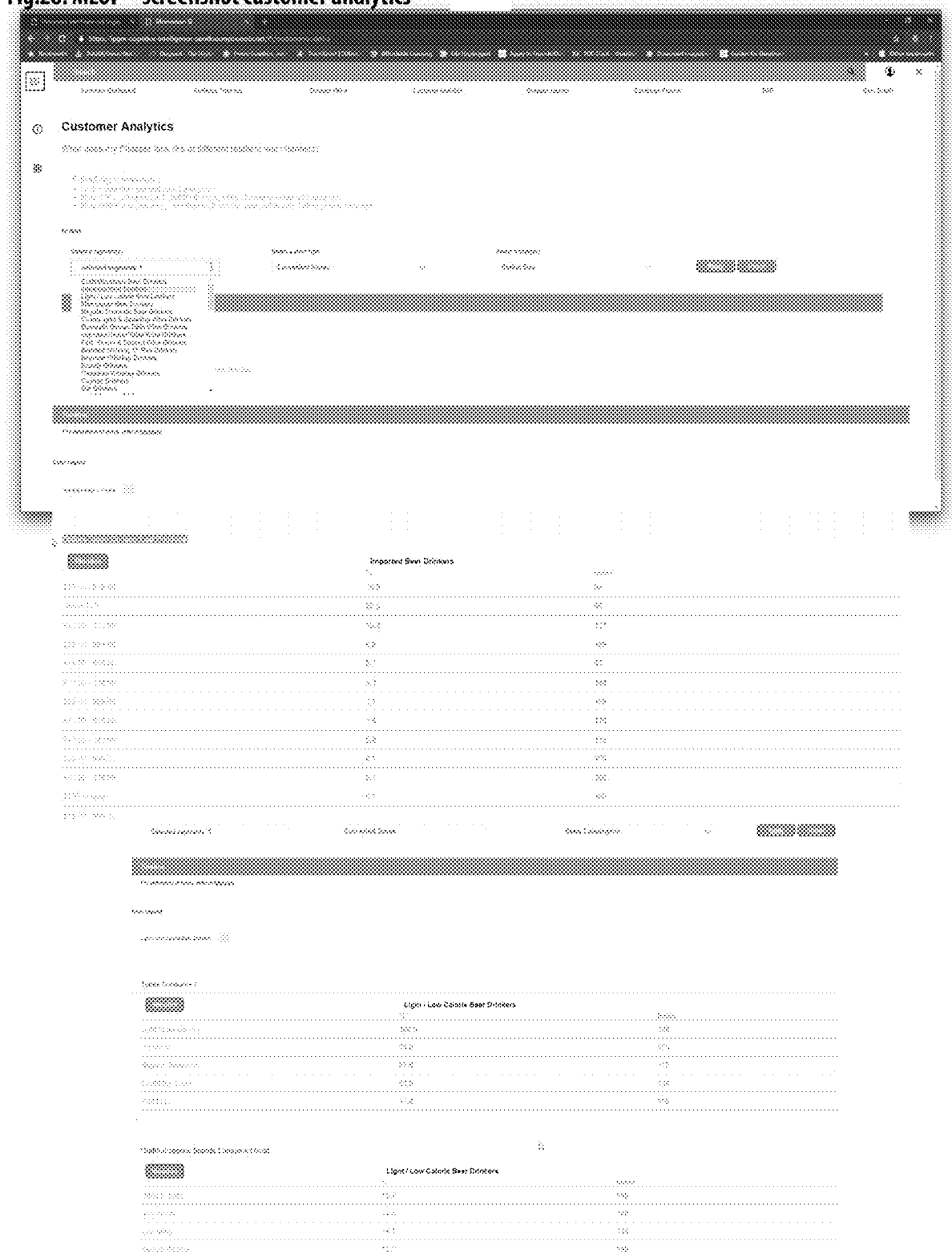

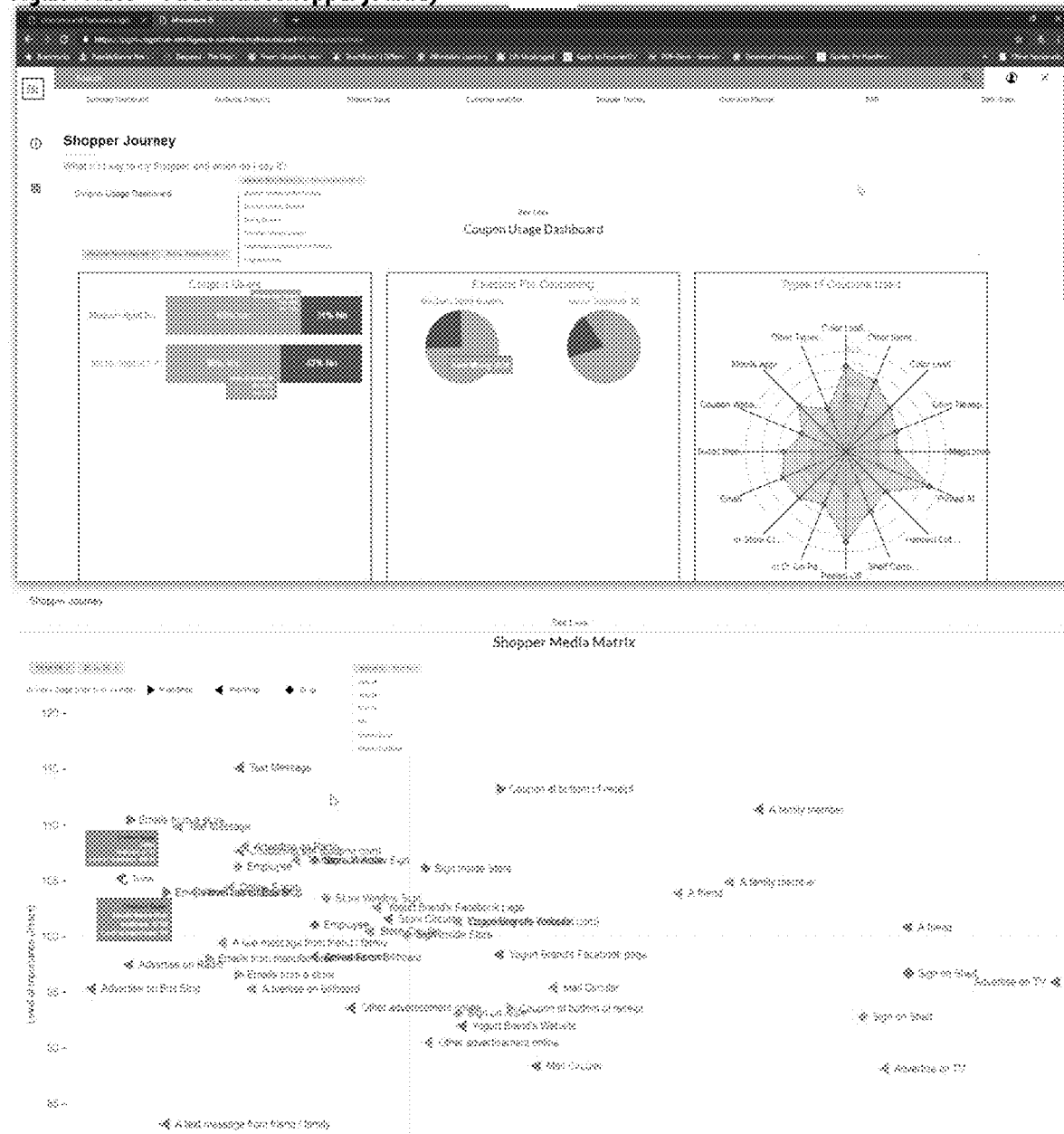
Fig.29: MLUI—screenshot shopper journey

Fig.30: MLUI—screenshot campaign planner
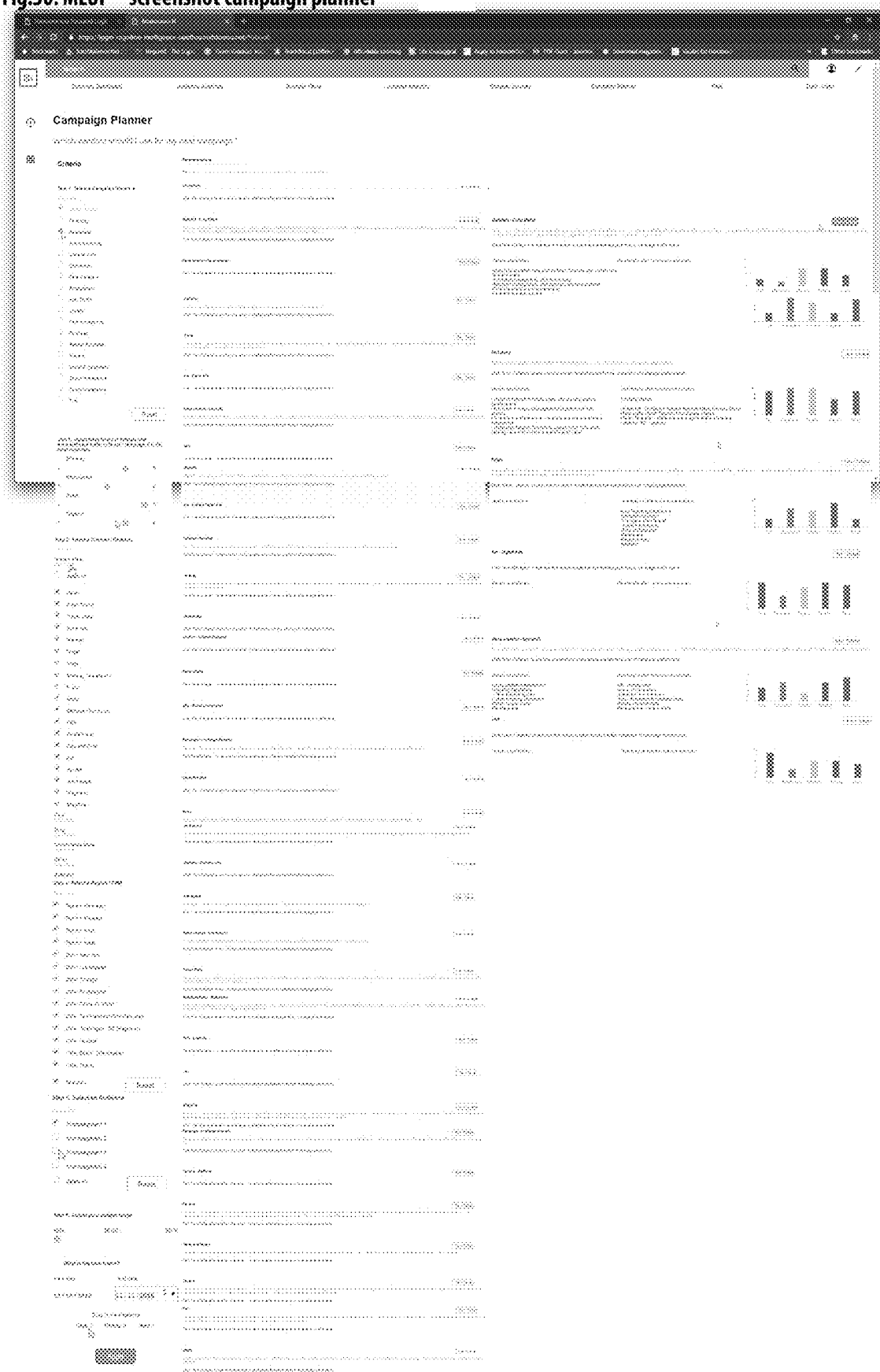

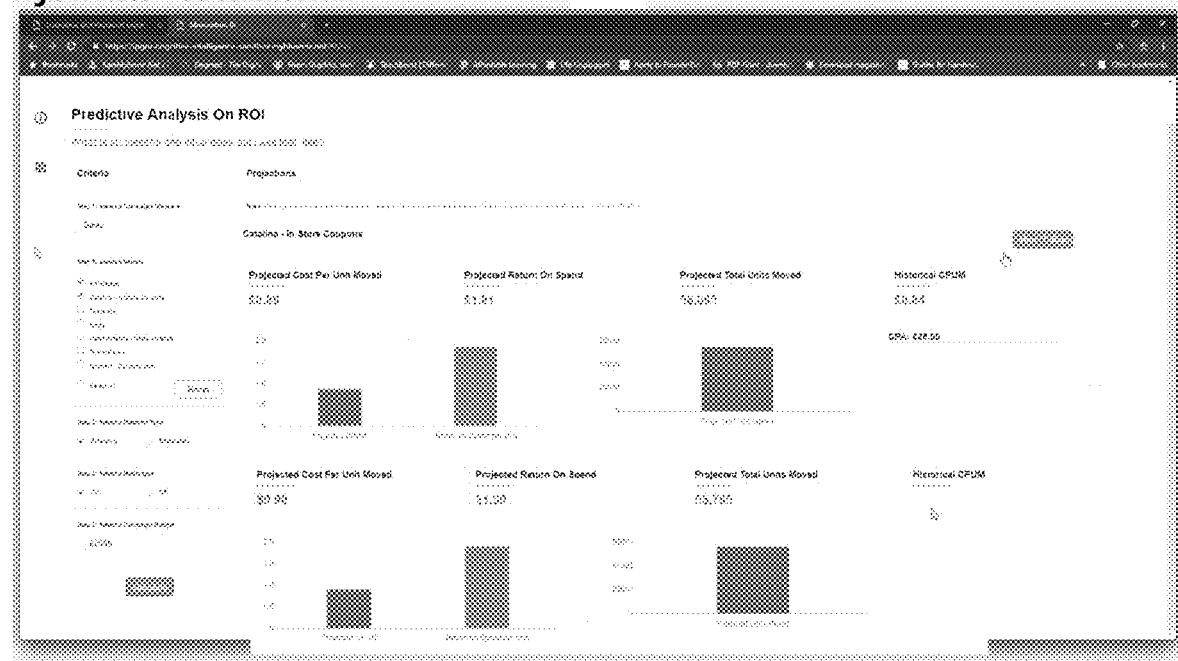
Fig.31: MLUI—screenshot PAR

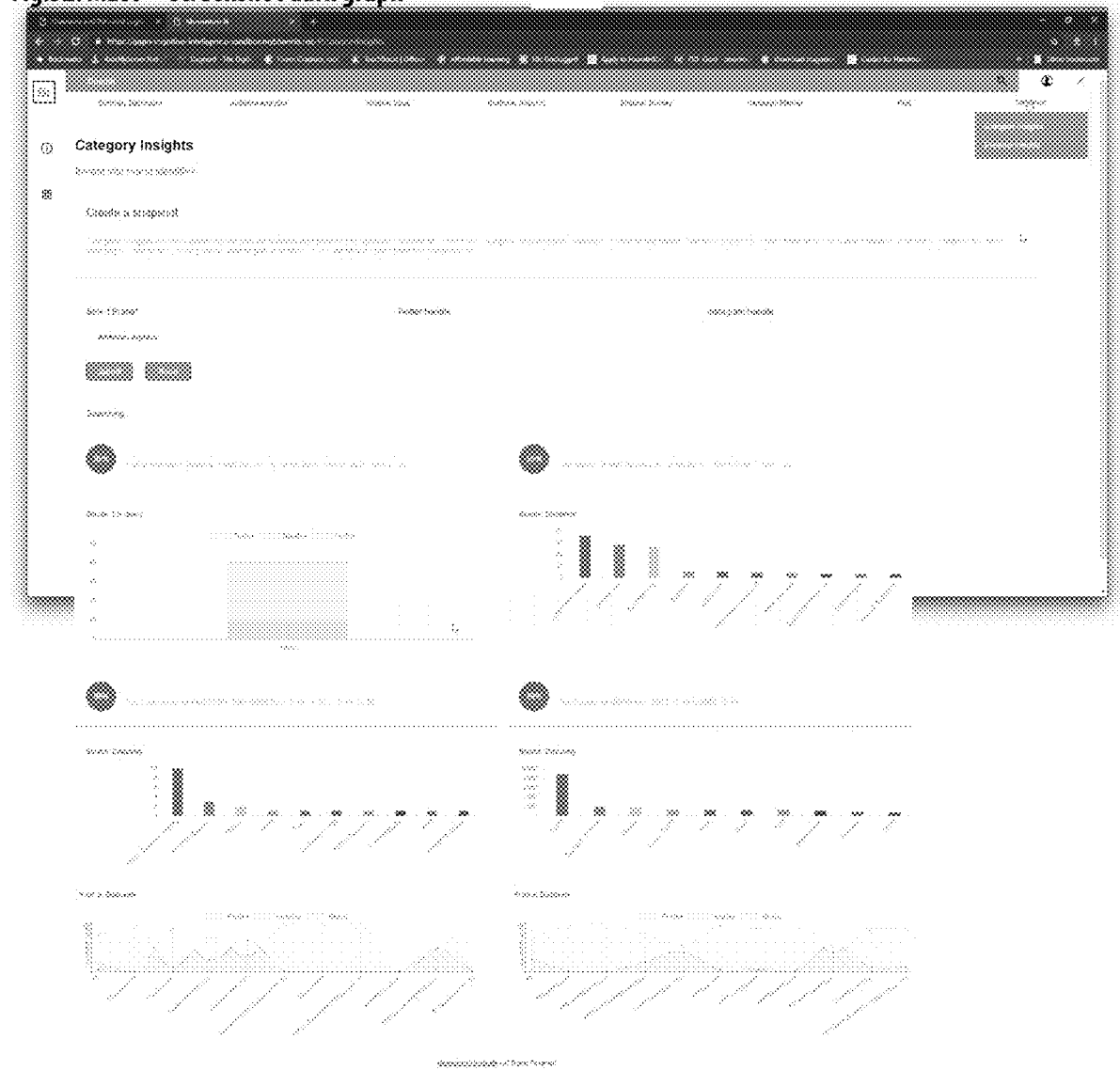
Fig.32: MLUI—screenshot dark graph

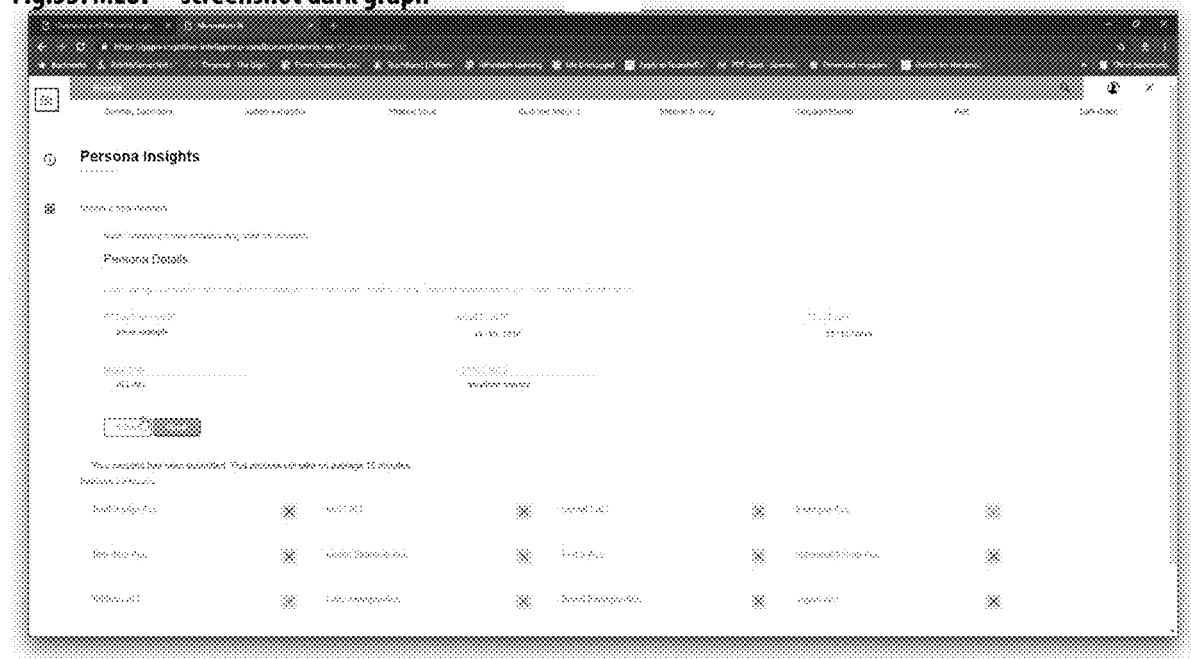
Fig.33: MLUI—screenshot dark graph

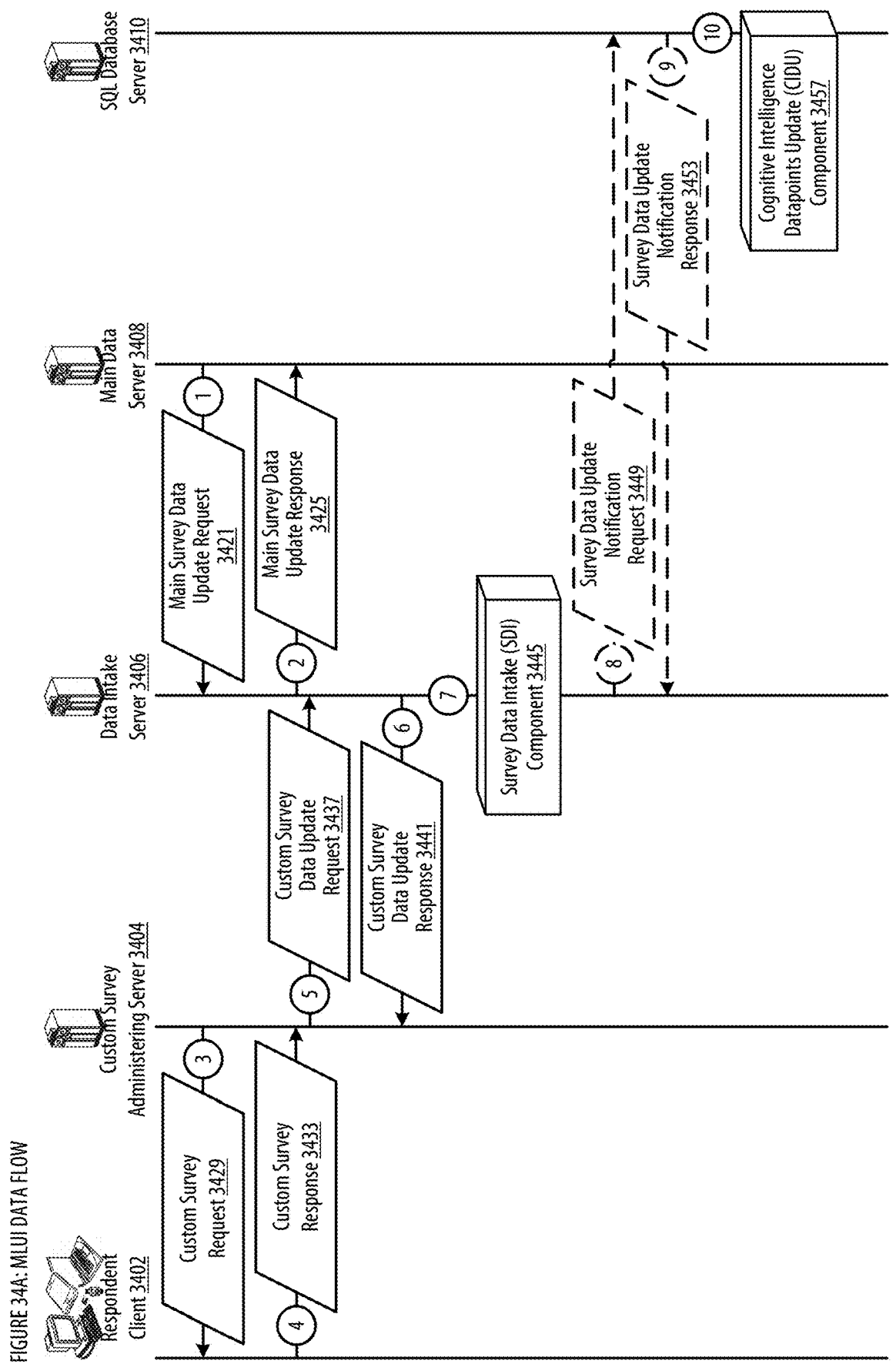

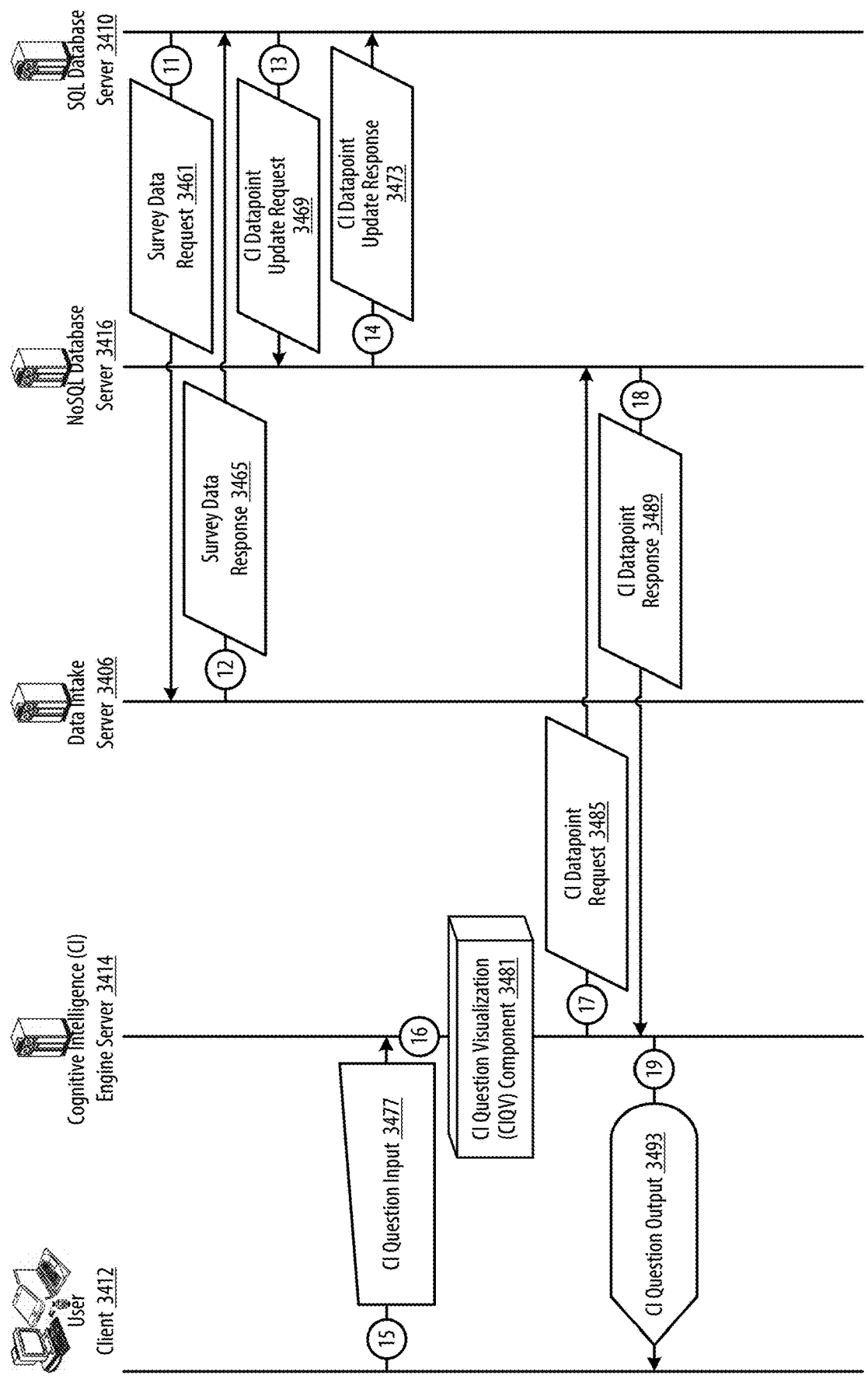

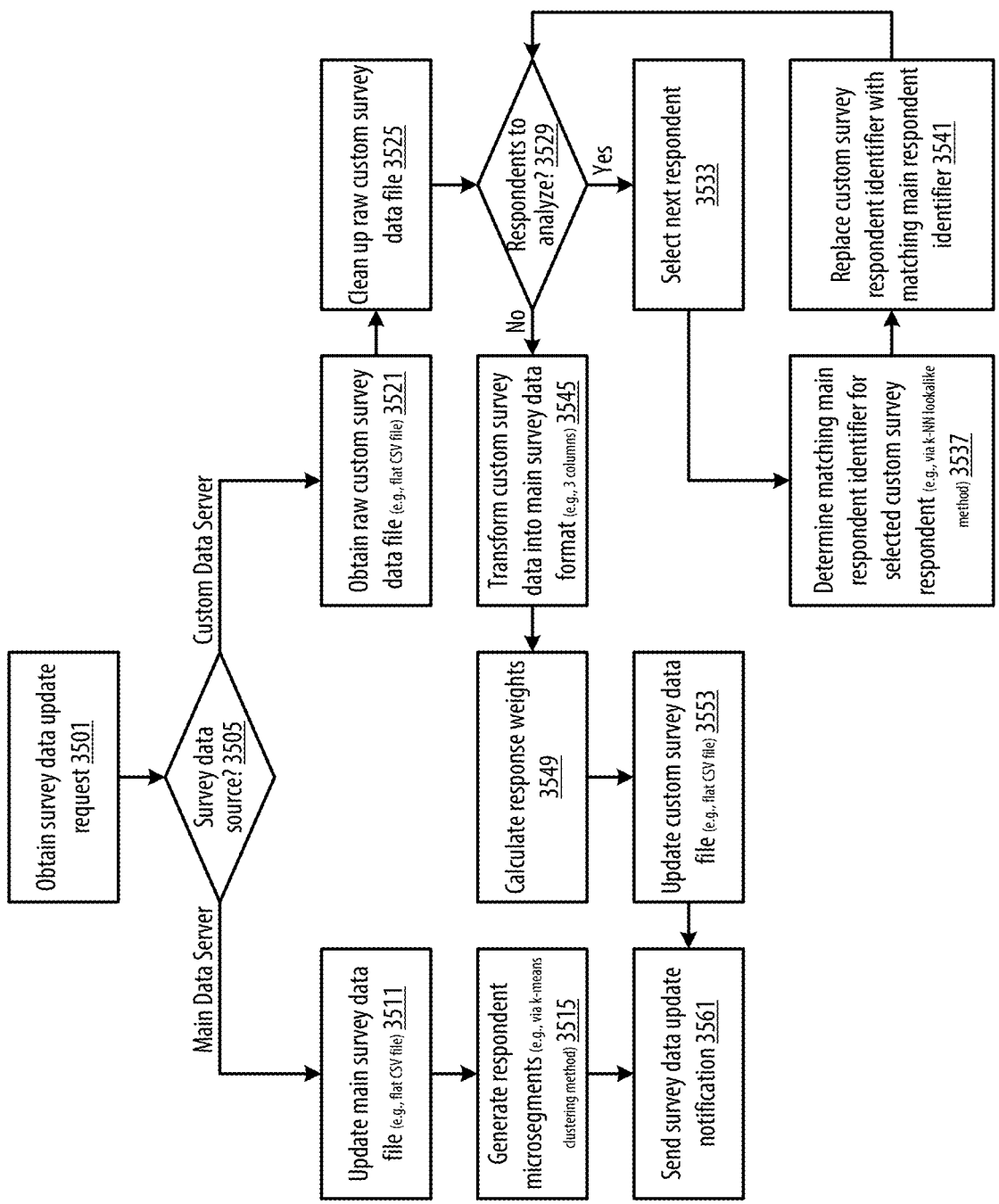
FIGURE 35: MLUI SDI COMPONENT

FIGURE 36: MLUI SCREENSHOT

FIGURE 37: MLUI IMPLEMENTATION CASE

| Respondent ID | Q1r1 | Q1r2 | Q1r3 | Q1r4 | Q1r5 | Q1r6 | Q1r7 | Q1r8 | Q1r9 | Q1r10 | Q2r1 | Q2r2 | Q2r3 | Q2r4 | Q2r5 | Q2r6 |
|---|---|---|---|---|---|---|---|---|---|---|---|---|---|---|---|---|
| Respondent #1 | 1 | 1 | 0 | 0 | 0 | 0 | 0 | 0 | 0 | 0 | 0 | 0 | 0 | 0 | 0 | 0 |
| Respondent #2 | 0 | 0 | 0 | 1 | 1 | 0 | 0 | 1 | 0 | 0 | 0 | 1 | 0 | 1 | 0 | 1 |
| Respondent #3 | 0 | 0 | 0 | 0 | 0 | 0 | 1 | 0 | 0 | 1 | 0 | 0 | 0 | 0 | 0 | 1 |

3701

| Respondent ID | Lookup ID | Response |
|---|---|---|
| Respondent #1 | Q1r1 | 1 |
| Respondent #1 | Q1r2 | 1 |
| Respondent #2 | Q2r3 | 1 |
| Respondent #2 | Q1r3 | 1 |
| Respondent #2 | Q1r4 | 1 |
| Respondent #2 | Q2r5 | 1 |
| Respondent #2 | Q2r6 | 1 |
| Respondent #3 | Q1r6 | 1 |
| Respondent #3 | Q1r7 | 1 |
| Respondent #3 | Q2r1 | 1 |
| Respondent #3 | Q2r6 | 1 |
| Respondent #1 | resp.wght | 45 |
| Respondent #2 | resp.wght | 85 |
| Respondent #3 | resp.wght | 23 |

3710

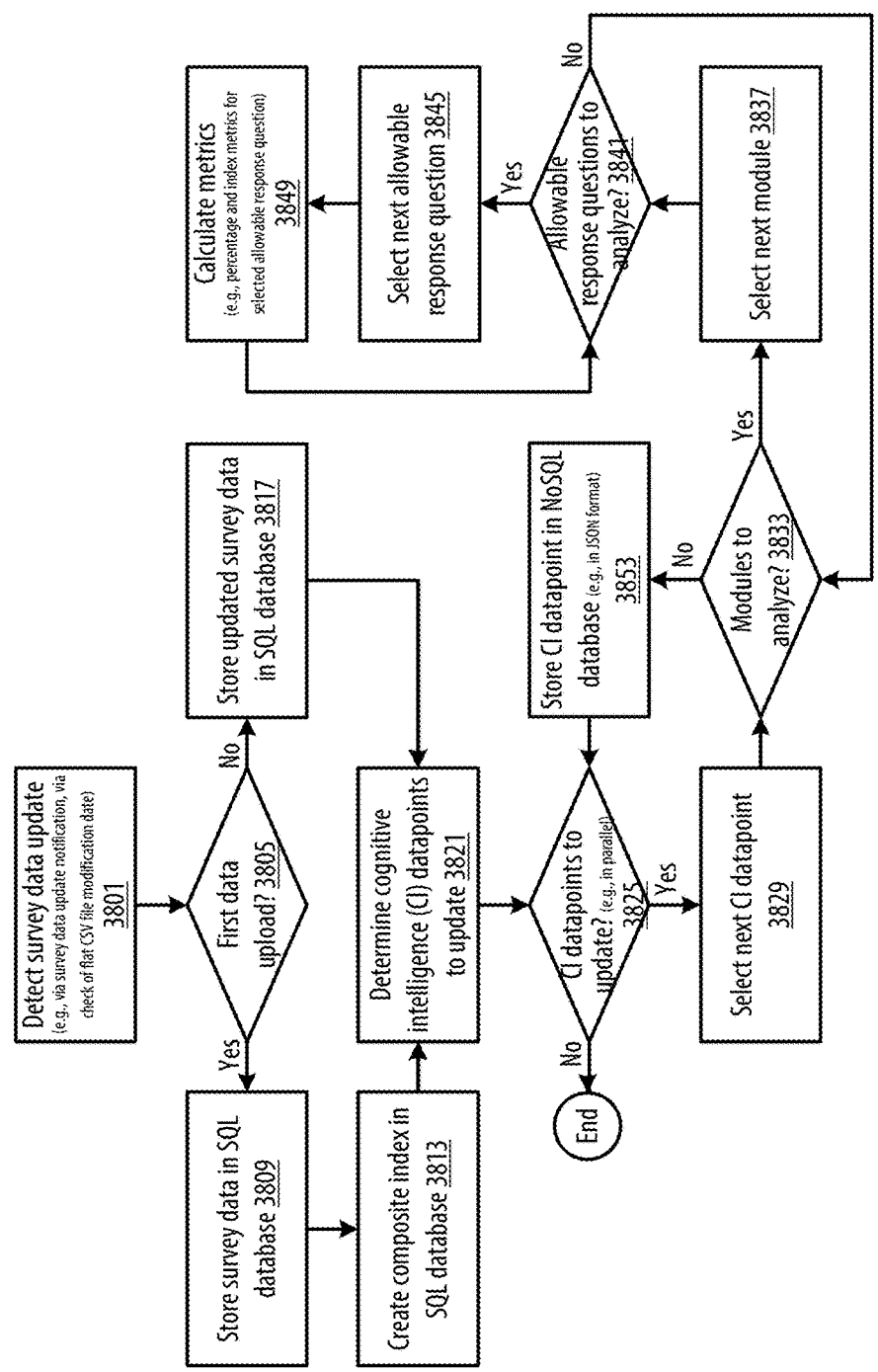
FIGURE 38: MLUI CIQU COMPONENT

| Journey_Stage | Category | Module | Display_Name | CCP_Vlookup2 |
|---|---|---|---|---|
| NA | Demographics | Age | 18-24 | 205.48.4 |
| NA | Demographics | Age | 25-34 | 205.48.5 |
| NA | Demographics | Age | 35-44 | 205.48.7 |
| NA | Demographics | Age | 45-54 | 205.48.0 |
| NA | Demographics | Age | 55-64 | 205.48.Y |
| NA | Demographics | Age | 65+ | 205.49.2 |
| NA | Demographics | Gender | Female | 205.01.2 |
| NA | Demographics | Gender | Male | 205.01.1 |
| NA | Demographics | Ethnicity | Hispanic | 39.17.1 |
| NA | Demographics | Ethnicity | Non-Hispanic | 39.17.3 |

3901

FIGURE 39: MLUI IMPLEMENTATION CASE

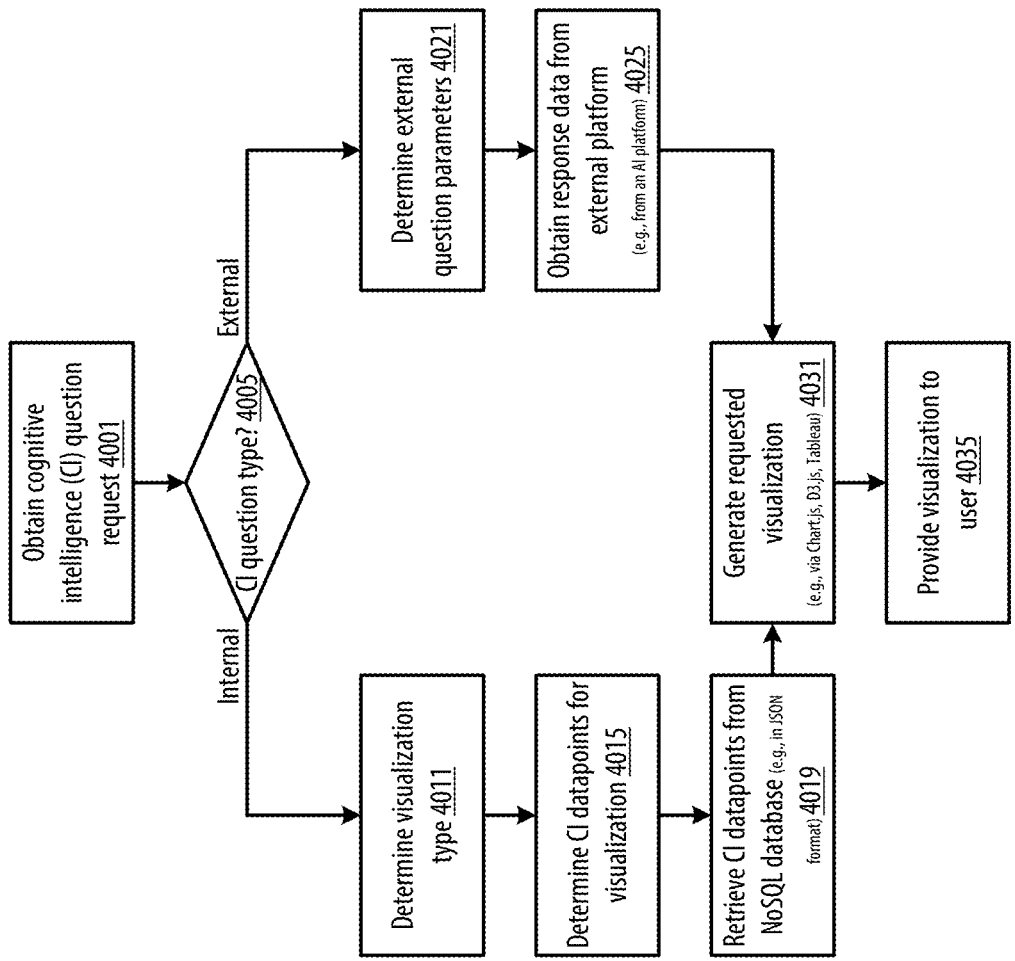
FIGURE 40: MLUI CIQV COMPONENT

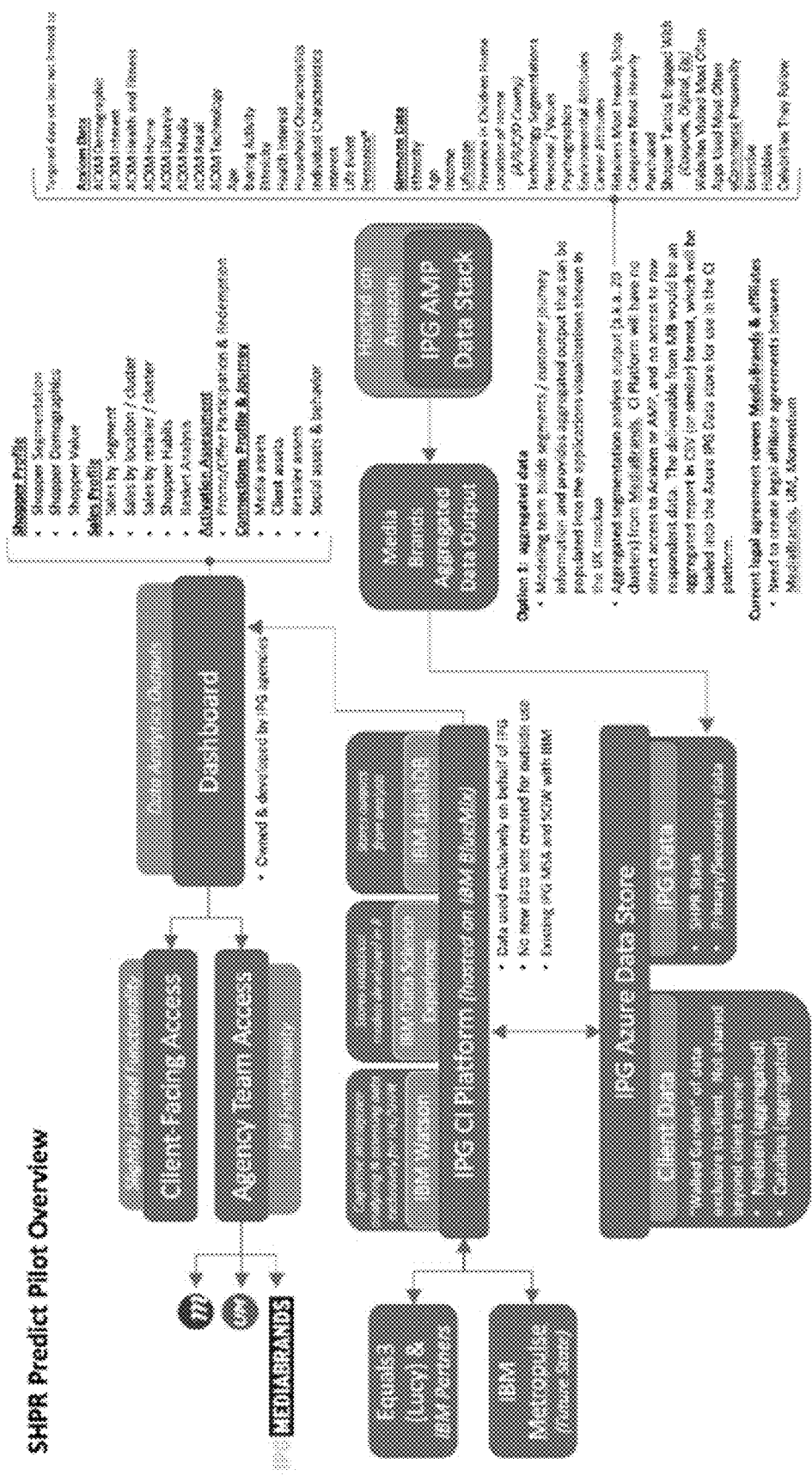
FIGURE 41: MLUI ARCHITECTURE

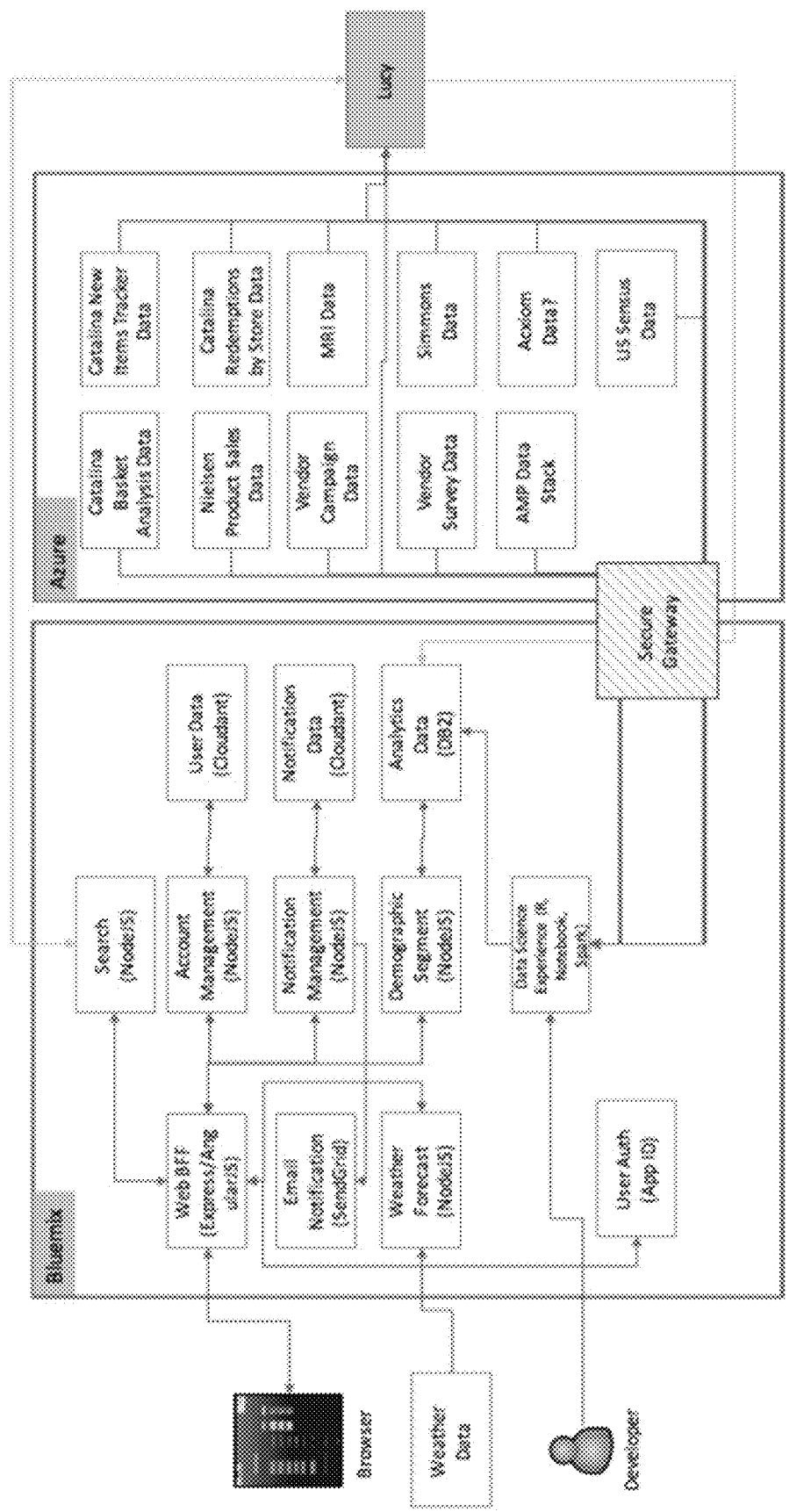
FIGURE 42: MLUI ARCHITECTURE

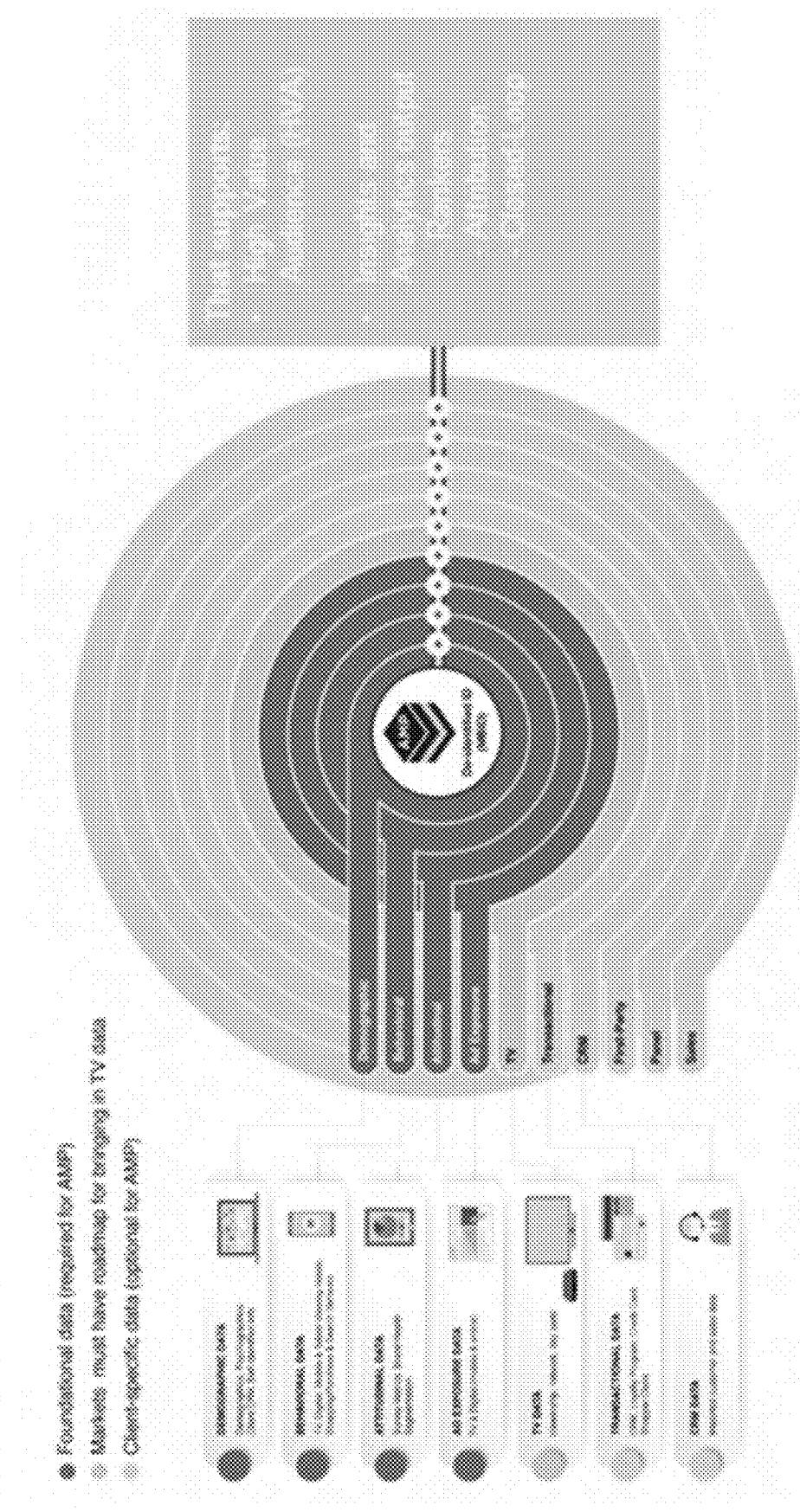
FIGURE 43: MLUI ARCHITECTURE

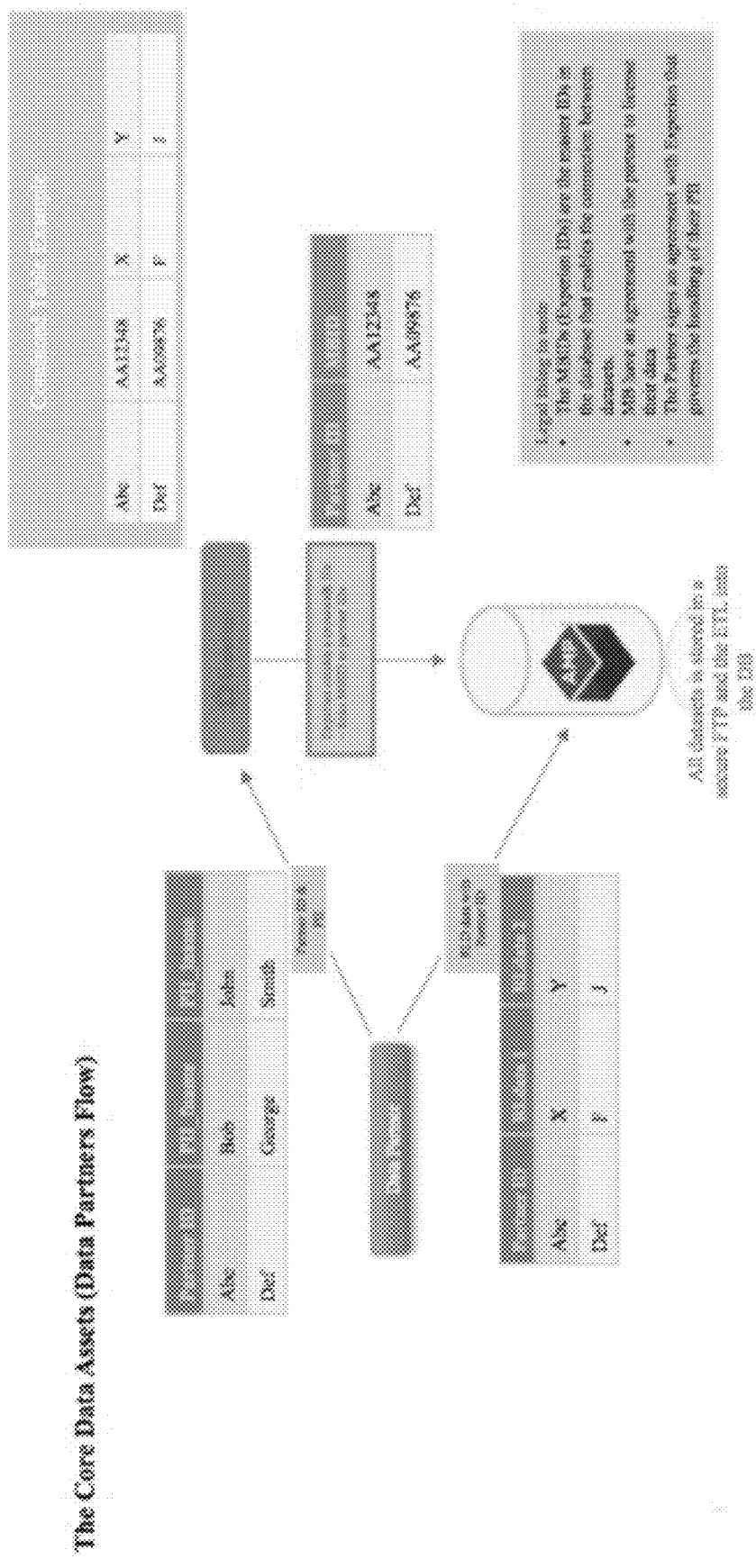
FIGURE 44: MLUI ARCHITECTURE

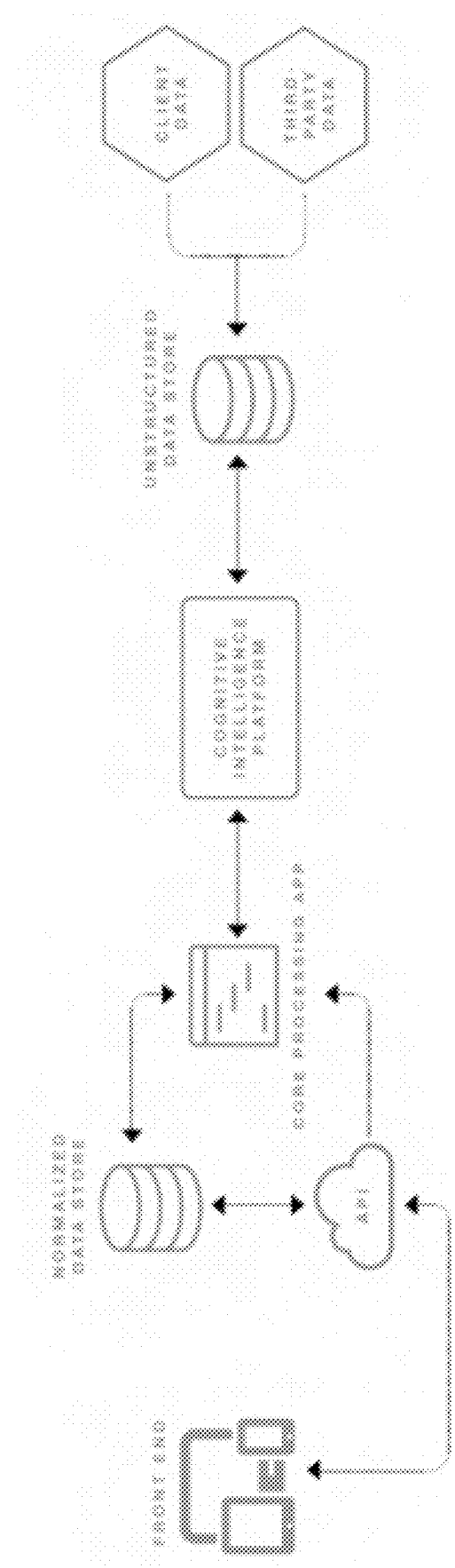
FIGURE 45: MLUI ARCHITECTURE

FIGURE 46: MLUI ARCHITECTURE

Layout

1. High-Level Layout Of The Site
   a. Frameworks: Node.js (backend for frontend), Angular JS (Single page application), Webpack 3.0
   b. Visuals: Chart.js, D3.js, Tableau
2. In-Depth Data Flow of the Momentum CI Platform
   a. Azure Hosting
      i. Flat CSV Files for custom surveys, Simmons Research
   b. DB2 SQL Database (pulls from Azure)
      i. Upon data upsate, computes results for questions in the database
   c. Cosudant NoSQL Database (caching the data above)
      i. Caches the data from Step "b" in json format
      ii. Queryable and sends cached data via api to frontend of the site to be visualized
3. In-Depth Structure of Data
   a. Simmons Research Data
   b. Momentum Proprietary Custom Research Data
   c. Valassis Digital
   d. IBM Watson (Lucy AI) - Social Data
4. Use of Machine Learning
   a. All Platforms
      i. Unsupervised Learning: Survey Audience Segmentation (K-Means Clustering)
      ii. Lazy Learning: Survey Lookalike Modeling To Contract Datasources (K-Nearest Neighbors)
      iii. Unsupervised Learning: Social Media User Segmentation (IBM Watson Lucy AI)
      iv. Supervised Learning
   b. Custom:
      i. Supervised Learning: Predicting Cost-Efficiency of Coupons at different Vendors (Multivariate Regression)

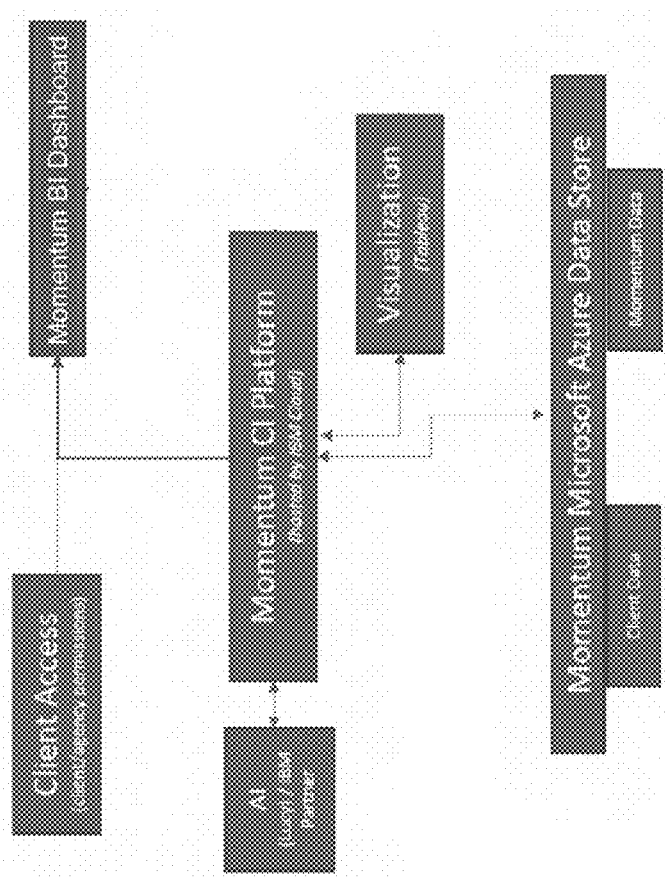
FIGURE 47: MLUI ARCHITECTURE

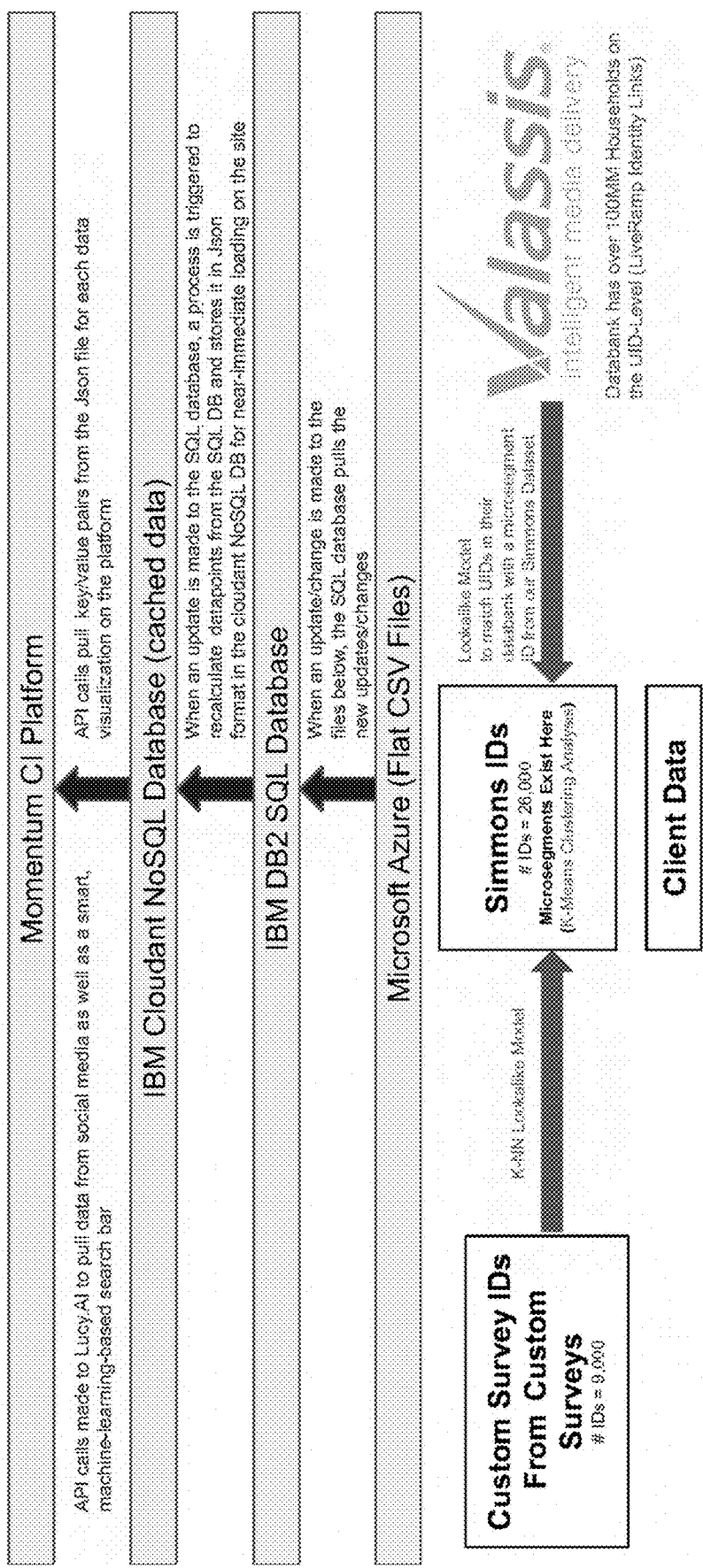

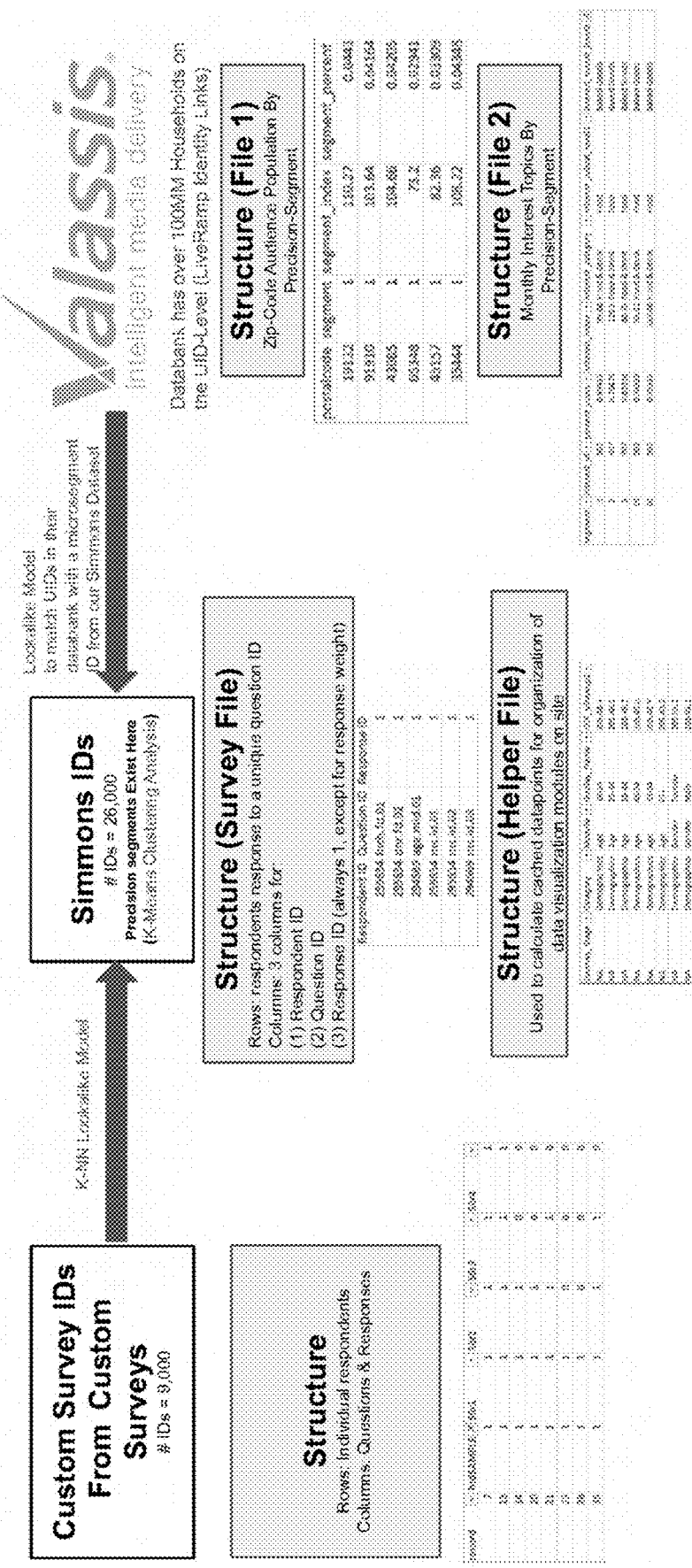
FIGURE 49: MLUI ARCHITECTURE

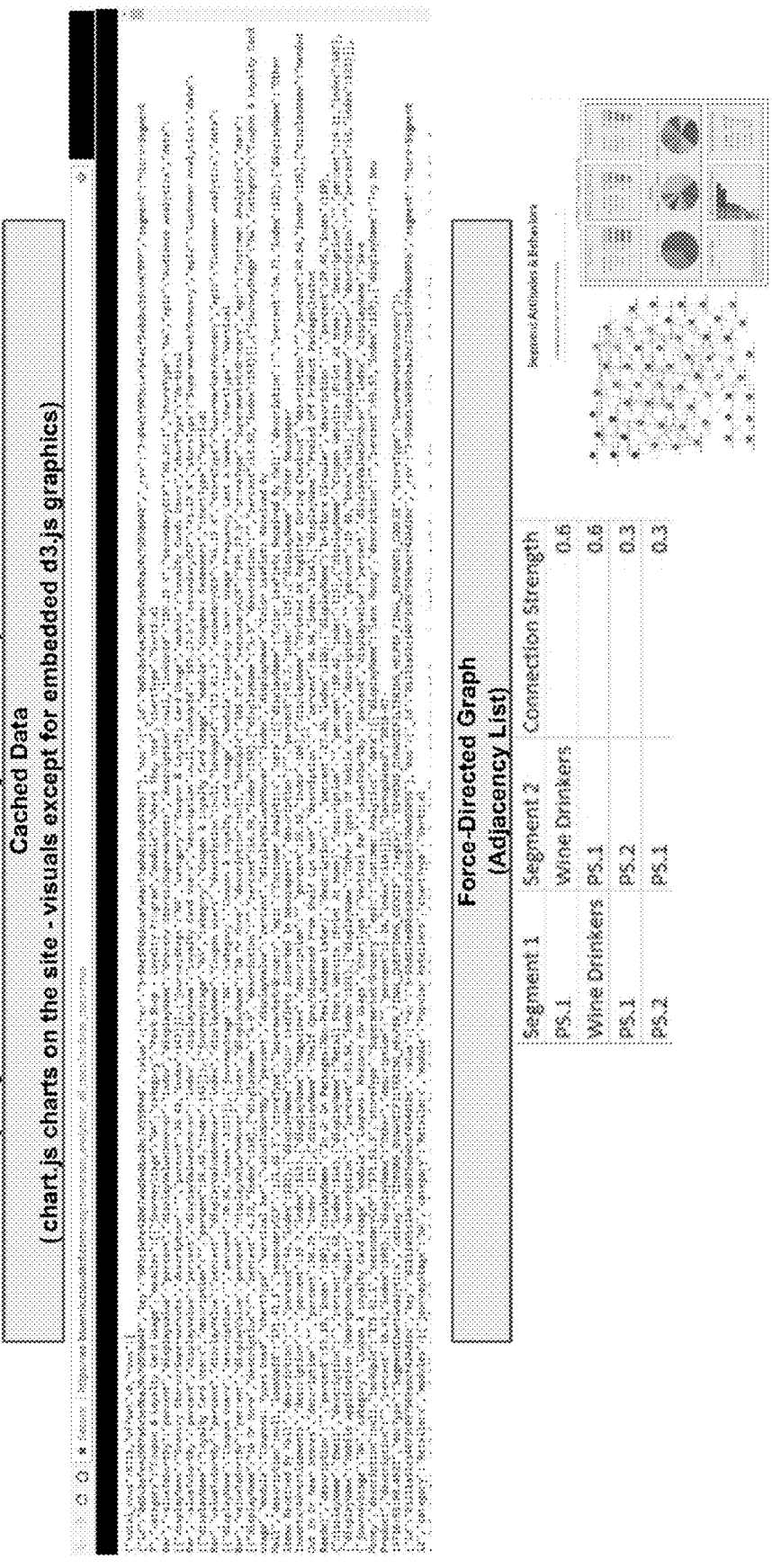
FIGURE 50: MLUI ARCHITECTURE

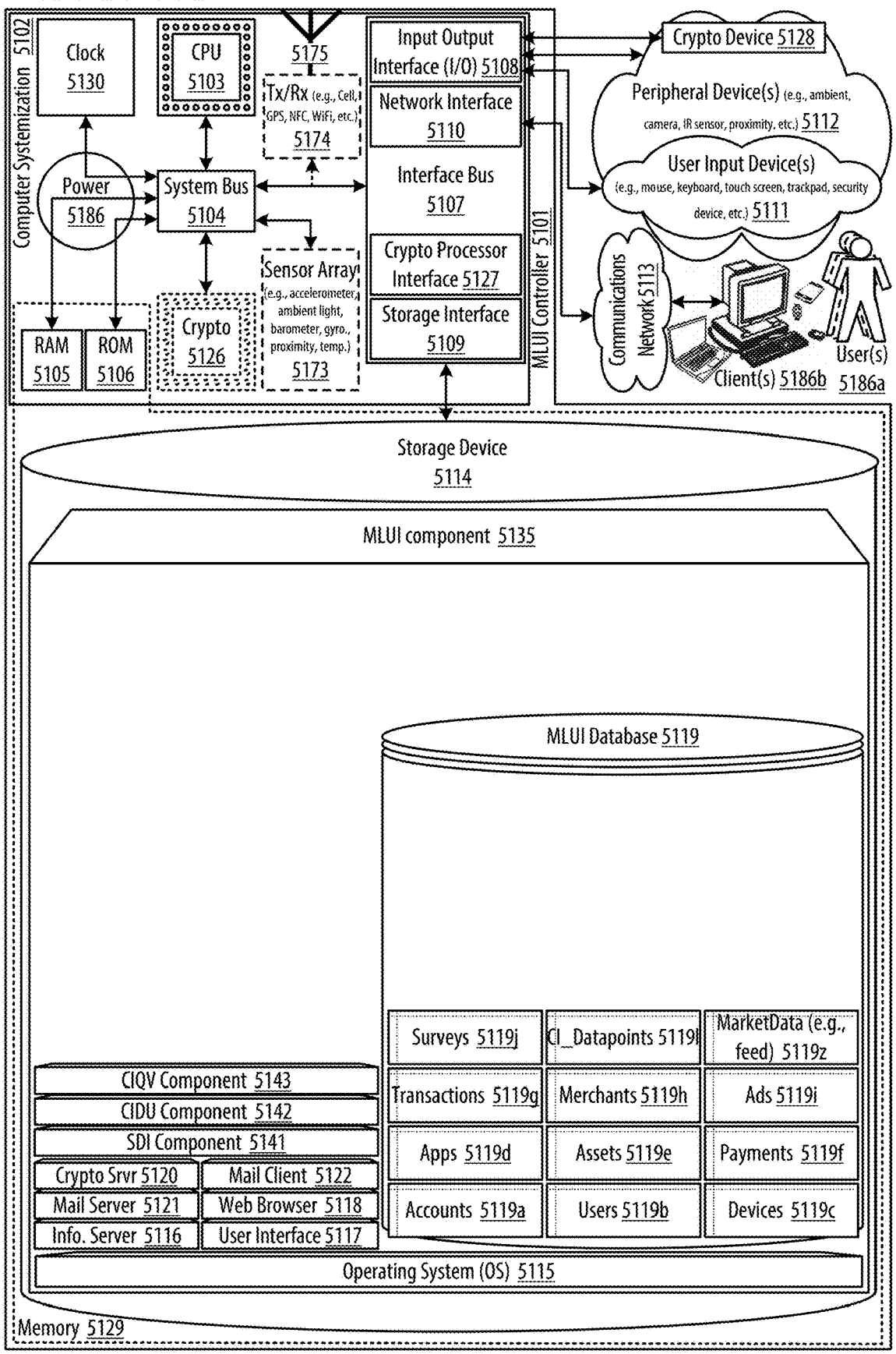
FIGURE 51: MLUI Controller

MULTIDIMENSIONAL MACHINE LEARNING DATA AND USER INTERFACE SEGMENT TAGGING ENGINE APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 119 as a non-provisional conversion of: U.S. provisional patent application Ser. No. 63/051,873, filed Jul. 14, 2020, entitled "Multidimensional Machine Learning Data and User Interface Segment Tagging Engine Apparatuses, Methods and Systems".

Applicant hereby claims benefit to priority under 35 USC § 120 as a continuation-in-part of: U.S. patent application Ser. No. 16/221,437, filed Dec. 14, 2018, entitled "Multidimensional Machine Learning Data and User Interface Segment Tagging Engine Apparatuses, Methods and Systems", which in turn claims benefit to priority under 35 USC § 119 as a non-provisional conversion of: U.S. provisional patent application Ser. No. 62/598,847, filed Dec. 14, 2017, entitled "Cognitive Intelligence Data Engine Apparatuses, Methods and Systems".

The entire contents of the aforementioned applications are herein expressly incorporated by reference.

FIELD

The present innovations generally address database systems, and more particularly, include Multidimensional Machine Learning Data and User Interface Segment Tagging Engine Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Data are organized, sorted, and presented on computers. A machine learning system can be trained to learn from existing data. Systems like Apache Singa, Amazon Machine Learning, and TensorFlow by Google provide natural language processing and machine learning programming libraries for development. Further, advertising systems like Google's Ad Sense and Doubleclick provide ad networks through which advertisers may develop online ad campaigns.

BRIEF DESCRIPTION OF THE DRAWINGS

Appendices and/or drawings illustrating various, non-limiting, example, innovative aspects of the Multidimensional Machine Learning Data and User Interface Segment Tagging Engine Apparatuses, Methods and Systems (hereinafter "MLUI") disclosure, include:

FIGS. 1-33 show screenshots illustrating user interface(s) of the MLUI;

FIGS. 34A-B show a datagraph illustrating data flow(s) for the MLUI;

FIG. 35 shows a logic flow illustrating embodiments of a survey data intake (SDI) component for the MLUI;

FIG. 36 shows a screenshot illustrating user interface(s) of the MLUI;

FIG. 37 shows implementation case(s) for the MLUI;

FIG. 38 shows a logic flow illustrating embodiments of a cognitive intelligence datapoints update (CIDU) component for the MLUI;

FIG. 39 shows implementation case(s) for the MLUI;

FIG. 40 shows a logic flow illustrating embodiments of a cognitive intelligence question visualization (CIQV) component for the MLUI;

FIG. 41 shows an architecture for the MLUI;
FIG. 42 shows an architecture for the MLUI;
FIG. 43 shows an architecture for the MLUI;
FIG. 44 shows an architecture for the MLUI;
FIG. 45 shows an architecture for the MLUI;
FIG. 46 shows an architecture for the MLUI;
FIG. 47 shows an architecture for the MLUI;
FIG. 48 shows an architecture for the MLUI;
FIG. 49 shows an architecture for the MLUI;
FIG. 50 shows an architecture for the MLUI;
FIG. 51 shows a block diagram illustrating embodiments of a MLUI controller;

APPENDIX 1 illustrates embodiments of the MLUI.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Multidimensional Machine Learning Data and User Interface Segment Tagging Engine Apparatuses, Methods and Systems (hereinafter "MLUI") transforms ambient condition data, sales data, user interface selections, cognitive intelligence question input inputs, via MLUI components (e.g., Multi-dimensional user interface segment, machine learning aggregator, ambient data aggregator, SDI, CIDU, CIQV, etc. components), into project projections, campaigns, user interface visualizations, cognitive intelligence question output outputs. The MLUI components, in various embodiments, implement advantageous features as set forth below.

INTRODUCTION

The MLUI provides unconventional features (e.g., discern unique entity identifiers from the cognitive data engine component processing, generate user interface handlers for the discerned unique entity identifiers, process the obtained ambient transaction data relative to the unique entity identifiers, wherein the processing configures the obtained ambient transaction data and unique entity identifiers for display in the generated user interface handlers, a database caching engine) that were never before available in database systems (e.g., including the ability to provide near real-time answers to cognitive intelligence questions to make sense of disparate data like sales and ambient condition data and conjure multiple interface views for accessing and understanding that data, generating triggers for actions and computations form interactions with the user interfaces, and instantiating campaigns/projects from such interactions).

In one embodiment, CIDE (e.g., CIDMP) provides automation of the anticipation of shoppers' needs, backed by a Cognitive Intelligence platform, powered by machine learning back end, e.g., IBM's platform. CIDE has the ability to learn and grow feature sets for both network-wide operational functions as well as external client needs. CIDE features include, but are not limited to; social commerce, programmatic creative, strategic brand planning, smart data automation, loyalty programs, sponsorship valuation, shopper marketing, influencer marketing, database marketing, CRM, and various experiential marketing applications.

The scope of services defined herein provides a foundation built using IBM Cognitive Services that is extensible and allows future phases to be additive and expand its capabilities. As such, CIDE connects UIDs gathered from media, retail, mobile and ambient behavior sources creating the first ever shopper marketing AI platform with predictive analytics, real-time performance monitoring, and post-program ROI tied to purchase.

In some embodiments, as shown in FIGS. 41-44, a multitude of data sources and cognitive services may be utilized.

The IBM Bluemix 'Platform as a Service' provides cloud-based application hosting, including the Data Science Experience, which may house the Momentum-authored proprietary algorithms and probabilistic mathematical models.

These models may poll data from an IPG, Microsoft Azure-hosted data storage facility, and leverage the extended computing capability of Lucy. Lucy is a cognitive intelligence marketing platform from Equals 3, an IBM Watson ecosystem partner that makes direct calls to IBM Watson Cognitive Services. Together, the Momentum models and results from Lucy may be visualized on the Bluemix-hosted custom developed front-end user interface.

The modularity of the MLUI allows for alternate, or additional, cognitive services and data sources to be added without significant re-engineering. This was done to allow for future services to be quickly integrated into the ecosystem—inclusive of additional features and functionalities— to keep up with the extreme pace of advancement.

The IPG Microsoft Azure data storage facility may be utilized to store first-party and client data.

Each client may have a separate tenant within the IPG Microsoft Azure account, assuring data separation and compliance adhere to the most current IPG data standards.

Data may be accessed according to IPG policies, including access via a Shared Access Signature, which grants focused and limited access, following the principle of least privilege for each requesting resource. The Momentum-authored models in the Data Science Experience may output their results in an analytics database such as DB2, which may then be called by the user interface driven by NodeJS in order to display results to users.

The MLUI may be architected to utilize IPG's MediaBrands AMP. AMP is IPG's people-based marketing data stack that combines online and offline datasets to power audience discovery, enablement and measurement. It is flexible and transparent in its vendors and sources. AMP is a collection of different data sets and sources that are matched through a market level census data. Within that core dataset other third party data (e.g., client data including CRM data) may be added. AMP can also integrate non-core data assets.

Connection of AMP data sources are enabled by an identity graph (e.g., generated by Experian) which allows integration across data partners and the AMP platform. For example, MediaBrands may assume the Experian ID in AMP via LiveRamp and may be matched to a similar ID in the MLUI. External data aggregators (e.g., Oracle) may also be utilized.

In some embodiments, an architecture shown in FIG. 45 may be utilized to implement the MLUI.

MLUI

FIGS. 1-33 show screenshots illustrating user interface(s) of the MLUI.

FIGS. 34A-B show a datagraph illustrating data flow(s) for the MLUI. In FIGS. 34A-B, dashed lines indicate data flow elements that may be more likely to be optional. In FIGS. 34A-B, a main data server 3408 may send a main survey data update request 3421 to a data intake server 3406 to provide updated main survey data. In one implementation, the main survey data update request may include data such as a request identifier, survey data, and/or the like. In one embodiment, the main data server may provide the following example main survey data update request, substantially in the form of a (Secure) Hypertext Transfer Protocol ("HTTP(S)") POST message including eXtensible Markup Language ("XML") formatted data, as provided below:

```
POST/main_survey_data_update_request.php HTTP/1.1
Host: www.server.com
Content-Type: Application/XML
Content-Length: 667
<?XML version="1.0" encoding="UTF-8"?>
<main_survey_data_update_request>
   <request_identifier>ID_request_1</request_identifier>
   <survey_data>
      <survey_identifier>ID_survey_1</survey_identi-
         fier>
      <survey_response>
         <respondent_ID>ID_respondent_1</responden-
            t_ID>
         <lookup_ID>ID_question_1_reponse_1</looku-
            p_ID>
         <response>1</response>
      </survey_response>
      <survey_response>
         <respondent_ID>ID_respondent_1</responden-
            t_ID>
         <lookup_ID>ID_question_1_reponse_2</looku-
            p_ID>
         <response>1</response>
      </survey_response>
      <survey_response>
         <respondent_ID>ID_respondent_1</responden-
            t_ID>
```

```xml
        <lookup_ID>ID_question_2_reponse_3</lookup_ID>
        <response>1</response>
      </survey_response>
      <survey_response>
        <respondent_ID>ID_respondent_2</respondent_ID>
        <lookup_ID>ID_question_1_reponse_3</lookup_ID>
        <response>1</response>
      </survey_response>
      <survey_response>
        <respondent_ID>ID_respondent_2</respondent_ID>
        <lookup_ID>ID_question_1_reponse_4</lookup_ID>
        <response>1</response>
      </survey_response>
      <survey_response>
        <respondent_ID>ID_respondent_2</respondent_ID>
        <lookup_ID>ID_question_2_reponse_5</lookup_ID>
        <response>1</response>
      </survey_response>
      <survey_response>
        <respondent_ID>ID_respondent_1</respondent_ID>
        <lookup_ID>ID_respondent_weight</lookup_ID>
        <response>45</response>
      </survey_response>
      <survey_response>
        <respondent_ID>ID_respondent_2</respondent_ID>
        <lookup_ID>ID_respondent_weight</lookup_ID>
        <response>85</response>
      </survey_response>
    </survey_data>
</main_survey_data_update_request>
```

The data intake server 3406 may send a main survey data update response 3425 to the main data server 3408 to confirm receipt of the survey data. In one implementation, the main survey data update response may include data such as a response identifier, a status, and/or the like. In one embodiment, the data intake server may provide the following example main survey data update response, substantially in the form of a HTTP(S) POST message including XML-formatted data, as provided below:

```
POST/main_survey_data_update_response.php HTTP/1.1
Host: www.server.com
Content-Type: Application/XML
Content-Length: 667
<?XML version="1.0" encoding="UTF-8"?>
<main_survey_data_update_response>
    <response_identifier>ID_response_1</response_identifier>
    <status>OK</status>
</main_survey_data_update_response>
```

A custom survey administering server 3404 may send a custom survey request 3429 to a respondent client 3402 (e.g., of a respondent) to administer a survey. For example, the survey may be displayed using an MLUI website, application (e.g., a mobile app), and/or the like. See FIG. 36 for an example of a survey screen that displays information provided in the custom survey request. In one implementation, the custom survey request may include data such as a request identifier, survey questions data, and/or the like. In one embodiment, the custom survey administering server may provide the following example custom survey request, substantially in the form of a HTTP(S) POST message including XML-formatted data, as provided below:

```
POST/custom_survey_request.php HTTP/1.1
Host: www.server.com
Content-Type: Application/XML
Content-Length: 667
<?XML version="1.0" encoding="UTF-8"?>
<custom_survey_request>
    <request_identifier>ID_request_2</request_identifier>
    <survey_questions_data>
      <survey_identifier>ID_survey_2</survey_identifier>
      <survey_question>
        <question_number>Q1</question_number>
        <question_text>When are you most motivated to buy crackers?</question_text>
        <response>Have a craving</response>
        <response>Want my favorite snack</response>
        <response>Need an energy boost</response>
      </survey_question>
      <survey_question>
        <question_number>Q2</question_number>
        <question_text>When do you usually like to eat crackers?</question_text>
        <response>Early morning</response>
        <response>Late morning</response>
        <response>Midday</response>
      </survey_question>
    </survey_questions_data>
</custom_survey_request>
```

The respondent client 3402 may send a custom survey response 3433 to the custom survey administering server 3404 with the respondent's responses to the survey. In one implementation, the custom survey response may include data such as a response identifier, a respondent identifier, survey responses data, and/or the like. In one embodiment, the respondent client may provide the following example custom survey response, substantially in the form of a HTTP(S) POST message including XML-formatted data, as provided below:

```
POST/custom_survey_response.php HTTP/1.1
Host: www.server.com
Content-Type: Application/XML
Content-Length: 667
<?XML version="1.0" encoding="UTF-8"?>
<custom_survey_response>
    <response_identifier>ID_response_2</response_identifier>
    <respondent_identifier>ID_custom_respondent_1</respondent_identifier>
    <survey_responses_data>
      <survey_response>
        <lookup_ID>ID_question_1_reponse_1</lookup_ID>
        <response>1</response>
      </survey_response>
      <survey_response>
        <lookup_ID>ID_question_1_reponse_2</lookup_ID>
        <response>1</response>
      </survey_response>
      <survey_response>
```

```xml
            <lookup_ID>ID_question_1_reponse_3</lookup_ID>
            <response>0</response>
          </survey_response>
          <survey_response>
            <lookup_ID>ID_question_2_reponse_1</lookup_ID>
            <response>0</response>
          </survey_response>
          <survey_response>
            <lookup_ID>ID_question_2_reponse_2</lookup_ID>
            <response>0</response>
          </survey_response>
          <survey_response>
            <lookup_ID>ID_question_2_reponse_3</lookup_ID>
            <response>1</response>
          </survey_response>
        </survey_responses_data>
      </custom_survey_response>
```

The custom survey administering server 3404 may send a custom survey data update request 3437 to the data intake server 3406 to provide updated custom survey data. In one implementation, the custom survey data update request may include data such as a request identifier, custom survey data, and/or the like. In one embodiment, the custom survey administering server may provide the following example custom survey data update request, substantially in the form of a HTTP(S) POST message including XML-formatted data, as provided below:

```
POST/custom_survey_data_update_request.php HTTP/1.1
Host: www.server.com
Content-Type: Application/XML
Content-Length: 667
<?XML version="1.0" encoding="UTF-8"?>
<custom_survey_data_update_request>
  <request_identifier>ID_request_3</request_identifier>
  <custom_survey_data>
    <respondent_response>
      <respondent_identifier>ID_custom_respondent_1</respondent_identifier>
      <survey_response>
        <lookup_ID>ID_question_1_reponse_1</lookup_ID>
        <response>1</response>
      </survey_response>
      <survey_response>
        <lookup_ID>ID_question_1_reponse_2</lookup_ID>
        <response>1</response>
      </survey_response>
      <survey_response>
        <lookup_ID>ID_question_1_reponse_3</lookup_ID>
        <response>0</response>
      </survey_response>
    </respondent_response>
    <respondent_response>
      <respondent_identifier>ID_custom_respondent_2</respondent_identifier>
      <survey_response>
        <lookup_ID>ID_question_1_reponse_1</lookup_ID>
        <response>0</response>
      </survey_response>
      <survey_response>
        <lookup_ID>ID_question_1_reponse_2</lookup_ID>
        <response>0</response>
      </survey_response>
      <survey_response>
        <lookup_ID>ID_question_1_reponse_3</lookup_ID>
        <response>1</response>
      </survey_response>
    </respondent_response>
  </custom_survey_data>
</custom_survey_data_update_request>
```

The data intake server 3406 may send a custom survey data update response 3441 to the custom survey administering server 3404 to confirm receipt of the custom survey data. In one implementation, the custom survey data update response may include data such as a response identifier, a status, and/or the like. In one embodiment, the data intake server may provide the following example custom survey data update response, substantially in the form of a HTTP(S) POST message including XML-formatted data, as provided below:

```
POST/custom_survey_data_update_response.php HTTP/1.1
Host: www.server.com
Content-Type: Application/XML
Content-Length: 667
<?XML version="1.0" encoding="UTF-8"?>
<custom_survey_data_update_response>
  <response_identifier>ID_response_3</response_identifier>
  <status>OK</status>
</custom_survey_data_update_response>
```

A survey data intake (SDI) component 3445 may utilize data provided in the main survey data update request and/or custom survey data update request to update utilized survey data. See FIG. 35 for additional details regarding the SDI component.

In some embodiments, the data intake server 3406 may send a survey data update notification request 3449 to a SQL database server 3410 to inform the SQL database server that utilized survey data has been updated. In one implementation, the survey data update notification request may include data such as a request identifier, modified survey data files, and/or the like. In one embodiment, the data intake server may provide the following example survey data update notification request, substantially in the form of a HTTP(S) POST message including XML-formatted data, as provided below:

```
POST/survey_data_update_notification_request.php HTTP/1.1
Host: www.server.com
Content-Type: Application/XML
Content-Length: 667
<?XML version="1.0" encoding="UTF-8"?>
<survey_data_update_notification_request>
  <request_identifier>ID_request_4</request_identifier>
  <modified_survey_data_files>
    <file>
      <file_name>main_survey_data.csv</file_name>
      <modification_date>2021-01-01</modification_date>
```

```
        </file>
        <file>
            <file_name>custom_survey_data.csv</file_name>
            <modification_date>2021-01-01</modification_date>
        </file>
        <file>
            <file_name>clusters.csv</file_name>
            <modification_date>2021-01-01</modification_date>
        </file>
    </modified_survey_data_files>
</survey_data_update_notification_request>
```

In some embodiments, the SQL database server 3410 may send a survey data update notification response 3453 to the data intake server 3406 to confirm receipt of the survey data update notification request. In one implementation, the survey data update notification response may include data such as a response identifier, a status, and/or the like. In one embodiment, the SQL database server may provide the following example survey data update notification response, substantially in the form of a HTTP(S) POST message including XML-formatted data, as provided below:

```
POST/survey_data_update_notification_response.php HTTP/1.1
Host: www.server.com
Content-Type: Application/XML
Content-Length: 667
<?XML version="1.0" encoding="UTF-8"?>
<survey_data_update_notification_response>
    <response_identifier>ID_response_4</response_identifier>
    <status>OK</status>
</survey_data_update_notification_response>
```

A cognitive intelligence datapoints update (CIDU) component 3457 may utilize the updated survey data to update cognitive intelligence datapoints. See FIG. 38 for additional details regarding the CIDU component.

The SQL database server 3410 may send a survey data request 3461 to the data intake server 3406 to obtain the updated survey data. In one implementation, the survey data request may include data such as a request identifier, requested survey data files, and/or the like. In one embodiment, the SQL database server may provide the following example survey data request, substantially in the form of a HTTP(S) POST message including XML-formatted data, as provided below:

```
POST/survey_data_request.php HTTP/1.1
Host: www.server.com
Content-Type: Application/XML
Content-Length: 667
<?XML version="1.0" encoding="UTF-8"?>
<survey_data_request>
    <request_identifier>ID_request_5</request_identifier>
    <requested_survey_data_files>
        main_survey_data.csv, custom_survey_data.csv, clusters.csv
    </requested_survey_data_files>
</survey_data_request>
```

The data intake server 3406 may send a survey data response 3465 to the SQL database server 3410 with the requested updated survey data. In one implementation, the survey data response may include data such as a response identifier, the requested updated survey data, and/or the like. In one embodiment, the data intake server may provide the following example survey data response, substantially in the form of a HTTP(S) POST message including XML-formatted data, as provided below:

```
POST/survey_data_response.php HTTP/1.1
Host: www.server.com
Content-Type: Application/XML
Content-Length: 667
<?XML version="1.0" encoding="UTF-8"?>
<survey_data_response>
    <response_identifier>ID_response_5</response_identifier>
    <survey_data>contents of main_survey_data.csv</survey_data>
    <survey_data>contents of custom_survey_data.csv</survey_data>
    <survey_data>contents of cLusters.csv</survey_data>
</survey_data_response>
```

The SQL database server 3410 may send a cognitive intelligence (CI) datapoint update request 3469 to a NoSQL database server 3416 to update cached CI datapoints affected by the updated survey data. In one implementation, the CI datapoint update request may include data such as a request identifier, CI datapoint data, and/or the like. In one embodiment, the SQL database server may provide the following example CI datapoint update request, substantially in the form of a HTTP(S) POST message including XML-formatted data, as provided below:

```
POST/CI_datapoint_update_request.php HTTP/1.1
Host: www.server.com
Content-Type: Application/XML
Content-Length: 667
<?XML version="1.0" encoding="UTF-8"?>
<CI_datapoint_update_request>
    <request_identifier>ID_request_6</request_identifier>
    <CI_datapoint>
        <key>{"segment":"Microsegment 1","category":"Demographics"}</key>
        <value>
            [{"module":"Age","data":[{"lookUpId":"205.48.4","displayName":"18-24", "description":" ","percent":3.27,"index":36},{"lookUpId":"205.48.5", "displayName":"25-34", "description":" ","percent":9.35,"index":50}, ... ]},
            {"module":"Gender","data":[{"lookUpId":"205.01.2","displayName":"Female", "description":" ","percent":55,"index":55}, {"lookUpId":"205.01.1", "displayName":"Male","description":" ","percent":45,"index":45}]}, ... ]
        </value>
    </CI_datapoint>
    <CI_datapoint>
        <key>{"segment":"Microsegment 2","category":"Demographics"}</key>
        <value>
        </value>
    </CI_datapoint>
    <CI_datapoint>
        <key>{"segment":"Microsegment 1","category":"Spend Breakdown"}</key>
        <value>
        </value>
    </CI_datapoint>
    <CI_datapoint>
        <key>{"segment":"Microsegment 2","category":"Spend Breakdown"}</key>
```

```
            <value>
            </value>
        </CI_datapoint>
    </CI_datapoint_update_request>
```

The NoSQL database server 3416 may send a CI datapoint update response 3473 to the SQL database server 3410 to confirm that the CI datapoints were updated. In one implementation, the CI datapoint update response may include data such as a response identifier, a status, and/or the like. In one embodiment, the NoSQL database server may provide the following example CI datapoint update response, substantially in the form of a HTTP(S) POST message including XML-formatted data, as provided below:

```
POST/CI_datapoint_update_response.php HTTP/1.1
Host: www.server.com
Content-Type: Application/XML
Content-Length: 667
<?XML version="1.0" encoding="UTF-8"?>
<CI_datapoint_update_response>
    <response_identifier>ID_response_6</response_identifier>
    <status>OK</status>
</CI_datapoint_update_response>
```

A user client 3412 (e.g., of a user) may send a CI question input 3477 to a cognitive intelligence engine server 3414 to request a visualization providing an answer to a CI question. For example, the user client may be a desktop, a laptop, a tablet, a smartphone, a smartwatch, and/or the like that is executing a client application. In one implementation, the CI question input may include data such as a request identifier, user credentials, a CI question identifier, CI question audience segments, CI question parameters, and/or the like. In one embodiment, the user client may provide the following example CI question input, substantially in the form of a HTTP(S) POST message including XML-formatted data, as provided below:

```
POST/authrequest.php HTTP/1.1
Host: www.server.com
Content-Type: Application/XML
Content-Length: 667
<?XML version="1.0" encoding="UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</user_name>
            <password>abc123</password>
            //OPTIONAL <cookie>cookieID</cookie>
            //OPTIONAL
                <digital_cert_link>www.mydigitalcertificate.com/JohnDoeDaDoeDoe@gmail.com/mycertifcate.dc</digital_cert_link>
            //OPTIONAL   <digital_certificate>_DATA_</digital_certificate>
        </user_account_credentials>
    </user_accounts_details>
    <client_details>//iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MLUI.app</app_name>
        <app_version>1.0</app_version>
        <app_webkit_name>Mobile Safari</client_webkit_name>
        <client_version>537.51.2</client_version>
    </client_details>
    <client_details>//iOS Client with Webbrowser
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details>//Android Client with Webbrowser
        <client_IP>10.0.0.123</client_IP>
        <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
```

```
    <client_UDID>FXXXXXXXXX-XXXX-XXXX-
       XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
  </client_details>
  <CI_question_input>
    <request_identifier>ID_request_7</request_identifier>
    <user_identifier>ID_user_1</user_identifier>
    <CI_question_identifier>
       "epic":"Customer   Analytics","category":"Demo-
          graphics","module":"Age"
    </CI_question_identifier>
    <CI_question_audience_segments>ALL</CI_ques-
       tion_audience_segments>
    <CI_question_parameters>
       "chartType":"Horizontal   Bar","valueToSortBy":
          "NA",
       "displayValue":"percent","displayValueOnHover":
          "index"
    </CI_question_parameters>
  </CI_question_input>
</auth_request>
```

A CI question visualization (CIQV) component 3481 may utilize cached CI datapoints to generate a visualization providing an answer to the user's CI question. See FIG. 40 for additional details regarding the CIQV component.

The CI engine server 3414 may send a CI datapoint request 3485 to the NoSQL database server 3416 to retrieve cached CI datapoints utilized to generate the visualization. In one implementation, the CI datapoint request may include data such as a request identifier, a set of CI datapoint identifiers, and/or the like. In one embodiment, the CI engine server may provide the following example CI datapoint request, substantially in the form of a HTTP(S) POST message including XML-formatted data, as provided below:

```
POST/CI_datapoint_request.php HTTP/1.1
Host: www.server.com
Content-Type: Application/XML
Content-Length: 667
<?XML version="1.0" encoding="UTF-8"?>
<CI_datapoint_request>
    <request_identifier>ID_request_8</request_identifier>
    <CI_datapoint_identifier>
       {"segment":"Microsegment  1","category":"Demo-
          graphics"}
    </CI_datapoint_identifier>
    <CI_datapoint_identifier>
       {"segment":"Microsegment  2","category":"Demo-
          graphics"}
    </CI_datapoint_identifier>
</CI_datapoint_request>
```

The NoSQL database server 3416 may send a CI datapoint response 3489 to the CI engine server 3414 with the requested cached CI datapoint data. In one implementation, the CI datapoint response may include data such as a response identifier, the requested cached CI datapoint data, and/or the like. In one embodiment, the NoSQL database server may provide the following example CI datapoint response, substantially in the form of a HTTP(S) POST message including XML-formatted data, as provided below:

```
POST/CI_datapoint_response.php HTTP/1.1
Host: www.server.com
Content-Type: Application/XML
Content-Length: 667
<?XML version="1.0" encoding="UTF-8"?>
<CI_datapoint_response>
    <response_identifier>ID_response_8</response_iden-
       tifier>
    <CI_datapoint>
       <key>{"segment":"Microsegment   1","category":
          "Demographics"}</key>
       <value>
          [{"module":"Age","data":[{"lookUpId":
             "205.48.4","displayName":"18-24", "descrip-
             tion":" ","percent":3.27,"index":36},{"lookU-
             pId":"205.48.5",  "displayName":"25-34",
             "description":"   ","percent":9.35,"index":
             50}, . . . ]},
          {"module":"Gender","data":[{"lookUpId":
             "205.01.2","displayName":"Female",
             "description":"   ","percent":55,"index":55},
             {"lookUpId":"205.01.1",   "displayName":
             "Male","description":" ","percent":45,"index":
             45}]}, . . . ]
       </value>
    </CI_datapoint>
    <CI_datapoint>
       <key>{"segment":"Microsegment   2","category":
          "Demographics"}</key>
       <value>
       </value>
    </CI_datapoint>
</CI_datapoint_response>
```

The CI engine server 3414 may send a CI question output 3493 to the user client 3412 to present the user with the visualization providing the answer to the user's CI question. For example, the visualization may be displayed using an MLUI website, application (e.g., a mobile app), and/or the like. See FIGS. 1-33 for examples of visualizations that may be provided.

FIG. 35 shows a logic flow illustrating embodiments of a survey data intake (SDI) component for the MLUI. In FIG. 35, a survey data update request may be obtained at 3501. For example, the survey data update request may be obtained as a result of a main survey data update request and/or of a custom survey data update request with updated survey data.

A determination may be made at 3505 whether the source of the updated survey data is a main data server (e.g., providing updated main survey data) or a custom data server (e.g., providing updated custom survey data).

If updated main survey data was provided, a main survey data file (e.g., a flat CSV file) may be updated at 3511. For example, an existing flat CSV file stored in Microsoft Azure may be overwritten with an updated flat CSV file (e.g., containing main survey data with response weights) received from the main data server. See FIG. 37, table 3710 for an example of updated main survey data in a main survey data format that may be provided in a flat CSV file.

Respondent microsegments for survey respondents may be generated at 3515. It is to be understood that survey respondents may include main survey respondents associated with the updated main survey data file (e.g., for a survey about crackers) and/or other main survey respondents whose survey response data has not changed (e.g., associated with one or more other main survey data files (e.g., for a survey about cookies, for a survey about biscuits)). In one implementation, a k-means clustering method may be utilized to generate the respondent microsegments. For example, the respondent microsegments may be generated in R using the NbClust package as follows:

```
#Create Clusters
#Set Working Directory (This is where the output file will
   be saved to) setwd("C:/Research")
#Cluster Analysis ClusterData (rows=resp,
   cols=questions & Responses)
ClusterData=read.csv("C:/Research/cluster_
   analysis_ClusterData.csv",
   header=TRUE,
   stringsAsFactors=FALSE,
   sep=",")
)
#Unique respondents
uResp=read.csv("C:/Research/all_respondents.csv",
   header=FALSE,
   stringsAsFactors=FALSE,
   sep=",")
)
set.seed(42) #for reproducibility
#create clusters
k.means.fit <-kmeans(x=ClusterData, centers=30,
   iter.max=50, nstart=15)
#Get cluster number for each respondent
clusters=k.means.fit$cluster
#Create CCP for each respondent
clusterCCPs=paste("MS.MS",clusters,sep=".")
#create final CCP file
cluster_CCPs=data.frame(uResp$V1,clusterCCPs,1)
#write CCP file to csv
write.csv(cluster_CCPs, file="C:/Research/cluster_CCP-
   s.csv", row.names=FALSE)
##***************** Code for Analysis down below
   ********************
#Factor Analysis/Principal Component Analysis
fit=princomp(ClusterData, cor=TRUE)
#look at variance accounted for
print(summary(fit))
#num principal components to use
numComps=27 #70% of variance in data
newDataset=fit$scores[,1:numComps]
#Plot "Elbow" chart of sum of squares and number of
   clusters
#k.means.fit$
wssplot <-function(data, nc=30, seed=42){
   wss <—(nrow(data)−1)*sum(apply(data,2,var))
   for (i in 20:nc){
     set.seed(seed)
     wss[i]<-sum(kmeans(data, centers=i, iter.max=10,
       nstart=15)$withinss)}
   plot(1:nc, wss, type="b", xlab="Number of Clusters",
     ylab="Within groups sum of squares")}
wssplot(ClusterData, nc=30)
set.seed(42)
#Plot axis of 2 principal components and clusters
k.means.fit <-kmeans(x=ClusterData, centers=30,
   iter.max=50, nstart=15)
library(cluster)
clusplot(ClusterData, k.means.fit$cluster, main='2D rep-
   resentation of the Cluster solution',
   color=TRUE, shade=TRUE,
   labels=2, lines=0)

#Use "NbClust" Package to determine number of clusters
   to use
library(NbClust)
set.seed(42)
nc<-NbClust(ClusterData, min.nc=20, max.nc=30,
   method="kmeans")
table(nc$Best.n[1,])
barplot(table(nc$Best.n[1,]),
   xlab="Numer of Clusters", ylab="Number of Criteria",
   main="Number of Clusters Chosen by 26 Criteria")
```

In one implementation, the generated respondent microsegments may be stored in a separate clusters flat CSV file in the main survey data format. The clusters CSV file may treat each cluster identifier as an allowable response question (as discussed with regard to FIG. 37, table 3710). Accordingly, each row of the clusters CSV file may be a (respondent identifier, cluster identifier, 1) tuple.

If updated custom survey data was provided, a raw custom survey data file (e.g., a flat CSV file) may be obtained at 3521. For example, an updated flat CSV file with updated raw custom survey data may be received from the custom data server and stored in Microsoft Azure. In various embodiments, the custom data server may be a custom survey administering server, a third party data server (e.g., with custom third party data), and/or the like. See FIG. 37, table 3701 for an example of updated raw custom survey data that may be provided in a flat CSV file.

The raw custom survey data file may be cleaned up at 3525. In one implementation, the raw custom survey data file may be cleaned up to remove NAs, empty cells, and/or the like types of data that may interfere with transforming raw custom survey data into the main survey data format. For example, the raw custom survey data file may be cleaned up using Excel VBA as follows:

```
Sub MOMO_Survey_Program( )
   UserForm1.Show
End Sub
Private Sub Clean_Questions( )
   ' Clean_Questions Macro
   Columns("C:C").Select
     Selection.SpecialCells(x1CellTypeBlanks).Select
     Selection.EntireRow.Delete
     Range("C1").Select
     Range(Selection, Selection.End(xlDown)).Select
     Selection.Copy
     Sheets("MOME").Select
     Range("D2").Select
     ActiveSheet.Paste
End Sub
Private Sub Change_Zero_Value( )
   ' Change_Zero_Value Macro
     Columns("B:B").Select
     Selection.Replace What:="0", Replacement:="Start-
       NewLabel",                 LookAt:=_xlWhole,
       SearchOrder:=x1ByRows,    MatchCase:=True,
       SearchFormat:=False, _ReplaceFormat:=False
     '    Selection.Replace  What:="StartNewLabel",
       Replacement:="0", LookAt:=_'xlWhole, Sear-
       chOrder:=xlByRows, MatchCase:=True, Search-
       Format:=False, _'ReplaceFormat:=False
End Sub
```

A determination may be made at 3529 whether there remain respondents to analyze. In one implementation, each of the respondents identified in the cleaned up custom survey data file may be analyzed. If there remain custom survey respondents to analyze, the next respondent may be selected for analysis at 3533.

A matching main respondent identifier for the selected custom survey respondent may be determined at 3537. In one embodiment, the matching main respondent identifier may be the main respondent identifier of the best matching main survey respondent. In one implementation, a k-NN lookalike method may be utilized to determine the matching main respondent identifier for the selected custom survey respondent (e.g., based on analysis of respondents' demographic data, which may be provided by respondents as part of respondents' survey responses). For example, the matching main respondent identifier for the selected custom survey respondent may be determined in Python using the sklearn package (e.g., using Euclidean distance, first closest match k=1) as follows:

```
from sklearn.metrics.pairwise import euclidean_distances
from sklearn import preprocessing
import glob
import csv
fileList=glob.glob('temp/*Beauty Female.csv')
d={ }
for filename in fileList:
    print filename
    with open(filename, 'rb') as f:
        reader=csv.reader(f)
        d['base' if ("sim" in filename) else 'check']=list(reader)[1:]
#remove ids
base=list(map(lambda x: x[1:],d['base']))
baseId=list(map(lambda x: x[0],d['base']))
check=list(map(lambda x: x[1:],d['check']))
checkId=list(map(lambda x: x[0],d['check']))
#combine lists then scale
min_max_scaler=preprocessing.MinMaxScaler( )
combine=min_max_scaler.fit_transform(base+check)
#seperate
newBase=combine[:len(base)]
newCheck=combine[len(base):]
euclid=euclidean_distances(newBase,newCheck)
def getMin(index,row):
    return row if index is None or row[1]<index[1] else index
def display((index,row)):
    rMin=reduce(getMin,enumerate(row))
    return (baseId[index],checkId[rMin[0]],rMin[1])
reduced=list(map(display, enumerate(euclid)))
with open('temp/calc/closeBeauty Female.csv', 'wb') as myfile:
    wr=csv.writer(myfile, quoting=csv.QUOTE_ALL)
    wr.writerows([['Main Survey Respondent ID','Custom Survey Respondent ID','euclidean_distances']]+reduced)
```

The selected respondent's custom survey respondent identifier may be replaced with the determined matching main respondent identifier at 3541. For example, if demographic data of the custom survey respondent with custom survey respondent identifier ID_custom_respondent_1 best matches demographic data of the main survey respondent with survey respondent identifier ID_respondent_1, the corresponding Respondent ID field value in the cleaned up CSV file may be changed from ID_custom_respondent_1 to ID_respondent_1. In one implementation, the selected respondent's custom survey respondent identifier may be replaced with the determined matching main respondent identifier by modifying the cleaned up CSV file. For example, the cleaned up CSV file may be modified using Excel VBA as follows:

```
Private Sub Replace_Respondent_ID( )
' Replace_Respondent_ID Macro
    Columns("A:A").Select
    Selection.Replace What:="ID_custom_respondent_1", Replacement:="ID_respondent_1", _LookAt:=xlWhole, SearchOrder:=xlByRows, MatchCase:= True, _SearchFormat:=False, ReplaceFormat:=False
End Sub
```

The custom survey data may be transformed into the main survey data format at 3545. In one embodiment, the main survey data format may be the 3-column format discussed with regard to FIG. 37, table 3710. In one implementation, the custom survey data may be transformed into the main survey data format by assigning each response to each custom survey question a unique identifier and transforming each response to each custom survey question into an allowable response question (as discussed with regard to FIG. 37, table 3710). For example, the custom survey data may be transformed into the main survey data format using Excel VBA as shown in Appendix 1. In one implementation, the transformed custom survey data may be further formatted to facilitate providing answers to CI questions. For example, question names and responses, and corresponding unique IDs may be formatted into a format that is easily readable using Excel VBA as follows:

```
Private Sub SegmentQuestions( )
'SegmentQuestions Macro
Dim StartingCol As Integer
    Sheets("Output File").Select
    Cells(1, 1).Value="Respondent ID"
    Cells(1, 2).Value="CCP"
    Cells(1, 3).Value="Response"
    Sheets("A1").Select
    store=2
    StartFrom=Cells(2, 1).Row
Endhere=Range("A1").End(xlDown).Row
    Cells(1, 1).Select
    'Selection.AutoFilter
    Range(Cells(1, 1), Cells(1, 100)).Select
        Selection.Find(What:="start", After:=ActiveCell, LookIn:=xlFormulas, _LookAt:=xlWhole, SearchOrder:=xlByRows, SearchDirection:= xlNext, _MatchCase:=True, SearchFormat:=False).Activate
        ActiveCell.Select
    StartingCol=ActiveCell.Column+1
    'MsgBox (StartingCol)
    StartingColSave=StartingCol
    Range(Cells(1, 1), Cells(1, 100)).Select
    Selection.Find(What:="rnid", After:=ActiveCell, LookIn:=xlFormulas,_LookAt:=xlWhole, SearchOrder:=xlByRows, SearchDirection:= xlNext, _MatchCase:=True, SearchFormat:= False).Activate ActiveCell.Select
    rnidColumn=ActiveCell.Column
    'ActiveCell.Select
    EndingCol=Cells(1, StartingCol).End(x1ToRight).Column
    FinalRunValue=Range(Cells(1, StartingCol), Cells(1, EndingCol)).Columns.Count
    For grabval=1 To Endhere
    Sheets("A1").Select
    rnidValue=Cells(StartFrom, rnidColumn).Value
    StartingCol=StartingColSave
        For runval=1 To FinalRunValue
        Sheets("A1").Select
        FindAnswer=Cells(StartFrom, StartingCol).Value
        'MsgBox (FindAnswer)
        Sheets("Datamap For Program Use").Select
        ActiveSheet.Range ("$A$1:$F$100000").AutoFilter Field:=6, Criteria1:=runval
```

```
Set rngFound=Sheets("Datamap For Program Use")
    .Range("C:C").Find(What:=FindAnswer,
    LookIn:=xlValues,           LookAt:=xlPart,
    SearchOrder:=xlByRows, SearchDirection:=xlNext,
    MatchCase:=True, SearchFormat:=False)
If Not rngFound Is Nothing Then
    'you found the value—do whatever
        Columns("C:C").Select
        Selection.Find(What:=FindAnswer,  After:=Ac-
            tiveCell,           LookIn:=xlFormulas,
            LookAt            _:=xlWhole,
            SearchOrder:=x1ByRows,
            SearchDirection:=x1Next, MatchCase:=_True,
            SearchFormat:=False).Activate
        'Selection.FindNext(After:=ActiveCell).Activate
        Userow=ActiveCell.Row
        CCPIDGRAB=Cells(Userow, 1).Value
        SegmentMarker=Cells(Userow, 6).Value
'FindAnswerError:
    Sheets("Output File").Select
    Cells(store, 1).Value=rnidValue
    Cells(store, 2).Value=CCPIDGRAB
    Cells(store, 3).Value=FindAnswer
    Cells(store, 5).Value=SegmentMarker
    store=store+1
    'Exit For
    'runval=runval+1
    StartingCol=StartingCol+1
Else
    StartingCol=StartingCol+1
End If
Next runval
    'grabval=grabval+1
StartFrom=StartFrom+1
'MsgBox (StartFrom)
Application.DisplayAlerts=False
ActiveWorkbook.SaveAs "Save Survey Failure" &
    ".xlsm",
FileFormat:=xlOpenXMLWorkbookMacroEnabled
Application.DisplayAlerts=True
Next grabval
End Sub
```

Response weights for the custom survey respondents may be calculated at 3549. In one embodiment, the percentage of respondents having a certain demographic profile may not match the percentage of respondents having that demographic profile in the general population. Accordingly, if a respondent's demographic profile is underrepresented among survey respondents as compared to the general population, the respondent's response may be given a higher weight to account for the difference; and, if a respondent's demographic profile is overrepresented among survey respondents as compared to the general population, the respondent's response may be given a lower weight to account for the difference. In one implementation, response weights may be added to the formatted custom survey data as additional rows as shown with regard to FIG. 37, table 3710 (e.g., identified by resp.weight lookup identifiers with response weights in the Response column).

A custom survey data file (e.g., a flat CSV file) may be updated at 3553. For example, an existing flat CSV file stored in Microsoft Azure may be overwritten with an updated flat CSV file (e.g., containing the formatted custom survey data with response weights). See FIG. 37, table 3710 for an example of updated custom survey data that may be provided in a flat CSV file.

A survey data update notification may be sent at 3561. In one embodiment, the survey data update notification may be sent to a SQL database server to inform the SQL database server that utilized survey data has been updated. It is to be understood that survey data may include the generated respondent microsegments data (e.g., the clusters CSV file). In one implementation, the survey data update notification may be sent via a survey data update notification request.

FIG. 36 shows a screenshot illustrating user interface(s) of the MLUI. In FIG. 36, an exemplary user interface (e.g., for a mobile device, for a website) for displaying a survey to a respondent is illustrated. Screen 3601 shows two survey questions and associated potential responses that may be shown to the respondent. Widget 3605 displays question 1 (e.g., "When are you most motivated to buy crackers?") and the respondent may select up to three potential responses (e.g., response 1—"Have a craving", response 10—"Want to reward myself"). Widget 3610 displays question 2 (e.g., "When do you usually like to eat crackers?") and the respondent may select any number of potential responses (e.g., response 1— "Early morning", response 6— "Late evening").

FIG. 37 shows implementation case(s) for the MLUI. In FIG. 37, table 3701 illustrates an example of raw custom survey data (e.g., for the survey shown in FIG. 36). Each row (e.g., excluding the header row) may represent responses to survey questions provided by a respondent. For example, row 2 may represent responses of respondent 1 with custom survey respondent identifier ID_custom_respondent_1. In another example, row 4 may represent responses of respondent 3 with custom survey respondent identifier ID_custom_respondent_3. Each column (e.g., excluding the column with respondent identifiers) represents respondents' response selections (e.g., 1—selected, 0—not selected). For example, column 2 may represent respondents response selections for survey question 1 response 1 (e.g., Q1r1). In another example, column 17 may represent respondents response selections for survey question 2 response 6 (e.g., Q2r6). Accordingly, with regard to survey question 1, cell (row 2, column 2) shows that respondent 1 selected response 1 (e.g., "Have a craving") and cell (row 2, column 4) shows that respondent 1 did not select response 3 (e.g., "Need an energy boost"); with regard to survey question 2, cell (row 4, column 12) shows that respondent 3 selected response 1 (e.g., "Early morning") and cell (row 4, column 13) shows that respondent 3 did not select response 2 (e.g., "Late morning").

Table 3710 illustrates an example of survey data in main survey data format (e.g., main survey data, custom survey data transformed into main survey data format). In one implementation, the main survey data format may utilize 3 columns: Respondent ID column, Lookup ID column, and Response column. The Respondent ID column may be used to identify a respondent identifier. The Lookup ID column (e.g., except cells with resp.weight lookup identifiers that identify response weights) may be used to identify an allowable response question. An allowable response question may be a Boolean question that indicates whether a respondent selected a particular response to a survey question (e.g., Q1r1 may identify the allowable response question: did a respondent select response 1 to survey question 1; Q2r6 may identify the allowable response question: did a respondent select response 6 to survey question 2). The Response column may be used to identify a response (e.g., 1 may be utilized in cells other than the cells with response weights to facilitate efficient summation calculations). Each row (e.g., excluding the header row and the response weights rows) may identify an allowable response question with response 1 for a respondent (e.g., a particular response to a survey question selected by a respondent). For example, row 2 may show that respondent 1 selected response 1 to survey question 1. In another example, row 3 may show that respondent 1 selected response 2 to survey question 1.

FIG. 38 shows a logic flow illustrating embodiments of a cognitive intelligence datapoints update (CIDU) component for the MLUI. A survey data update may be detected at 3801. In one implementation, the survey data update may be detected based on receipt of a survey data update notification. In another implementation, the survey data update may be detected based on a comparison of the current modification date of a survey data file (e.g., a main survey data file, a custom survey data file) to the last processed modification date. For example, the current modification date may be checked periodically (e.g., nightly), upon each query of a SQL database to access new data, and/or the like.

A determination may be made at 3805 whether the survey data update is associated with the first data upload to the SQL database (e.g., IBM DB2 SQL database). If the survey data update is associated with the first data upload, survey data may be stored in the SQL database at 3809. In one implementation, the survey data may be obtained via a survey data request. For example, the survey data may be stored via an IBM DB2 SQL database command similar to the following:

INSERT INTO Surveys
    (surveyID, surveyRespondentID, surveyAllowableResponseQuestionID, surveyResponse)
    VALUES
        (ID_survey_1, ID_question_1_reponse_1, 1), ID_respondent_1,
        (ID_survey_1, ID_question_1_reponse_2, 1), ID_respondent_1,
        (ID_survey_1, ID_question_2_reponse_3, 1), ID_respondent_1,
        (ID_survey_1, ID_respondent_weight, 45), ID_respondent_1,
        (ID_survey_1, ID_respondent_age_18_24, 1), ID_respondent_1,
        . . .
        (ID_survey_1, ID_respondent_1, ID_respondent_gender_male, 1),
        . . .
        (ID_survey_1, ID_question_1_reponse_3, 1), ID_respondent_2,
        (ID_survey_1, ID_respondent_age_25_34, 1), ID_respondent_2,
        (ID_survey_1, ID_respondent_2, ID_respondent_gender_female, 1),
        . . . ;

In some implementations, the current modification date of the obtained survey data file may be stored in the SQL database as the last processed modification date.

A composite index may be created in the SQL database at 3813. In one embodiment, the composite index of the three columns (e.g., surveyRespondentID, surveyAllowableResponseQuestionID, surveyResponse) may be utilized to optimize database query time (e.g., to reduce query time from 1.5 minutes per query to fewer than 3 seconds per query). In one implementation, the SQL database may update the composite index as new data is uploaded. For example, the composite index may be created via an IBM DB2 SQL database command similar to the following:

CREATE INDEX index_surveys
      ON Surveys (surveyRespondentID, surveyAllowableResponseQuestionID, surveyResponse);

If the survey data update is associated with a subsequent data upload, updated survey data may be stored in the SQL database at 3817. In one implementation, the updated survey data may be obtained via a survey data request. For example, the updated survey data may be stored via an IBM DB2 SQL database command similar to the following:

IF lastModifiedDate <currentModificationDate:
    DELETE FROM Surveys;
    COPY Surveys FROM '/azure_file_path/step/my_file_name.csv' DELIMITER '| |';
    lastModifiedDate=currentModificationDate;

In some implementations, the current modification date of the obtained updated survey data file may be stored in the SQL database as the last processed modification date.

Cognitive intelligence (CI) datapoints to update may be determined at 3821. In one embodiment, a CI datapoint may be a key-value pair, where the key is a CI datapoint identifier that comprises an (audience segment, category) tuple and the value is a CI datapoint value that comprises module data for modules associated with the category. In another embodiment, a CI datapoint may be a key-value pair, where the key is a CI datapoint identifier that comprises an (audience segment, category, module) or (audience segment, module) tuple and the value is a CI datapoint value that comprises module data for the identified module. In one implementation, an audience segment may be overall respondents, a microsegment, a subgroup of overall respondents or of a microsegment (e.g., based on demographic data such as age, gender, zip code, state, income level, etc.; based on association with an entity such as brand, product, ad category, channel, retailer, etc.), and/or the like. In one implementation, a category may specify a section of the MLUI web site or app. In one implementation, module data for a module may comprise a set of metrics (e.g., percentage of respondents and an index) for each allowable response question (e.g., "18-24", "25-34", etc.) utilized by the module (e.g., "Age"—respondent breakdown by age). In one embodiment, a datapoints helper file may be utilized to determine CI datapoints to update (e.g., based on allowable response question identifiers specified in the datapoints helper file (e.g., in the CCP_Vlookup2 column)) In one implementation, the datapoints helper file may contain a list of allowable response questions and audience segments used by the MLUI, along with the topical categories of the allowable response questions and where they should appear on the platform. See FIG. 39 for an example of data that may be provided in a datapoints helper file. In one implementation, CI datapoints to update may be determined as the subset of CI datapoints whose modules data is affected by the survey data update. For example, if the survey data update includes a response by a respondent from the audience segment associated with a CI datapoint, and the response is for an allowable response question utilized by a module of the category associated with the CI datapoint, the CI datapoint may be included in the set of CI datapoints to update.

A determination may be made at 3825 whether there remain CI datapoints to update. It is to be understood that, in some implementations, CI datapoints may be updated in parallel (e.g., CI datapoint calculations, module calculations, allowable response question metric calculations) to reduce processing time. In one implementation, each of the determined CI datapoints to update may be updated. If there remain CI datapoints to update, the next CI datapoint to update may be selected at 3829.

A determination may be made at 3833 whether there remain modules to analyze for the selected CI datapoint. For example, this determination may be made based on data specified in the associated datapoints helper file (e.g., in the Module column). In one implementation, each of the modules associated with the category associated with the selected CI datapoint may be updated. If there remain modules to analyze, the next module to analyze may be selected at 3837.

A determination may be made at 3841 whether there remain allowable response questions to analyze for the selected module. For example, this determination may be made based on data specified in the associated datapoints helper file (e.g., in the CCP_Vlookup2 column) In one implementation, each of the allowable response questions associated with the selected module may be analyzed. If there remain allowable response questions to analyze, the next allowable response question to analyze may be selected at 3845.

A set of metrics for the selected allowable response question may be calculated at 3849. In one implementation, the set of metrics may include a percentage metric, an index metric, and/or the like. For example, the percentage metric may indicate the percentage of the respondents (e.g., weighted based on response weights) in the audience segment associated with the selected CI datapoint who answered the selected allowable response question affirmatively (e.g., response is 1). In another example, the index metric may indicate a normalized value for the selected allowable response question as compared to other allowable response questions associated with the selected module (e.g., weighted based on response weights). In one implementation, the set of metrics for the selected allowable response question may be calculated from the SQL database using JavaScript. For example, the set of metrics for the selected allowable response question may be calculated as follows:

```
'use strict';
const config=require('. . . / . . . /config/
    configLoader').getConfig( )
const
    tableName=config.appConfig.dashDb.table.simmons
    RespondentData.tableName;
const columns=config.appConfig.dashDb.table.simmons
    RespondentData.columns;
const microSegmentTableName=
config.appConfig.dashDb.table.microsegmentRespon-
    dentData.tableName;
const microSegmentColumns=
config.appConfig.dashDb.table.microsegmentRespon-
    dentData.columns;
const sqlUtil=require('. . . /utils/sql-util');
const logger=require('. . . / . . . /server/logger');
const WEIGHT='WEIGHT';
const WEIGHT_LOOK_UP_ID='6.61,4';
module.exports=function(SimmonsAdapter) {
    function getRespondentIdsString(schema, lookUpId) {
        return 'SELECT DISTINCT ${columns.responden-
            tId} FROM ${schema}.${tableName} WHERE
${columns.lookUpId}='${lookUpId}'';
    }
    SimmonsAdapter.query=(query, cb)=>{
        const method='SimmonsAdapter.query';
        const    dashDb=SimmonsAdapter.app.datasources.
            dashDb.connector;
        try {
            dashDb.query(query, (err, result)=>{
                logger.debug('Raw query and response.', {
                    query,
                    result
                }, method);
                if (err) {
                    cb(err);
                } else {
                    cb(null, result);
                }
            });
        } catch (err) {
            cb(err);
        }
    };
SimmonsAdapter.queryAsync=Promise.promisify(Sim-
    monsAdapter.query);
SimmonsAdapter.constructSegmentQuery=(lookUpId,
    filterId, isMicroSegment)=>{
    const
        dashDb=SimmonsAdapter.app.datasources.dashDb.
        connector;
    const schema=dashDb.schema;
    let filterClause, segmentFilterString;
    if (filterId) {
        filterClause='INTERSECT'+getResponden-
            tIdsString(schema, filterId)+'',
    }
    if (!isMicroSegment) {
        segmentFilterString='${columns.respondentId} IN
            (SELECT DISTINCT
${columns.respondentId}                          FROM
    ${schema}.${tableName} WHERE
${columns.lookUpId}='${lookUpId}'$(filterClause})';
    } else {
        segmentFilterString='${columns.respondentId} IN
            (SELECT DISTINCT
${microSegmentColumns.respondentId}        FROM
    ${schema}.${microSegmentTableName} WHERE
${microSegmentColumns.lookUpId}='${lookUpId}'$
    (filterClause})';
    }
    const query='
        SELECT SUM(${columns.data}) AS ${WEIGHT},
            ${sqlUtil.sanitizeInput(filterId)} AS FILTER_ID,
            'N' AS IS_GEN_POP
        FROM ${schema}.${tableName}
        WHERE
            ${columns.lookUpId}='${WEIGHT_LOOK_
                UP_ID}' AND ${segmentFilterString} ';
    return query;
};
function    constructCategoryWeightsQuery(segment-
    LookUpId, categoryDetails, isMicroSegment) {
    const queryList=[ ];
    categoryDetails.forEach((categoryDetail)=>{
        categoryDetail.answers.forEach((answer)=>{
            queryList.push(SimmonsAdapter.constructSeg-
                mentQuery(segmentLookUpId, answer.lookU-
                pId, isMicroSegment));
            queryList.push(SimmonsAdapter.constructGen-
                PopQuery(answer.lookUpId));
        });
    });
```

```
    const queryString=queryList.join('UNION ALL');
    return queryString;
}
SimmonsAdapter.queryCategoryWeights=Promise.
    method((segmentLookUpId, categoryDetails, isMi-
    croSegment)=>{
    const   queryString=constructCategoryWeightsQuery
        (segmentLookUpId, categoryDetails, isMicroSeg-
        ment);
    return Promise.try(( )=>{
    return SimmonsAdapter.queryAsync(queryString);
}).then((results)=>{
    const                 genPopResults=results.filter
        (x=>x.IS_GEN_POP==='Y');
    const                 finalResults=results.filter
        (x=>x.IS_GEN_POP==='N').map((data)=>{
        const genPopWeight=genPopResults.find(x=>{
            return x.FILTER_ID===data.FILTER_ID;
        });
        return {
            weight: data.WEIGHT||0,
            lookUpId: data.FILTER_ID,
            genPopWeight: (genPopWeight||{ }).WEIGHT||0
        };
    });
    return finalResults;
});
});
SimmonsAdapter.constructGenPopQuery=(lookUpId,
    isMicroSegment)=>{const
    dashDb=SimmonsAdapter.app.datasources.dashDb.
    connector;
    const schema=dashDb.schema;
    let filterClause='';
    if (lookUpId) {
        if (!isMicroSegment) {
            filterClause=`AND ${columns.respondentId} IN
                (SELECT DISTINCT ${columns.responden-
                tId}    FROM    ${schema}.${tableName}
                WHERE
                ${columns.lookUpId}='${lookUpId}')`;
        } else {
            filterClause=`AND ${columns.respondentId} IN
                (SELECT DISTINCT ${microSegmentCol-
                umns.respondentId}         FROM
                ${schema}.${microSegmentTableName}
                WHERE    ${microSegmentColumns.lookU-
                pId}=
                '${lookUpId}')`;
        }
    }
    const queryString=
        SELECT SUM(${columns.data}) AS ${WEIGHT},
            ${sqlUtil.sanitizeInput(lookUpId)}    AS    FILT-
            ER_ID, 'Y' AS IS_GEN_POP
        FROM ${schema}.${tableName}
        WHERE
            ${columns.lookUpId}='${WEIGHT_LOOK_
            UP_ID}'$(filterClause)`; return queryString;
};
SimmonsAdapter.getGenPopWeight=Promise.method
    ((lookUpId,           isMicroSegment)=>{const
    queryString=SimmonsAdapter.constructGen
    PopQuery(lookUpId, isMicroSegment); return Sim-
    monsAdapter.queryAsync(queryString)
    .then((results)=>{
    return results[0][WEIGHT]||0;
    });
});
});
};
```

The calculated CI datapoint may be stored (e.g., in JSON format) in a NoSQL database (e.g., IBM Cloudant NoSQL DB) at 3853. In one implementation, the calculated CI datapoint may be stored via a CI datapoint update request. For example, the calculated CI datapoint may be stored as a (CI datapoint identifier, CI datapoint value) key-value pair similar to the following:

CI datapoint identifier
{"segment":"Microsegment 1","category":"Demographics"}

CI datapoint value
[{"module":"Age","data":[{"lookUpId":"205.48.4", "displayName":"18-24", "description":" ","percent": 3.27,"index":36},{"lookUpId":"205.48.5", "displayName":"25-34","description":" ","percent":9.35, "index":50}, . . . ]}
{"module":"Gender","data":[{"lookUpId":"205.01.2", "displayName":"Female", "description":" ","percent": 55,"index":55},{"lookUpId":"205.01.1", "displayName":"Male","description":" ","percent":45,"index": 45}]}, . . . ]

In one embodiment, the NoSQL database may act as cache for the MLUI website, application (e.g., a mobile app), and/or the like. In one implementation, the JavaScript code discussed with regard to 3849 may be used within a batch process JavaScript file that computes multiple allowable response question metrics in parallel and stores the resulting data in JSON format within the NoSQL database. For example, the batch process may be implemented as follows:

```
'use strict';
const logger=require(' . . . / . . . /server/logger');
const retry=require(' . . . /utils/retry');
const MODULE='ProcessSegments';
const_=require('lodash');
let isRunning=false;
/**
 * Upsert and clean up Cloudant database with newly
       processed data.
 * @param {any} docModel the cloudant model, has
       CRUD methods.
 * @param {any} docs new docs to be upserted into
       Cloudant.
 * @returns null
 */
const      updateCloudant=Promise.method((docModel,
    docs)=>{const   method=MODULE++'upsertToClou-
    dant';
    logger.debug('Documents to upsert to Cloudant', {
        numDocs: docs.length
    }, method);
    let orphanedDocs=[ ];
    // Perform batch upserts and then check for any
        orphaned documents that may not be in the dataset.
    return Promise.try(( )=>{
        return   retry(10,   docModel.find.bind(docModel),
            [{fields: ['id', 'category', 'segment']}], 1000);
    }).then((currentDocs)=>{
        orphanedDocs=_.differenceWith(currentDocs, docs,
            (c, d)=>{
            return     d.category===c.category     &&
                d.segment===c.segment;
        });
```

```
logger.info('${orphanedDocs.length} orphans were
    found in existing analytic dataset.', orphanedDocs,
    method);
  return docs;
}).map((doc)=>{
  // Update existing datasets
  const segment=doc.segment;
  const category=doc.category;
  logger.debug('Upserting cloudant document.', {
    segment,
    category
  }, method);
  return retry(10, docModel.upsertWithWhere.bind
    (docModel), [{segment, category}, doc], 1000);
}, {concurrency: 2}).then(( )=>{
  const orphanIds=orphanedDocs.map(o=>o.id);
  if (orphanIds.length) {
    logger.info('Deleting orphaned documents.',
      {orphanIds}, method);
    return Promise.map(orphanIds, (orphanId)=>{
      return retry(10, docModel.destroyById.bind
        (docModel), [orphanId],
        1000)
        .then((deletionResponse)=>{
          logger.info('Deleted Cloudant doc.', {
            id: orphanId,
            deletionResponse
          }, method);
        });
    }, {concurrency: 2});
  }
}).then(( )=>{
  logger.info('Finished upsert and cleaning up Cloudant!', { }, method);
});
});
/**
 * Performs processing of segment/categories.
 * @param {any} app references to the application for
    access to datasources/models.
 * @returns data payload for segmentation weights/
    percentages
 */
const processSegments=(app)=>{
isRunning=true;
const method=MODULE+'.'+'processSegments';
const Segment=app.models.Segment;
const SegmentsHelper=app.models.SimmonsSegments
    HelperAdapter;
const QuestionsHelper=app.models.SimmonsQuestions
    HelperAdapter;
const SegmentChartAnalytics=app.models.SegmentChart
    Analytics;
const startDate=Date.now( )
let numModulesTotal=0;
return Promise.try(( )=>{
  return Promise.join(
    SegmentsHelper.getSegments( )
    QuestionsHelper.getCategories( )
  );
}).spread((segments, categories)=>{
  logger.info('Segments and categories retrieved.', {
    segments,
    categories
  }, method);
  return Promise.map(segments, (segmentObj)=>{
    const segment=segmentObj.name;
    return Promise.map(categories, (categoryObj)=>{
      const category=categoryObj.name;
      const journeyStage=categoryObj.journeyStage;
      let calculationToPerform;
      if (journeyStage==='NA') {
        calculationToPerform=Segment.calculate('IP-
          GM_BATCH_JOB', {
          segment,
          category
        });
      } else {
        calculationToPerform=Segment.calculate('IP-
          GM_BATCH_JOB', {
          segment,
          category,
          journeyStage
        });
      }
      const calStartTime=Date.now( );
      return retry(10, 0=>calculationToPerform, [ ], 100)
        .then((modules)=>{
          if (!Array.isArray(modules)) {
            throw new Error('No modules found.');
          }
          const time=Date.now( )−calStartTime;
          logger.info('Finished processing Segment.', {
            segment,
            category,
            modulesLoaded: modules.length,
            time
          }, method);
          const recordToUpsert={
            segment,
            category,
            modules,
            lastUpdated: (new Date).toISOString( )
          };
          logger.info('Record to add to Cloudant for Segment: '+segment+', Category:'+category,
            recordToUpsert, method);
          return recordToUpsert;
        }).catch((err)=>{
          const time=Date.now( )−calStartTime;
          const info={
            error: err,
            segment,
            category,
            time
          };
          logger.error('Error processing Segment', info,
            method);
          throw err;
        });
    }, {concurrency: 4});
  }, {concurrency: 4});
}).then((recordsToAdd)=>{
  recordsToAdd=[ ].concat( ... recordsToAdd);
  return updateCloudant(SegmentChartAnalytics,
    recordsToAdd);
}).then(( )=>{
  const now=Date.now( )
  logger.info('Finished batch job.', {
    time: now—startDate,
    numModulesTotal
  }, method);
}).catch((err)=>{
  logger.error('Segmentation preprocessing could not be
    completed.', err, method);
```

```
    }).finally(( )=>{
        isRunning=false;
    });
};
module.exports={
    run: Promise.method((app)=>{
        const method=MODULE+'.'+'processSegments';
        if (isRunning) {
            logger.info('Batch job is already running.', { },
                method);
            return {
                status: 'Batch job is already running.'
            };
        }
        processSegments(app);
        return {
            status: 'The job has been started. Please check the
                system logs for more info.'
        };
    })
};
```

FIG. 39 shows implementation case(s) for the MLUI. In FIG. 39, an example of data that may be provided in a datapoints helper file is illustrated. In table 3901, the Journey_Stage column may specify where consumers are engaged (e.g., pre-shop, shop, post-shop), the Category column may specify how (e.g., website sections, app sections) modules should be organized, the Module column may specify visualization types (e.g., "Age"—respondent breakdown by age) used to provide answers to CI questions, the Display_Name column may specify display names (e.g., in the module visualizations) for allowable response questions utilized with regard to CI questions, and the CCP_Vlookup2 column may identify allowable response questions utilized with regard to CI questions.

For example, rows 2-7 may show the configuration for the "Age" module. The associated Journey_Stage cells are set to "NA" indicating that the "Age" module does not utilize journey stage data. The associated Category cells are set to "Demographics" indicating that the "Age" module appears in the "Demographics" category of the MLUI website or app. The associated Module cells are set to "Age" identifying the "Age" visualization type (e.g., each module may be associated with a default chart type (e.g., a horizontal bar chart)). The associated CCP_Vlookup2 cells identify allowable response questions utilized by the module visualization (e.g., bars used in the horizontal bar chart). The associated Display_Name cells specify names for the associated allowable response questions displayed in the module visualization (e.g., labels for the bars).

FIG. 40 shows a logic flow illustrating embodiments of a cognitive intelligence question visualization (CIQV) component for the MLUI. In FIG. 40, a cognitive intelligence (CI) question request may be obtained at 4001. For example, the CI question request may be obtained as a result of a CI question input from a user to obtain a visualization providing an answer to a specified CI question. In one embodiment, a CI question may be a user request for a visualization associated with a specified module in a specified category for a set of specified audience segments.

A determination may be made at 4005 regarding the type of the specified CI question. If the specified CI question is based on internal survey data, a visualization type to utilize may be determined at 4011. For example, the visualization type to utilize may comprise a set of parameters such as a chart type (e.g., a line chart, a bar chart, a star chart, a matrix), a sort by value, a group by value, and/or the like. In one implementation, the CI question request may be parsed (e.g., using PHP commands) to determine the visualization type to utilize (e.g., based on the value of the CI_question_parameters field). In another implementation, a default visualization type associated with the specified module (e.g., specified in the CI_question_identifier field) may be determined.

CI datapoints for the requested visualization may be determined at 4015. In one embodiment, the CI datapoints for the requested visualization may be determined based on a CI question identifier of the specified CI question and/or audience segments (e.g., "Microsegment 1", "Microsegment 2") specified by the user. In one implementation, a CI question identifier may be specified as an (epic, category, module) tuple, where epic may specify a top level section of the MLUI website or app used to organize categories. For example, a CI question identifier may be ("Customer Analytics", "Demographics", "Age"). In one implementation, the CI question request may be parsed (e.g., using PHP commands) to determine the CI question identifier of the specified CI question and/or audience segments specified by the user (e.g., based on the values of the CI_question_identifier and/or CI_question_audience_segments fields). In one implementation, the CI datapoints for the requested visualization may be determined as a set of CI datapoint identifiers corresponding to the requested (audience segment, category) combinations. For example, the CI datapoints for the requested visualization may be determined as a set of CI datapoints with CI datapoint identifiers ("Microsegment 1", "Demographics") and ("Microsegment 2", "Demographics"). In another implementation, the CI datapoints for the requested visualization may be determined as a set of CI datapoint identifiers corresponding to the requested (audience segment, category, module) combinations. For example, the CI datapoints for the requested visualization may be determined as a set of CI datapoints with CI datapoint identifiers ("Microsegment 1", "Demographics", "Age") and ("Microsegment 2", "Demographics", "Age"). In another example, the CI datapoints for the requested visualization may be determined as a set of CI datapoints with CI datapoint identifiers ("Microsegment 1", "Age") and ("Microsegment 2", "Age").

The determined CI datapoints may be retrieved from the NoSQL database at 4019. For example, the determined CI datapoints may be retrieved in JSON format. In one implementation, one or more API calls may be made to the NoSQL database to retrieve the determined CI datapoints (e.g., via a CI datapoint request). For example, a CI datapoint for the requested visualization may be retrieved as follows:

Sample API Call
Request URL: https://CI.mybluemix.net/api/services/ConsumerJourney/calculate
Request Payload: {"segment":"Microsegment 1","storeType":"Any Store","category":"Demographics","epic":"Customer Analytics"}
Sample API Response
(cut-down to only show the "Age" section of the json response)
{"statusCode":200,"result":[{"journeyStage":"NA","category":"Demographics","module":"Age","chartType":"Horizontal-Bar","valueToSortBy":"NA","displayValue":"percent","displayValueOnHover":
"index","displ ayName":"18-24","description":null,"lookUpId":"205.48.4","secondaryCCP":"51.14.0",
"storeType":"Any Store","epic":"Customer Analytics","data":[{"displayName":"18-24","description":" ","percent":3.27,"index":36},{"displayName": "25-34","description":" ","percent":9.35,"index":50}, {"displayName":"35-44","description":" ","percent": 16.97,"index":97},{"displayName":"45-54", "description":" ","percent":19.06,"index":104}, {"displayName":"55-64","description":" ","percent": 32.01,"index":177},{"displayName":"65+", "description":" ", "percent":19.33,"index":106}]}, "message":"Operation successful"}

If the specified CI question is based on external data, external question parameters for an external question may be determined at 4021. In one embodiment, the external question parameters may specify query parameters for an external platform (e.g., an AI platform). In one implementation, the CI question request may be parsed (e.g., using PHP commands) to determine the external question parameters (e.g., based on the value of the CI_question_parameters field). For example, the external question parameters may specify that the user wishes to know about social media sentiment for an entity (e.g., "What is the latest sentiment for Chobani?"). In another example, the external question parameters may specify that the user wishes to generate a persona (e.g., a persona of "Amazon Followers").

Response data for the external question may be obtained from the external platform at 4025. For example, the external question may be provided to an AI platform (e.g., IBM Watson Luci AI). In one implementation, an API call may be made to the external platform to obtain the response data for the external question. For example, the response data for the external question may be obtained as follows:

Sample API Call
Request URL:
https://CI.mybluemix.net/api/services/ Brand?q=What%20is%20the%20latest%20 sentiment%20fo r%20chobani?
Request Payload: q=What%20is%20the%20latest%20sentiment% 20for%20chobani?
Sample API Response
[{"question":"What is the latest sentiment for chobani from 2020-08-01 to 2020-08-31","answer":"{\"ID\": \"39c6bdf5-ed17-414b-8cf7-25f05daaa1c3\",\"position\":0,\"Success\":true,\"ResultHeader\":\"Social Sentiment Analysis of chobani from 2019-04-01 to 2019-04-30\",\"ResultType\":\"SentimentChart\", \"URL\":\"\",\"Text\":\"\",\"PieData\":[{\"value \":\"53.00\",\"label\":\"Social\",\"group\":\"positive\"},{\"value\":\"13.00\",\"label\":\"Social\", \"group\":\"negative\"},{\"value\":\"32.00\",\"label\": \"Social\",\"group\":\"neutral\"}],\"ListNames\": [ ],\"TextData\":\"\",\"Cite\":\"Spinn3r\",\"CompanyID\":\"\",\"Error\":\"\",\"BarVerticleLabel\":\"\", \"confidence\":1.0,\"suggestions\":[ ],\"su ggestionsLookingFor\":[ ],\"lucyQuestionSuggestion\": [ ],\"Question\":\"\",\"QuestionID\": 0,\"TabularData\":[ ],\"Axis_x_title\":\"Domain\",\"Axis_ y_title\":\"Matching Results (%)\",\"LegendList\": [ ],\"Entities\":[ ],\"Concepts\":[ ],\"Taxonomies\": [ ],\"Keywords\": [ ],\"nlcClass\":\"\",\"UniqueID\": \"\",\"total\":0,\"brandinsighflag\":false,\"googleTr endsFlag\":false,\"kantarLexusSnapshotFlag\":false, \"brandList\":[ ],\"combinationChartD ata\":\"\",\"simmonsCite\":\"\"}","answerTYPE":"2","Cite":" ","confidence":1.0,"rnr_answ er":" ","chartLoaded":"no", "tempId":8,"qid":380656,"aid":2292321]

In another example, the response data for the external question may be obtained as follows:
Sample API Call
Request URL: https://CI.mybluemix.net/api/services/Persona
Request Payload: {"name":"Amazon Followers","startDate":"2020-08-01","endDate":"2020-08-31","regions":"ALL-ALL","keyword":"amazon"}
Sample API Response
(cut-down to only show example sections of the json response)
{"stasus": "200", "personaDetail": {"ID": "39496", "Name": "Amazon", "AggregateProfile": {"word_count": 1020, "processed_language": "en", "personality": [{"trait_id": "big5_openness", "name": "Openness", "category": "personality", "percentile": 0.6298227165193789, "raw_score": 0.7592317916691849, "children": [{"trait id": "facet_adventurousness", "name": "Adventurousness", "category": "personality", "percentile": 0.5727226788281445, "raw_score": 0.499930744964173224}, "consumption_preferences": [{"consumption_preference_category_id": "consumption_preferences_shopping", "name": "Purchasing Preferences", "consumption_preferences": [{"consumption_preference_id": "consumption_preferences_automobile_ownership_cost", "name": "Likely to be sensitive to ownership cost when buying automobiles", "score": 1698}, "Archetypes": [{"ID": "540aa704-5cba-4a7a-a424-df900c3558f9", "Name": "The Sage", "Config": {"name": "The Sage", "aka": "mentor, scholar, shaman, thinker", "description": "Sage individuals are most fulfilled by . . . ", "type": "self", "celebrities": "Warren Buffett, Bill Gates, Peter Drucker, Tony Robbins, David Attenborough, Jack Welch, Stephen Hawking", "personalityValues": {"Openness": {"min": 0, "max": 1}, "Adventurousness": {"min": 0, "max": 1}, . . . "socialData": {"tags": [{"name": "momentum(31)", "value": 31, "colorValue": 31}, {"name": "bitcoin(16)", "value": 16, "colorValue": 16}, "socialResults": {"elements": [{"authorId": "brains_", "source": "twitter", "author_name": "Brian S_", "author_handle": "brains_", "author_user_id": "477_", "author link": "https://twitter.com/brians_", "main": "We just WON the first_", "author_gender": "MALE", "tags": [ ], "likes": 9745, "permalink": "https://twitter.com/brians_/status/996_",
"image_src": " ", "date found": "2018-05-16T16:42: 22Z", "sentiment": "POSITIVE", "author_ avatar_img": "https://pbs.twimg.com/profile_images/ 840_/Mcw_bigger.jpg", "profileURL": "https:// twitter.com/brians_/profile_image?size=original", "gender": "MALE", "age": "18-24", "race": "white", "cp_0_0": 1, "cp_0_1": 1, "cp_0_2": 1, "cp_0_3": 1, "cp_0_5": 1, "cp_0_6": 1, "cp_0_10": 1, "cp_0_12": 1, "cp_1_4": 1, "cp_2_0": 1, "cp_4_1": 1, "cp_4_4": 1, "cp_4_5": 1, "cp_4_6": 1, "cp_4_7": 1, "cp_4_8": 1, "cp_4_9": 1, "cp_5_4": 1, "cp_5_6": 1, "cp_5_7": 1, "cp_5_8": 1, "cp_6_0": 1, "cp_6_1": 1, "cp_6_2": 1, "cp_6_4": 1, "cp_6_6": 1, "cp_6_7": 1, "cp_6_8": 1, "cp_7_0": 1, "cp_7_1": 1, "cp_7_2": 1, "cp_8_0": 1, "cp_8_1": 1, "cp_8_2": 1, "cp_8_3": 1}, . . . }

The requested visualization may be generated via a visualization component at 4031. For example, the visualization component may be chart.js, d3.js, Tableau, and/or the like. In one implementation, the requested visualization may be generated in accordance with the determined visualization type using the retrieved CI datapoints (e.g., using data for the module associated with the specified CI question). For example, the visualization component may be instructed to generate a horizontal bar chart with each bar representing an age group. In another implementation, the requested visualization may be generated using the obtained response data for the external question. In some implementations, data provided in the retrieved CI datapoints and/or data provided in the response data for the external question may be filtered, augmented, and/or the like to facilitate generating the requested visualization.

The requested visualization may be provided to the user at 4035. In one implementation, the requested visualization may be provided via a CI question output. For example, the visualization may be displayed using an MLUI website, application (e.g., a mobile app), and/or the like. See FIGS. 1-33 for examples of visualizations that may be provided.

Additional Alternative Embodiment Examples

The following alternative example embodiments provide a number of variations of some of the already discussed principles for expanded color on the abilities of the MLUI.

FIGS. 46-50 show an alternative example architecture for the MLUI.

Additional embodiments may include:
1. A database caching engine apparatus, comprising:
a memory;
a component collection in the memory;
a processor disposed in communication with the memory and configured to issue a plurality of processor-executable instructions from the component collection, the processor-executable instructions configured to:
   detect, via at least one processor, an update to a survey data file, the survey data file configured to include updated survey data comprising any of: ambient social, consumer interaction, point of sale, third party, internet of things, and internal survey data;
   store, via at least one processor, the updated survey data in a SQL database, the SQL database configured to utilize a composite index of the updated survey data that optimizes database query time;
   determine, via at least one processor, the set of affected entity segment identifiers, the set of affected entity segment identifiers configured to include a respective entity segment identifier upon determining that the updated survey data includes a respondent identifier associated with the respective entity segment identifier, an entity segment identifier configured to identify an entity comprising any of: person, item of manufacture, service, asset, brand, ad, category of manufacture, category of service, category of person, demographic, sentiment;
   determine, via at least one processor, a set of affected category identifiers, the set of affected category identifiers configured to include a respective category identifier upon determining that the updated survey data includes an allowable response question identifier associated with the respective category identifier;
   determine, via at least one processor, a set of affected cognitive intelligence (CI) datapoint identifiers, the set of affected CI datapoint identifiers configured to include CI datapoint identifiers associated with each combination of: an affected entity segment identifier and an affected category identifier;
   instantiate, via at least one processor, a set of cache datastructures, the set of cache datastructures configured to include a cache datastructure for each affected CI datapoint identifier, a cache datastructure configured as a key-value pair comprising an associated affected CI datapoint identifier and a CI datapoint value corresponding to the associated affected CI datapoint identifier;
   calculate, via at least one processor, a set of metrics for each allowable response question identifier associated with each affected CI datapoint identifier using the updated survey data; and
   store, via a cache datastructure via at least one processor, the calculated metrics for each affected CI datapoint identifier in a NoSQL database, the NoSQL database configured to act as cache for generating visualizations.

2. The apparatus of embodiment 1, further, comprising:
the instructions to detect the update to the survey data file are configured to comprise instructions to detect the update to the survey data file based on an update notification.

3. The apparatus of embodiment 1, further, comprising:
the instructions to detect the update to the survey data file are configured to comprise instructions to detect the update to the survey data file based on a periodic check of modification date of the survey data file.

4. The apparatus of embodiment 1, further, comprising:
the composite index is configured as an index on the combination of: a respondent identifier, an allowable response question identifier, and a response.

5. The apparatus of embodiment 1, further, comprising:
a category identifier is configured to identify a user interface section.

6. The apparatus of embodiment 1, further, comprising:
a category identifier is configured to be associated with a set of module identifiers, each module identifier is configured to be associated with a set of allowable response question identifiers.

7. The apparatus of embodiment 6, further, comprising:
a CI datapoint identifier is configured to comprise an entity segment identifier and a category identifier.

8. The apparatus of embodiment 7, further, comprising:
the instructions to store the calculated metrics for an affected CI datapoint identifier in the NoSQL database are configured to comprise instructions to store a cache datastructure corresponding to the affected CI datapoint identifier, the CI datapoint value corresponding to the affected CI datapoint identifier configured to store the calculated metrics for the affected CI datapoint identifier.

9. The apparatus of embodiment 8, further, comprising:
a CI datapoint value is configured as a datastructure comprising a set of module datastructures, each module datastructure corresponding to a module identifier associated with the category identifier specified as part of the affected CI datapoint identifier, each module datastructure comprising a set of metric datastructures, each metric datastructure corresponding to a calculated metric for an allowable response question identifier associated with a respective module datastructure's module identifier.

10. The apparatus of embodiment 9, further, comprising:
each calculated metric is configured to be calculated using the updated survey data associated with the entity segment identifier specified as part of the affected CI datapoint identifier.

11. The apparatus of embodiment 8, further, comprising:
the CI datapoint value is configured to be stored in JSON format.

12. The apparatus of embodiment 1, further, comprising:
the survey data file is configured as a flat CSV file.

13. The apparatus of embodiment 1, further, comprising:
the processor-executable instructions configured to:
  obtain, via at least one processor, a raw custom survey data file, the raw custom survey data file configured to identify each respondent using a custom survey entity identifier;
  determine, via at least one processor, a matching main respondent identifier for each respondent; and
  transform, via at least one processor, the raw custom survey data file into the survey data file by replacing each respondent's custom survey entity identifier with the determined matching main respondent identifier.

14. The apparatus of embodiment 13, further, comprising:
a matching main respondent identifier for a respondent is configured to be determined using a k-NN lookalike method based on analysis of respondents' demographic data.

15. The apparatus of embodiment 13, further, comprising:
the instructions to transform the raw custom survey data file into the survey data file are configured to comprise instructions to transform each response to each custom survey question into an allowable response question.

16. A database caching engine processor-readable, non-transient medium, comprising processor-executable instructions configured to:
  detect, via at least one processor, an update to a survey data file, the survey data file configured to include updated survey data comprising any of: ambient social, consumer interaction, point of sale, third party, internet of things, and internal survey data;
  store, via at least one processor, the updated survey data in a SQL database, the SQL database configured to utilize a composite index of the updated survey data that optimizes database query time;
  determine, via at least one processor, a set of affected entity segment identifiers, the set of affected entity segment identifiers configured to include a respective entity segment identifier upon determining that the updated survey data includes a respondent identifier associated with the respective entity segment identifier, an entity segment identifier configured to identify an entity comprising any of: person, item of manufacture, service, asset, brand, ad, category of manufacture, category of service, category of person, demographic, sentiment;
  determine, via at least one processor, a set of affected category identifiers, the set of affected category identifiers configured to include a respective category identifier upon determining that the updated survey data includes an allowable response question identifier associated with the respective category identifier;
  determine, via at least one processor, a set of affected cognitive intelligence (CI) datapoint identifiers, the set of affected CI datapoint identifiers configured to include CI datapoint identifiers associated with each combination of: an affected entity segment identifier and an affected category identifier;
  instantiate, via at least one processor, a set of cache datastructures, the set of cache datastructures configured to include a cache datastructure for each affected CI datapoint identifier, a cache datastructure configured as a key-value pair comprising an associated affected CI datapoint identifier and a CI datapoint value corresponding to the associated affected CI datapoint identifier;
  calculate, via at least one processor, a set of metrics for each allowable response question identifier associated with each affected CI datapoint identifier using the updated survey data; and
  store, via a cache datastructure via at least one processor, the calculated metrics for each affected CI datapoint identifier in a NoSQL database, the NoSQL database configured to act as cache for generating visualizations.

17. The medium of embodiment 16, further, comprising:
the instructions to detect the update to the survey data file are configured to comprise instructions to detect the update to the survey data file based on an update notification.

18. The medium of embodiment 16, further, comprising:
the instructions to detect the update to the survey data file are configured to comprise instructions to detect the update to the survey data file based on a periodic check of modification date of the survey data file.

19. The medium of embodiment 16, further, comprising:
the composite index is configured as an index on the combination of: a respondent identifier, an allowable response question identifier, and a response.

20. The medium of embodiment 16, further, comprising:
a category identifier is configured to identify a user interface section.

21. The medium of embodiment 16, further, comprising:
a category identifier is configured to be associated with a set of module identifiers, each module identifier is configured to be associated with a set of allowable response question identifiers.

22. The medium of embodiment 21, further, comprising:
a CI datapoint identifier is configured to comprise an entity segment identifier and a category identifier.

23. The medium of embodiment 22, further, comprising:
the instructions to store the calculated metrics for an affected CI datapoint identifier in the NoSQL database are configured to comprise instructions to store a cache datastructure corresponding to the affected CI datapoint identifier, the CI datapoint value corresponding to the affected CI datapoint identifier configured to store the calculated metrics for the affected CI datapoint identifier.

24. The medium of embodiment 23, further, comprising:
a CI datapoint value is configured as a datastructure comprising a set of module datastructures, each module datastructure corresponding to a module identifier associated with the category identifier specified as part of the affected CI datapoint identifier, each module datastructure comprising a set of metric datastructures, each metric datastructure corresponding to a calculated metric for an allowable response question identifier associated with a respective module datastructure's module identifier.

25. The medium of embodiment 24, further, comprising:
each calculated metric is configured to be calculated using the updated survey data associated with the entity segment identifier specified as part of the affected CI datapoint identifier.

26. The medium of embodiment 23, further, comprising:
the CI datapoint value is configured to be stored in JSON format.

27. The medium of embodiment 16, further, comprising:
the survey data file is configured as a flat CSV file.

28. The medium of embodiment 16, further, comprising:
the processor-executable instructions configured to:
  obtain, via at least one processor, a raw custom survey data file, the raw custom survey data file configured to identify each respondent using a custom survey entity identifier;

determine, via at least one processor, a matching main respondent identifier for each respondent; and transform, via at least one processor, the raw custom survey data file into the survey data file by replacing each respondent's custom survey entity identifier with the determined matching main respondent identifier.

29. The medium of embodiment 28, further, comprising:

a matching main respondent identifier for a respondent is configured to be determined using a k-NN lookalike method based on analysis of respondents' demographic data.

30. The medium of embodiment 28, further, comprising:

the instructions to transform the raw custom survey data file into the survey data file are configured to comprise instructions to transform each response to each custom survey question into an allowable response question.

31. A database caching engine processor-implemented system, comprising:

means to process processor-executable instructions;

means to issue processor-issuable instructions from a processor-executable component collection via the means to process processor-executable instructions, the processor-issuable instructions configured to:

detect, via at least one processor, an update to a survey data file, the survey data file configured to include updated survey data comprising any of: ambient social, consumer interaction, point of sale, third party, internet of things, and internal survey data;

store, via at least one processor, the updated survey data in a SQL database, the SQL database configured to utilize a composite index of the updated survey data that optimizes database query time;

determine, via at least one processor, a set of affected entity segment identifiers, the set of affected entity segment identifiers configured to include a respective entity segment identifier upon determining that the updated survey data includes a respondent identifier associated with the respective entity segment identifier, an entity segment identifier configured to identify an entity comprising any of: person, item of manufacture, service, asset, brand, ad, category of manufacture, category of service, category of person, demographic, sentiment;

determine, via at least one processor, a set of affected category identifiers, the set of affected category identifiers configured to include a respective category identifier upon determining that the updated survey data includes an allowable response question identifier associated with the respective category identifier;

determine, via at least one processor, a set of affected cognitive intelligence (CI) datapoint identifiers, the set of affected CI datapoint identifiers configured to include CI datapoint identifiers associated with each combination of: an affected entity segment identifier and an affected category identifier;

instantiate, via at least one processor, a set of cache datastructures, the set of cache datastructures configured to include a cache datastructure for each affected CI datapoint identifier, a cache datastructure configured as a key-value pair comprising an associated affected CI datapoint identifier and a CI datapoint value corresponding to the associated affected CI datapoint identifier;

calculate, via at least one processor, a set of metrics for each allowable response question identifier associated with each affected CI datapoint identifier using the updated survey data; and store, via a cache datastructure via at least one processor, the calculated metrics for each affected CI datapoint identifier in a NoSQL database, the NoSQL database configured to act as cache for generating visualizations.

32. The system of embodiment 31, further, comprising:

the instructions to detect the update to the survey data file are configured to comprise instructions to detect the update to the survey data file based on an update notification.

33. The system of embodiment 31, further, comprising:

the instructions to detect the update to the survey data file are configured to comprise instructions to detect the update to the survey data file based on a periodic check of modification date of the survey data file.

34. The system of embodiment 31, further, comprising:

the composite index is configured as an index on the combination of: a respondent identifier, an allowable response question identifier, and a response.

35. The system of embodiment 31, further, comprising:

a category identifier is configured to identify a user interface section.

36. The system of embodiment 31, further, comprising:

a category identifier is configured to be associated with a set of module identifiers, each module identifier is configured to be associated with a set of allowable response question identifiers.

37. The system of embodiment 36, further, comprising:

a CI datapoint identifier is configured to comprise an entity segment identifier and a category identifier.

38. The system of embodiment 37, further, comprising:

the instructions to store the calculated metrics for an affected CI datapoint identifier in the NoSQL database are configured to comprise instructions to store a cache datastructure corresponding to the affected CI datapoint identifier, the CI datapoint value corresponding to the affected CI datapoint identifier configured to store the calculated metrics for the affected CI datapoint identifier.

39. The system of embodiment 38, further, comprising:

a CI datapoint value is configured as a datastructure comprising a set of module datastructures, each module datastructure corresponding to a module identifier associated with the category identifier specified as part of the affected CI datapoint identifier, each module datastructure comprising a set of metric datastructures, each metric datastructure corresponding to a calculated metric for an allowable response question identifier associated with a respective module datastructure's module identifier.

40. The system of embodiment 39, further, comprising:

each calculated metric is configured to be calculated using the updated survey data associated with the entity segment identifier specified as part of the affected CI datapoint identifier.

41. The system of embodiment 38, further, comprising:

the CI datapoint value is configured to be stored in JSON format.

42. The system of embodiment 31, further, comprising:

the survey data file is configured as a flat CSV file.

43. The system of embodiment 31, further, comprising:

the processor-executable instructions configured to:

obtain, via at least one processor, a raw custom survey data file, the raw custom survey data file configured to identify each respondent using a custom survey entity identifier;

determine, via at least one processor, a matching main respondent identifier for each respondent; and transform, via at least one processor, the raw custom survey data file into the survey data file by replacing each respondent's custom survey entity identifier with the determined matching main respondent identifier.

44. The system of embodiment 43, further, comprising:
a matching main respondent identifier for a respondent is configured to be determined using a k-NN lookalike method based on analysis of respondents' demographic data.

45. The system of embodiment 43, further, comprising:
the instructions to transform the raw custom survey data file into the survey data file are configured to comprise instructions to transform each response to each custom survey question into an allowable response question.

46. A database caching engine processor-implemented process, comprising executing processor-executable instructions to:
detect, via at least one processor, an update to a survey data file, the survey data file configured to include updated survey data comprising any of: ambient social, consumer interaction, point of sale, third party, internet of things, and internal survey data;
store, via at least one processor, the updated survey data in a SQL database, the SQL database configured to utilize a composite index of the updated survey data that optimizes database query time;
determine, via at least one processor, a set of affected entity segment identifiers, the set of affected entity segment identifiers configured to include a respective entity segment identifier upon determining that the updated survey data includes a respondent identifier associated with the respective entity segment identifier, an entity segment identifier configured to identify an entity comprising any of: person, item of manufacture, service, asset, brand, ad, category of manufacture, category of service, category of person, demographic, sentiment;
determine, via at least one processor, a set of affected category identifiers, the set of affected category identifiers configured to include a respective category identifier upon determining that the updated survey data includes an allowable response question identifier associated with the respective category identifier;
determine, via at least one processor, a set of affected cognitive intelligence (CI) datapoint identifiers, the set of affected CI datapoint identifiers configured to include CI datapoint identifiers associated with each combination of: an affected entity segment identifier and an affected category identifier;
instantiate, via at least one processor, a set of cache datastructures, the set of cache datastructures configured to include a cache datastructure for each affected CI datapoint identifier, a cache datastructure configured as a key-value pair comprising an associated affected CI datapoint identifier and a CI datapoint value corresponding to the associated affected CI datapoint identifier;
calculate, via at least one processor, a set of metrics for each allowable response question identifier associated with each affected CI datapoint identifier using the updated survey data; and
store, via a cache datastructure via at least one processor, the calculated metrics for each affected CI datapoint identifier in a NoSQL database, the NoSQL database configured to act as cache for generating visualizations.

47. The process of embodiment 46, further, comprising:
the instructions to detect the update to the survey data file are configured to comprise instructions to detect the update to the survey data file based on an update notification.

48. The process of embodiment 46, further, comprising:
the instructions to detect the update to the survey data file are configured to comprise instructions to detect the update to the survey data file based on a periodic check of modification date of the survey data file.

49. The process of embodiment 46, further, comprising:
the composite index is configured as an index on the combination of: a respondent identifier, an allowable response question identifier, and a response.

50. The process of embodiment 46, further, comprising:
a category identifier is configured to identify a user interface section.

51. The process of embodiment 46, further, comprising:
a category identifier is configured to be associated with a set of module identifiers, each module identifier is configured to be associated with a set of allowable response question identifiers.

52. The process of embodiment 51, further, comprising:
a CI datapoint identifier is configured to comprise an entity segment identifier and a category identifier.

53. The process of embodiment 52, further, comprising:
the instructions to store the calculated metrics for an affected CI datapoint identifier in the NoSQL database are configured to comprise instructions to store a cache datastructure corresponding to the affected CI datapoint identifier, the CI datapoint value corresponding to the affected CI datapoint identifier configured to store the calculated metrics for the affected CI datapoint identifier.

54. The process of embodiment 53, further, comprising:
a CI datapoint value is configured as a datastructure comprising a set of module datastructures, each module datastructure corresponding to a module identifier associated with the category identifier specified as part of the affected CI datapoint identifier, each module datastructure comprising a set of metric datastructures, each metric datastructure corresponding to a calculated metric for an allowable response question identifier associated with a respective module datastructure's module identifier.

55. The process of embodiment 54, further, comprising:
each calculated metric is configured to be calculated using the updated survey data associated with the entity segment identifier specified as part of the affected CI datapoint identifier.

56. The process of embodiment 53, further, comprising:
the CI datapoint value is configured to be stored in JSON format.

57. The process of embodiment 46, further, comprising:
the survey data file is configured as a flat CSV file.

58. The process of embodiment 46, further, comprising:
the processor-executable instructions configured to:
obtain, via at least one processor, a raw custom survey data file, the raw custom survey data file configured to identify each respondent using a custom survey entity identifier;
determine, via at least one processor, a matching main respondent identifier for each respondent; and
transform, via at least one processor, the raw custom survey data file into the survey data file by replacing each respondent's custom survey entity identifier with the determined matching main respondent identifier.

59. The process of embodiment 58, further, comprising:
a matching main respondent identifier for a respondent is configured to be determined using a k-NN lookalike method based on analysis of respondents' demographic data.

60. The process of embodiment 58, further, comprising:
the instructions to transform the raw custom survey data file into the survey data file are configured to comprise instructions to transform each response to each custom survey question into an allowable response question.

101. A cognitive intelligence visualization engine apparatus, comprising:
a memory;
a component collection in the memory;
a processor disposed in communication with the memory and configured to issue a plurality of processor-executable instructions from the component collection, the processor-executable instructions configured to:
  obtain, via at least one processor, a category identifier selection via a category selection interaction interface mechanism;
  obtain, via at least one processor, a first entity segment identifier selection via a first entity segment selection interaction interface mechanism;
  obtain, via at least one processor, a second entity segment identifier selection via a second entity segment selection interaction interface mechanism;
  determine, via at least one processor, a set of visualization cognitive intelligence (CI) datapoint identifiers, the set of visualization CI datapoint identifiers configured to include CI datapoint identifiers associated with each combination of: a selected entity segment identifier and the selected category identifier;
  retrieve, via at least one processor, for each CI datapoint identifier in the set of visualization CI datapoint identifiers, a CI datapoint value corresponding to the respective CI datapoint identifier from a NoSQL database via a cache datastructure, the NoSQL database configured to act as cache for generating visualizations based on metrics calculated using survey data, a cache datastructure configured as a key-value pair comprising an associated CI datapoint identifier and a CI datapoint value corresponding to the associated CI datapoint identifier;
  generate, via a cache datastructure via at least one processor, a visualization using the retrieved CI datapoint values, the visualization configured to display a set of metrics, for a set of utilized allowable response question identifiers associated with the selected category identifier, for each selected entity segment identifier.

102. The apparatus of embodiment 101, further, comprising:
a category identifier is configured to identify a user interface section.

103. The apparatus of embodiment 101, further, comprising:
an entity segment identifier is configured to identify an entity comprising any of: person, item of manufacture, service, asset, brand, ad, category of manufacture, category of service, category of person, demographic, sentiment.

104. The apparatus of embodiment 101, further, comprising:
the processor-executable instructions configured to:
  obtain, via at least one processor, a third entity segment identifier selection via a third entity segment selection interaction interface mechanism.

105. The apparatus of embodiment 101, further, comprising:
a CI datapoint identifier is configured to comprise an entity segment identifier and a category identifier.

106. The apparatus of embodiment 105, further, comprising:
a CI datapoint value is configured as a datastructure comprising a set of module datastructures, each module datastructure corresponding to a module identifier associated with the category identifier specified as part of the associated CI datapoint identifier, each module datastructure comprising a set of metric datastructures, each metric datastructure corresponding to a set of calculated metrics, for an allowable response question identifier associated with the respective module datastructure's module identifier, for an entity segment identifier specified as part of the associated CI datapoint identifier.

107. The apparatus of embodiment 106, further, comprising:
a CI datapoint value is configured to be stored in the NoSQL database in JSON format.

108. The apparatus of embodiment 101, further, comprising:
the survey data is configured to comprise any of: ambient social, consumer interaction, point of sale, third party, internet of things, and internal survey data.

109. The apparatus of embodiment 101, further, comprising:
the processor-executable instructions configured to:
  determine, via at least one processor, a set of module identifiers associated with the selected category identifier;
  obtain, via at least one processor, a module identifier selection via a module selection interaction interface mechanism, the module selection interaction interface mechanism configured to facilitate selection of a module identifier from the set of module identifiers associated with the selected category identifier; and
  determine, via at least one processor, the set of utilized allowable response question identifiers as a set of allowable response question identifiers associated with the selected module identifier.

110. The apparatus of embodiment 109, further, comprising:
the processor-executable instructions configured to:
  obtain, via at least one processor, a second module identifier selection via the module selection interaction interface mechanism;
  determine, via at least one processor, a second set of utilized allowable response question identifiers as a set of allowable response question identifiers associated with the selected second module identifier; and
  generate, via a cache datastructure via at least one processor, a second visualization using the retrieved CI datapoint values, the second visualization configured to display a second set of metrics, for the second set of utilized allowable response question identifiers associated with the selected category identifier, for each selected entity segment identifier.

111. A cognitive intelligence visualization engine processor-readable, non-transient medium, comprising processor-executable instructions configured to:
  obtain, via at least one processor, a category identifier selection via a category selection interaction interface mechanism;
  obtain, via at least one processor, a first entity segment identifier selection via a first entity segment selection interaction interface mechanism;
  obtain, via at least one processor, a second entity segment identifier selection via a second entity segment selection interaction interface mechanism;
  determine, via at least one processor, a set of visualization cognitive intelligence (CI) datapoint identifiers, the set of visualization CI datapoint identifiers configured to include CI datapoint identifiers associated with each combination of: a selected entity segment identifier and the selected category identifier;
  retrieve, via at least one processor, for each CI datapoint identifier in the set of visualization CI datapoint identifiers, a CI datapoint value corresponding to the respective CI datapoint identifier from a NoSQL database via a cache datastructure, the NoSQL database configured to act as cache for generating visualizations based on metrics calculated using survey data, a cache datastructure configured as a key-value pair comprising an associated CI datapoint identifier and a CI datapoint value corresponding to the associated CI datapoint identifier;

generate, via a cache datastructure via at least one processor, a visualization using the retrieved CI datapoint values, the visualization configured to display a set of metrics, for a set of utilized allowable response question identifiers associated with the selected category identifier, for each selected entity segment identifier.

112. The medium of embodiment 111, further, comprising: a category identifier is configured to identify a user interface section.

113. The medium of embodiment 111, further, comprising: an entity segment identifier is configured to identify an entity comprising any of: person, item of manufacture, service, asset, brand, ad, category of manufacture, category of service, category of person, demographic, sentiment.

114. The medium of embodiment 111, further, comprising: the processor-executable instructions configured to:
obtain, via at least one processor, a third entity segment identifier selection via a third entity segment selection interaction interface mechanism.

115. The medium of embodiment 111, further, comprising: a CI datapoint identifier is configured to comprise an entity segment identifier and a category identifier.

116. The medium of embodiment 115, further, comprising: a CI datapoint value is configured as a datastructure comprising a set of module datastructures, each module datastructure corresponding to a module identifier associated with the category identifier specified as part of the associated CI datapoint identifier, each module datastructure comprising a set of metric datastructures, each metric datastructure corresponding to a set of calculated metrics, for an allowable response question identifier associated with the respective module datastructure's module identifier, for an entity segment identifier specified as part of the associated CI datapoint identifier.

117. The medium of embodiment 116, further, comprising: a CI datapoint value is configured to be stored in the NoSQL database in JSON format.

118. The medium of embodiment 111, further, comprising: the survey data is configured to comprise any of: ambient social, consumer interaction, point of sale, third party, internet of things, and internal survey data.

119. The medium of embodiment 111, further, comprising: the processor-executable instructions configured to:
determine, via at least one processor, a set of module identifiers associated with the selected category identifier;
obtain, via at least one processor, a module identifier selection via a module selection interaction interface mechanism, the module selection interaction interface mechanism configured to facilitate selection of a module identifier from the set of module identifiers associated with the selected category identifier; and
determine, via at least one processor, the set of utilized allowable response question identifiers as a set of allowable response question identifiers associated with the selected module identifier.

120. The medium of embodiment 119, further, comprising: the processor-executable instructions configured to:
obtain, via at least one processor, a second module identifier selection via the module selection interaction interface mechanism;
determine, via at least one processor, a second set of utilized allowable response question identifiers as a set of allowable response question identifiers associated with the selected second module identifier; and
generate, via a cache datastructure via at least one processor, a second visualization using the retrieved CI datapoint values, the second visualization configured to display a second set of metrics, for the second set of utilized allowable response question identifiers associated with the selected category identifier, for each selected entity segment identifier.

121. A cognitive intelligence visualization engine processor-implemented system, comprising: means to process processor-executable instructions;
means to issue processor-issuable instructions from a processor-executable component collection via the means to process processor-executable instructions, the processor-issuable instructions configured to:
obtain, via at least one processor, a category identifier selection via a category selection interaction interface mechanism;
obtain, via at least one processor, a first entity segment identifier selection via a first entity segment selection interaction interface mechanism;
obtain, via at least one processor, a second entity segment identifier selection via a second entity segment selection interaction interface mechanism;
determine, via at least one processor, a set of visualization cognitive intelligence (CI) datapoint identifiers, the set of visualization CI datapoint identifiers configured to include CI datapoint identifiers associated with each combination of: a selected entity segment identifier and the selected category identifier;
retrieve, via at least one processor, for each CI datapoint identifier in the set of visualization CI datapoint identifiers, a CI datapoint value corresponding to the respective CI datapoint identifier from a NoSQL database via a cache datastructure, the NoSQL database configured to act as cache for generating visualizations based on metrics calculated using survey data, a cache datastructure configured as a key-value pair comprising an associated CI datapoint identifier and a CI datapoint value corresponding to the associated CI datapoint identifier;
generate, via a cache datastructure via at least one processor, a visualization using the retrieved CI datapoint values, the visualization configured to display a set of metrics, for a set of utilized allowable response question identifiers associated with the selected category identifier, for each selected entity segment identifier.

122. The system of embodiment 121, further, comprising: a category identifier is configured to identify a user interface section.

123. The system of embodiment 121, further, comprising: an entity segment identifier is configured to identify an entity comprising any of: person, item of manufacture, service, asset, brand, ad, category of manufacture, category of service, category of person, demographic, sentiment.

124. The system of embodiment 121, further, comprising:
the processor-executable instructions configured to:
obtain, via at least one processor, a third entity segment identifier selection via a third entity segment selection interaction interface mechanism.

125. The system of embodiment 121, further, comprising:
a CI datapoint identifier is configured to comprise an entity segment identifier and a category identifier.

126. The system of embodiment 125, further, comprising:
a CI datapoint value is configured as a datastructure comprising a set of module datastructures, each module datastructure corresponding to a module identifier associated with the category identifier specified as part of the associated CI datapoint identifier, each module datastructure comprising a set of metric datastructures, each metric datastructure corresponding to a set of calculated metrics, for an allowable response question identifier associated with the respective module datastructure's module identifier, for an entity segment identifier specified as part of the associated CI datapoint identifier.

127. The system of embodiment 126, further, comprising:
a CI datapoint value is configured to be stored in the NoSQL database in JSON format.

128. The system of embodiment 121, further, comprising:
the survey data is configured to comprise any of: ambient social, consumer interaction, point of sale, third party, internet of things, and internal survey data.

129. The system of embodiment 121, further, comprising:
the processor-executable instructions configured to:
determine, via at least one processor, a set of module identifiers associated with the selected category identifier;
obtain, via at least one processor, a module identifier selection via a module selection interaction interface mechanism, the module selection interaction interface mechanism configured to facilitate selection of a module identifier from the set of module identifiers associated with the selected category identifier; and
determine, via at least one processor, the set of utilized allowable response question identifiers as a set of allowable response question identifiers associated with the selected module identifier.

130. The system of embodiment 129, further, comprising:
the processor-executable instructions configured to:
obtain, via at least one processor, a second module identifier selection via the module selection interaction interface mechanism;
determine, via at least one processor, a second set of utilized allowable response question identifiers as a set of allowable response question identifiers associated with the selected second module identifier; and
generate, via a cache datastructure via at least one processor, a second visualization using the retrieved CI datapoint values, the second visualization configured to display a second set of metrics, for the second set of utilized allowable response question identifiers associated with the selected category identifier, for each selected entity segment identifier.

131. A cognitive intelligence visualization engine processor-implemented process, comprising executing processor-executable instructions to:
obtain, via at least one processor, a category identifier selection via a category selection interaction interface mechanism;
obtain, via at least one processor, a first entity segment identifier selection via a first entity segment selection interaction interface mechanism;
obtain, via at least one processor, a second entity segment identifier selection via a second entity segment selection interaction interface mechanism;
determine, via at least one processor, a set of visualization cognitive intelligence (CI) datapoint identifiers, the set of visualization CI datapoint identifiers configured to include CI datapoint identifiers associated with each combination of: a selected entity segment identifier and the selected category identifier;
retrieve, via at least one processor, for each CI datapoint identifier in the set of visualization CI datapoint identifiers, a CI datapoint value corresponding to the respective CI datapoint identifier from a NoSQL database via a cache datastructure, the NoSQL database configured to act as cache for generating visualizations based on metrics calculated using survey data, a cache datastructure configured as a key-value pair comprising an associated CI datapoint identifier and a CI datapoint value corresponding to the associated CI datapoint identifier;
generate, via a cache datastructure via at least one processor, a visualization using the retrieved CI datapoint values, the visualization configured to display a set of metrics, for a set of utilized allowable response question identifiers associated with the selected category identifier, for each selected entity segment identifier.

132. The process of embodiment 131, further, comprising:
a category identifier is configured to identify a user interface section.

133. The process of embodiment 131, further, comprising:
an entity segment identifier is configured to identify an entity comprising any of: person, item of manufacture, service, asset, brand, ad, category of manufacture, category of service, category of person, demographic, sentiment.

134. The process of embodiment 131, further, comprising:
the processor-executable instructions configured to:
obtain, via at least one processor, a third entity segment identifier selection via a third entity segment selection interaction interface mechanism.

135. The process of embodiment 131, further, comprising:
a CI datapoint identifier is configured to comprise an entity segment identifier and a category identifier.

136. The process of embodiment 135, further, comprising:
a CI datapoint value is configured as a datastructure comprising a set of module datastructures, each module datastructure corresponding to a module identifier associated with the category identifier specified as part of the associated CI datapoint identifier, each module datastructure comprising a set of metric datastructures, each metric datastructure corresponding to a set of calculated metrics, for an allowable response question identifier associated with the respective module datastructure's module identifier, for an entity segment identifier specified as part of the associated CI datapoint identifier.

137. The process of embodiment 136, further, comprising:
a CI datapoint value is configured to be stored in the NoSQL database in JSON format.

138. The process of embodiment 131, further, comprising:
the survey data is configured to comprise any of: ambient social, consumer interaction, point of sale, third party, internet of things, and internal survey data.

139. The process of embodiment 131, further, comprising:
the processor-executable instructions configured to:
determine, via at least one processor, a set of module identifiers associated with the selected category identifier;

obtain, via at least one processor, a module identifier selection via a module selection interaction interface mechanism, the module selection interaction interface mechanism configured to facilitate selection of a module identifier from the set of module identifiers associated with the selected category identifier; and determine, via at least one processor, the set of utilized allowable response question identifiers as a set of allowable response question identifiers associated with the selected module identifier.

140. The process of embodiment 139, further, comprising: the processor-executable instructions configured to:

obtain, via at least one processor, a second module identifier selection via the module selection interaction interface mechanism;

determine, via at least one processor, a second set of utilized allowable response question identifiers as a set of allowable response question identifiers associated with the selected second module identifier; and generate, via a cache datastructure via at least one processor, a second visualization using the retrieved CI datapoint values, the second visualization configured to display a second set of metrics, for the second set of utilized allowable response question identifiers associated with the selected category identifier, for each selected entity segment identifier.

201. A cache datastructure generating apparatus, comprising:

a memory;

a component collection in the memory;

a processor disposed in communication with the memory and configured to issue a plurality of processor-executable instructions from the component collection, the processor-executable instructions configured to:

generate, via at least one processor, a cognitive intelligence (CI) datapoint identifier cache datastructure, the CI datapoint identifier cache datastructure configured to comprise a category identifier and an entity segment identifier;

generate, via at least one processor, a CI datapoint value cache datastructure, the CI datapoint value cache datastructure configured to comprise a set of module datastructures, each module datastructure corresponding to a module identifier associated with the category identifier specified in the CI datapoint identifier cache datastructure, each module datastructure comprising a set of metric datastructures, each metric datastructure corresponding to a set of calculated metrics, for an allowable response question identifier associated with the respective module datastructure's module identifier, for the entity segment identifier specified in the CI datapoint identifier cache datastructure; and store, via at least one processor, the generated CI datapoint identifier cache datastructure and the generated CI datapoint value cache datastructure as a key-value pair.

202. The apparatus of embodiment 201, further, comprising: the category identifier is configured to identify a user interface section.

203. The apparatus of embodiment 201, further, comprising: the entity segment identifier is configured to identify an entity comprising any of: person, item of manufacture, service, asset, brand, ad, category of manufacture, category of service, category of person, demographic, sentiment.

204. The apparatus of embodiment 201, further, comprising: each calculated metric is configured to be calculated using survey data associated with the entity segment identifier specified in the CI datapoint identifier cache datastructure.

205. The apparatus of embodiment 204, further, comprising: the survey data is configured to comprise any of: ambient social, consumer interaction, point of sale, third party, internet of things, and internal survey data.

206. The apparatus of embodiment 201, further, comprising: each metric datastructure is configured to comprise an allowable response question identifier associated with the respective metric datastructure.

207. The apparatus of embodiment 206, further, comprising: each metric datastructure is configured to comprise a display name corresponding to the allowable response question identifier associated with the respective metric datastructure.

208. The apparatus of embodiment 201, further, comprising: the generated CI datapoint identifier cache datastructure and the generated CI datapoint value cache datastructure are configured to be stored in a key-value database.

209. The apparatus of embodiment 208, further, comprising: the key-value database is configured as a NoSQL database.

210. The apparatus of embodiment 201, further, comprising: the generated CI datapoint identifier cache datastructure and the generated CI datapoint value cache datastructure are configured to be stored in JSON format.

211. A cache datastructure generating processor-readable, non-transient medium, comprising processor-executable instructions configured to:

generate, via at least one processor, a cognitive intelligence (CI) datapoint identifier cache datastructure, the CI datapoint identifier cache datastructure configured to comprise a category identifier and an entity segment identifier;

generate, via at least one processor, a CI datapoint value cache datastructure, the CI datapoint value cache datastructure configured to comprise a set of module datastructures, each module datastructure corresponding to a module identifier associated with the category identifier specified in the CI datapoint identifier cache datastructure, each module datastructure comprising a set of metric datastructures, each metric datastructure corresponding to a set of calculated metrics, for an allowable response question identifier associated with the respective module datastructure's module identifier, for the entity segment identifier specified in the CI datapoint identifier cache datastructure; and store, via at least one processor, the generated CI datapoint identifier cache datastructure and the generated CI datapoint value cache datastructure as a key-value pair.

212. The medium of embodiment 211, further, comprising: the category identifier is configured to identify a user interface section.

213. The medium of embodiment 211, further, comprising: the entity segment identifier is configured to identify an entity comprising any of: person, item of manufacture, service, asset, brand, ad, category of manufacture, category of service, category of person, demographic, sentiment.

214. The medium of embodiment 211, further, comprising: each calculated metric is configured to be calculated using survey data associated with the entity segment identifier specified in the CI datapoint identifier cache datastructure.

49

215. The medium of embodiment 214, further, comprising:
the survey data is configured to comprise any of: ambient social, consumer interaction, point of sale, third party, internet of things, and internal survey data.
216. The medium of embodiment 211, further, comprising:
each metric datastructure is configured to comprise an allowable response question identifier associated with the respective metric datastructure.
217. The medium of embodiment 216, further, comprising:
each metric datastructure is configured to comprise a display name corresponding to the allowable response question identifier associated with the respective metric datastructure.
218. The medium of embodiment 211, further, comprising:
the generated CI datapoint identifier cache datastructure and the generated CI datapoint value cache datastructure are configured to be stored in a key-value database.
219. The medium of embodiment 218, further, comprising:
the key-value database is configured as a NoSQL database.
220. The medium of embodiment 211, further, comprising:
the generated CI datapoint identifier cache datastructure and the generated CI datapoint value cache datastructure are configured to be stored in JSON format.
221. A cache datastructure generating processor-implemented system, comprising: means to process processor-executable instructions;
means to issue processor-issuable instructions from a processor-executable component collection via the means to process processor-executable instructions, the processor-issuable instructions configured to:
generate, via at least one processor, a cognitive intelligence (CI) datapoint identifier cache datastructure, the CI datapoint identifier cache datastructure configured to comprise a category identifier and an entity segment identifier;
generate, via at least one processor, a CI datapoint value cache datastructure, the CI datapoint value cache datastructure configured to comprise a set of module datastructures, each module datastructure corresponding to a module identifier associated with the category identifier specified in the CI datapoint identifier cache datastructure, each module datastructure comprising a set of metric datastructures, each metric datastructure corresponding to a set of calculated metrics, for an allowable response question identifier associated with the respective module datastructure's module identifier, for the entity segment identifier specified in the CI datapoint identifier cache datastructure; and
store, via at least one processor, the generated CI datapoint identifier cache datastructure and the generated CI datapoint value cache datastructure as a key-value pair.
222. The system of embodiment 221, further, comprising:
the category identifier is configured to identify a user interface section.
223. The system of embodiment 221, further, comprising:
the entity segment identifier is configured to identify an entity comprising any of: person, item of manufacture, service, asset, brand, ad, category of manufacture, category of service, category of person, demographic, sentiment.
224. The system of embodiment 221, further, comprising:
each calculated metric is configured to be calculated using survey data associated with the entity segment identifier specified in the CI datapoint identifier cache datastructure.
225. The system of embodiment 224, further, comprising:

50 the survey data is configured to comprise any of: ambient social, consumer interaction, point of sale, third party, internet of things, and internal survey data.
226. The system of embodiment 221, further, comprising:
each metric datastructure is configured to comprise an allowable response question identifier associated with the respective metric datastructure.
227. The system of embodiment 226, further, comprising:
each metric datastructure is configured to comprise a display name corresponding to the allowable response question identifier associated with the respective metric datastructure.
228. The system of embodiment 221, further, comprising:
the generated CI datapoint identifier cache datastructure and the generated CI datapoint value cache datastructure are configured to be stored in a key-value database.
229. The system of embodiment 228, further, comprising:
the key-value database is configured as a NoSQL database.
230. The system of embodiment 221, further, comprising:
the generated CI datapoint identifier cache datastructure and the generated CI datapoint value cache datastructure are configured to be stored in JSON format.
231. A cache datastructure generating processor-implemented process, comprising executing processor-executable instructions to:
generate, via at least one processor, a cognitive intelligence (CI) datapoint identifier cache datastructure, the CI datapoint identifier cache datastructure configured to comprise a category identifier and an entity segment identifier;
generate, via at least one processor, a CI datapoint value cache datastructure, the CI datapoint value cache datastructure configured to comprise a set of module datastructures, each module datastructure corresponding to a module identifier associated with the category identifier specified in the CI datapoint identifier cache datastructure, each module datastructure comprising a set of metric datastructures, each metric datastructure corresponding to a set of calculated metrics, for an allowable response question identifier associated with the respective module datastructure's module identifier, for the entity segment identifier specified in the CI datapoint identifier cache datastructure; and
store, via at least one processor, the generated CI datapoint identifier cache datastructure and the generated CI datapoint value cache datastructure as a key-value pair.
232. The process of embodiment 231, further, comprising:
the category identifier is configured to identify a user interface section.
233. The process of embodiment 231, further, comprising:
the entity segment identifier is configured to identify an entity comprising any of: person, item of manufacture, service, asset, brand, ad, category of manufacture, category of service, category of person, demographic, sentiment.
234. The process of embodiment 231, further, comprising:
each calculated metric is configured to be calculated using survey data associated with the entity segment identifier specified in the CI datapoint identifier cache datastructure.
235. The process of embodiment 234, further, comprising:
the survey data is configured to comprise any of: ambient social, consumer interaction, point of sale, third party, internet of things, and internal survey data.
236. The process of embodiment 231, further, comprising:

each metric datastructure is configured to comprise an allowable response question identifier associated with the respective metric datastructure.
237. The process of embodiment 236, further, comprising:
each metric datastructure is configured to comprise a display name corresponding to the allowable response question identifier associated with the respective metric datastructure.
238. The process of embodiment 231, further, comprising:
the generated CI datapoint identifier cache datastructure and the generated CI datapoint value cache datastructure are configured to be stored in a key-value database.
239. The process of embodiment 238, further, comprising:
the key-value database is configured as a NoSQL database.
240. The process of embodiment 231, further, comprising:
the generated CI datapoint identifier cache datastructure and the generated CI datapoint value cache datastructure are configured to be stored in JSON format.
301. An machine learning data and user interface matching engine apparatus, comprising:
a memory;
a component collection in the memory:
a processor disposed in communication with the memory, and configured to issue a plurality of processing instructions from the component collection, to:
  obtain ambient transaction data, wherein the ambient transaction data includes any of: ambient social, consumer interaction, point of sale, third party, internet of things, and internal data transaction data,
  process the obtained ambient transaction data with a cognitive data engine component, wherein the cognitive data engine component is configured to employ machine learning to discern different types of data and trends for each of the discerned types of data;
  discern unique entity identifiers from the cognitive data engine component processing, wherein the unique entity identifiers may include any of: person, item of manufacture, service, asset, brand, ad, category of manufacture, category of service, category of person, demographic, sentiment;
  generate user interface handlers for the discerned unique entity identifiers;
  process the obtained ambient transaction data relative to the unique entity identifiers, wherein the processing configures the obtained ambient transaction data and unique entity identifiers, and relationships between the ambient transaction data, unique entity identifiers such that selection of one provides linkages and alternative displays for the relationship and related data, and wherein configuration for display in the generated user interface handlers;
  provide the obtained ambient transaction data relative to the unique entity identifiers to the generated user interface handlers;
  obtain selections via the generated user interface handlers;
  generate predictive ambient transaction data per each selection made with regard to each discerned unique entity identifier;
  instantiate trend triggers for each discerned unique entity identifier.
302. The apparatus of embodiment 301, further, comprising:
  trigger trend triggers when a specified threshold for a trigger has been met.
303. The apparatus of embodiment 301, wherein the instantiated trend triggers are used to determine a project allocation on any of: time, cost, ambient conditions.
304. An ambient cognitive intelligence data engine apparatus, comprising:
a memory;
a component collection in the memory:
a processor disposed in communication with the memory, and configured to issue a plurality of processing instructions from the component collection, to:
  obtain ambient social, consumer interaction, point of sale, third party, internet of things, and internal data transaction data,
  process the obtained ambient transaction data to a cognitive data engine component; discern unique entity identifiers from the cognitive data engine component processing; process the obtained ambient transaction data relative to the unique entity identifiers; generate predictive ambient transaction data per each discerned unique entity identifier; instantiate trend triggers for each discerned unique entity identifier;
  trigger trend triggers when a specified threshold for a trigger has been met.

MLUI Controller

FIG. 51 shows a block diagram illustrating embodiments of a MLUI controller. In this embodiment, the MLUI controller 5101 may serve to aggregate, process, store, search, serve, identify, instruct, generate, match, and/or facilitate interactions with a computer through database systems technologies, and/or other related data.

Users, which may be people and/or other systems, may engage information technology systems (e.g., computers) to facilitate information processing. In turn, computers employ processors to process information; such processors 5103 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 5129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the MLUI controller 5101 may be connected to and/or communicate with entities such as, but not limited to: one or more users from peripheral devices 5112 (e.g., user input devices 5111); an optional cryptographic processor device 5128; and/or a communications network 5113.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The MLUI controller 5101 may be based on computer systems that may comprise, but are not limited to, components such as: a computer systemization 5102 connected to memory 5129.

Computer Systemization

A computer systemization 5102 may comprise a clock 5130, central processing unit ("CPU(s)" and/or "processor(s)" (these terms are used interchangeably throughout the disclosure unless noted to the contrary)) 5103, a memory 5129 (e.g., a read only memory (ROM) 5106, a random access memory (RAM) 5105, etc.), and/or an interface bus 5107, and most frequently, although not necessarily, are all interconnected and/or communicating through a system bus 5104 on one or more (mother)board(s) 5102 having conductive and/or otherwise transportive circuit pathways through which instructions (e.g., binary encoded signals) may travel to effectuate communications, operations, storage, etc. The computer systemization may be connected to a power source 5186; e.g., optionally the power source may be internal. Optionally, a cryptographic processor 5126 may be connected to the system bus. In another embodiment, the cryptographic processor, transceivers (e.g., ICs) 5174, and/or sensor array (e.g., accelerometer, altimeter, ambient light, barometer, global positioning system (GPS) (thereby allowing MLUI controller to determine its location), gyroscope, magnetometer, pedometer, proximity, ultra-violet sensor, etc.) 5173 may be connected as either internal and/or external peripheral devices 5112 via the interface bus I/O 5108 (not pictured) and/or directly via the interface bus 5107. In turn, the transceivers may be connected to antenna(s) 5175, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n, Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 5129 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ABM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, i7, i9, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the MLUI controller and beyond through various interfaces. Should processing requirements dictate a greater amount speed and/or capacity, distributed processors (e.g., see Distributed MLUI below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the MLUI may be achieved by implementing a microcontroller such as CAST's® R8051XC2 microcontroller; Intel's® MCS 51 (i.e., 8051 microcontroller); and/or the like. Also, to implement certain features of the MLUI, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the MLUI component collection (distributed or otherwise) and/or features may be implemented via the microprocessor and/or via embedded components; e.g., via ASIC, coprocessor, DSP, FPGA, and/or the like. Alternately, some implementations of the MLUI may be implemented with embedded components that are configured and used to achieve a variety of features or signal processing.

Depending on the particular implementation, the embedded components may include software solutions, hardware solutions, and/or some combination of both hardware/software solutions. For example, MLUI features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the MLUI features. A hierarchy of programmable interconnects allow logic blocks to be interconnected as needed by the MLUI system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the MLUI may be developed on FPGAs and then migrated into a fixed version that more resembles ASIC implementations. Alternate or coordinating implementations may migrate MLUI controller features to a final ASIC instead of or in addition to FPGAs. Depending on the implementation all of the aforementioned embedded components and microprocessors may be considered the "CPU" and/or "processor" for the MLUI.

Power Source

The power source 5186 may be of any various form for powering small electronic circuit board devices such as the following power cells alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 5186 is connected to at least one of the interconnected subsequent components of the MLUI thereby providing an electric current to all subsequent components. In one example, the power source 5186 is connected to the system bus component 5104. In an alternative embodiment, an outside power source 5186 is provided through a connection across the I/O 5108 interface. For example, Ethernet (with power on Ethernet), IEEE 1394, USB and/or the like connections carry both data and power across the connection and is therefore a suitable source of power.

Interface Adapters

Interface bus(ses) 5107 may accept, connect, and/or communicate to a number of interface adapters, variously although not necessarily in the form of adapter cards, such as but not limited to: input output interfaces (I/O) 5108, storage interfaces 5109, network interfaces 5110, and/or the like. Optionally, cryptographic processor interfaces 5127 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 5109 may accept, communicate, and/or connect to a number of storage devices such as, but not limited to: (removable) storage devices 5114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 5110 may accept, communicate, and/or connect to a communications network 5113. Through a communications network 5113, the MLUI controller is accessible through remote clients 5133*b* (e.g., computers with web browsers) by users 5133*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed MLUI below), architectures may similarly be employed to pool, load balance, and/or otherwise decrease/increase the communicative bandwidth required by the MLUI controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 5110 may be used to engage with various communications network types 5113. For example, multiple network interfaces may be employed to allow for the communication over broadcast, multicast, and/or unicast networks.

Input Output interfaces (I/O) 5108 may accept, communicate, and/or connect to user, peripheral devices 5112 (e.g., input devices 5111), cryptographic processor devices 5128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc.; displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 5112 may be connected and/or communicate to I/O and/or other facilities of the like such as network interfaces, storage interfaces, directly to the interface bus, system bus, the CPU, and/or the like. Peripheral devices may be external, internal and/or part of the MLUI controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 5111 often are a type of peripheral device 512 (see above) and may include: card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), touch screens (e.g., capacitive, resistive, etc.), trackballs, trackpads, styluses, and/or the like.

It should be noted that although user input devices and peripheral devices may be employed, the MLUI controller may be embodied as an embedded, dedicated, and/or monitor-less (i.e., headless) device, and access may be provided over a network interface connection.

Cryptographic units such as, but not limited to, microcontrollers, processors 5126, interfaces 5127, and/or devices 5128 may be attached, and/or communicate with the MLUI controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® CryptoNetX and other Security Processors; nCipher's® nShield; SafeNet's Luna PCI (e.g., 7100) series; Semaphore Communications'® 40 MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 5129. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the MLUI controller and/or a computer systemization may employ various forms of memory 5129. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 5129 will include ROM 5106, RAM 5105, and a storage device 5114. A storage device 5114 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 5129 may contain a collection of application/library/program and/or database components and/or data such as, but not limited to: operating system component(s) 5115 (operating system); information server component(s) 5116 (information server); user interface component(s) 5117 (user interface); Web browser component(s) 5118 (Web browser); database(s) 5119; mail server component(s) 5121; mail client component(s) 5122; cryptographic server component(s) 5120 (cryptographic server); the MLUI component(s) 5135 (e.g., which may include Multi-dimensional user interface segment, machine learning aggregator, ambient data aggregator, SDI, CIDU, CIQV 5141-5143, and/or the like components); and/or the like (i.e., collectively a component collection). These components may be stored and accessed from the storage devices and/or from storage devices accessible through an interface bus. Although unconventional program components such as those in the component collection may be stored in a local storage device 5114, they may also be loaded and/or stored in memory such as: cache, peripheral devices, processor registers, RAM, remote storage facilities through a communications network, ROM, various forms of memory, and/or the like.

Operating System

The operating system component 5115 is an executable program component facilitating the operation of the MLUI controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millenium/Mobile/NT/Vista/XP (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the MLUI controller to communicate with other entities through a communications network 5113. Various communication protocols may be used by the MLUI controller as a subcarrier transport mechanism for interaction, such as, but not limited to: multicast, TCP/IP, UDP, unicast, and/or the like.

Information Server

An information server component 5116 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C#and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); HyperText Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the MLUI controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the MLUI database 5119, operating systems, other program components, user interfaces, Web browsers, and/or the like.

Access to the MLUI database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the MLUI. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the MLUI as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 5117 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 5118 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the MLUI enabled nodes. The combined application may be nugatory on systems employing Web browsers.

Mail Server

A mail server component 5121 is a stored program component that is executed by a CPU 5103. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C#and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the MLUI. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the MLUI mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 5122 is a stored program component that is executed by a CPU 5103. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 5120 is a stored program component that is executed by a CPU 5103, cryptographic processor 5126, cryptographic processor interface 5127, cryptographic processor device 5128, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the MLUI may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the MLUI component to engage in secure transactions if so desired. The cryptographic component facilitates the secure accessing of resources on the MLUI and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The MLUI Database

The MLUI database component 5119 may be embodied in a database and its stored data. The database is a stored program component, which is executed by the CPU; the stored program component portion configuring the CPU to process the stored data. The database may be a fault tolerant, relational, scalable, secure database such as Claris FileMaker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the MLUI database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the MLUI database is implemented as a data-structure, the use of the MLUI database 5119 may be integrated into another component such as the MLUI component 5135. Also, the database may be implemented as a mix of data structures, objects, programs, relational structures, scripts, and/or the like. Databases may be consolidated and/or distributed in countless variations (e.g., see Distributed MLUI below). Portions of databases, e.g., tables, may be exported and/or imported and thus decentralized and/or integrated.

In one embodiment, the database component 5119 includes several tables 5119a-z:

An accounts table 5119a includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAcces sPrivileges, accountPreferences, accountRestrictions, and/or the like;

A users table 5119b includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a MLUI);

An devices table 5119c includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceVersion, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 5119d includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 5119e includes fields such as, but not limited to: assetID, accountID, userID, distributorAccountID, distributorPaymentID, distributorOnwerID, as setOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 5119f includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 5119g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 5119h includes fields such as, but not limited to: merchantID, merchantTaxID, merchanteName, merchantContactUserID, accountID, issuerID, acquirerID, merchantEmail, merchantAddress, merchantState, merchantZlPcode, merchantCountry, merchantAuthKey, merchantIPaddress, portNum, merchantURLaccessCode, merchantPortNo, merchantAcces sPrivileges, merchantPreferences, merchantRestrictions, and/or the like;

An ads table 5119i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

A surveys table 5119j includes fields such as, but not limited to: surveyID, surveyRespondentID, surveyAllowableResponseQuestionID, surveyResponse, and/or the like;

A cognitive intelligence datapoints table 5119k includes fields such as, but not limited to: CI_DatapointID, CI_DatapointValue, and/or the like;

A market_data table 5119z includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US Equity Trade And Quote Market Data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the MLUI database may interact with other database systems. For example, employing a distributed database system, queries and data access by search MLUI component may treat the combination of the MLUI database, an integrated data security layer database as a single database entity (e.g., see Distributed MLUI below).

In one embodiment, user programs may contain various user interface primitives, which may serve to update the MLUI. Also, various accounts may require custom database tables depending upon the environments and the types of clients the MLUI may need to serve. It should be noted that any unique fields may be designated as a key field throughout. In an alternative embodiment, these tables have been decentralized into their own databases and their respective database controllers (i.e., individual database controllers for each of the above tables). The MLUI may also be configured to distribute the databases over several computer systemizations and/or storage devices. Similarly, configurations of the decentralized database controllers may be varied by consolidating and/or distributing the various database components 5119a-z. The MLUI may be configured to keep track of various settings, inputs, and parameters via database controllers.

The MLUI database may communicate to and/or with other components in a component collection, including itself, and/or facilities of the like. Most frequently, the MLUI database communicates with the MLUI component, other program components, and/or the like. The database may contain, retain, and provide information regarding other nodes and data.

The MLUIs

The MLUI component 5135 is a stored program component that is executed by a CPU. In one embodiment, the MLUI component incorporates any and/or all combinations of the aspects of the MLUI that were discussed in the previous figures. As such, the MLUI affects accessing, obtaining and the provision of information, services, transactions, and/or the like across various communications networks. The features and embodiments of the MLUI discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the MLUI's features and facilities, and in many cases reduce the costs, energy consumption/requirements, and extend the life of MLUI's underlying infrastructure; this has the added benefit of making the MLUI more reliable. Similarly, many of the features and mechanisms are designed to be easier for users to use and access, thereby broadening the audience that may enjoy/employ and exploit the feature sets of the MLUI; such ease of use also helps to increase the reliability of the MLUI. In addition, the feature sets include heightened security as noted via the Cryptographic components 5120, 5126, 5128 and throughout, making access to the features and data more reliable and secure The MLUI transforms ambient condition data, sales data, user interface selections, cognitive intelligence question input inputs, via MLUI components (e.g., Multi-dimensional user interface segment, machine learning aggregator, ambient data aggregator, SDI, CIDU, CIQV), into project projections, campaigns, user interface visualizations, cognitive intelligence question output outputs.

The MLUI component facilitates access of information between nodes may be developed by employing various development tools and languages such as, but not limited to: Apache® components, Assembly, ActiveX, binary executables, (ANSI) (Objective-) C (++), C#and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the MLUI server employs a cryptographic server to encrypt and decrypt communications. The MLUI component may communicate to and/or with other components in a component collection, including itself, and/or facilities of the like. Most frequently, the MLUI component communicates with the MLUI database, operating systems, other program components, and/or the like. The MLUI may contain, communicate, generate, obtain, and/or provide program component, system, user, and/or data communications, requests, and/or responses.

Distributed MLUIs

The structure and/or operation of any of the MLUI node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the MLUI controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for MLUI controller and/or MLUI component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the MLUI controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
    $input=" "
    $input=socket_read($client, 1024);
    $data .=$input;
} while($input !=" ")
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Multidimensional Machine Learning Data and User Interface Segment Tagging Engine Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a MLUI individual and/or enterprise user, database configuration and/or relational model, data type, data transmission and/or network framework, library, syntax structure, and/or the like, various embodiments of the MLUI, may be implemented that allow a great deal of flexibility and customization. For example, aspects of the MLUI may be adapted for inventory, online retail, securities, social, etc. While various embodiments and discussions of the MLUI have included database systems, however, it is to be understood that the embodiments described herein may be readily configured and/or customized for a wide variety of other applications and/or implementations.

What is claimed is:

1. A cognitive intelligence visualization engine apparatus, comprising:
   a memory;
   a component collection in the memory;
   a processor disposed in communication with the memory and configured to issue a plurality of processor-executable instructions from the component collection, the processor-executable instructions configured to:
      obtain, via at least one processor, a category identifier selection via a category selection interaction interface mechanism;
      obtain, via at least one processor, a first entity segment identifier selection via a first entity segment selection interaction interface mechanism;
      obtain, via at least one processor, a second entity segment identifier selection via a second entity segment selection interaction interface mechanism;
      determine, via at least one processor, a set of visualization cognitive intelligence (CI) datapoint identifiers, the set of visualization CI datapoint identifiers configured to include CI datapoint identifiers associated with each combination of: a selected entity segment identifier and the selected category identifier;
      retrieve, via at least one processor, for each CI datapoint identifier in the set of visualization CI datapoint identifiers, a CI datapoint value corresponding to the respective CI datapoint identifier from a NoSQL database via a cache datastructure, the NoSQL database configured to act as cache for generating visualizations based on metrics calculated using survey data, a cache datastructure configured as a key-value pair comprising an associated CI datapoint identifier and a CI datapoint value corresponding to the associated CI datapoint identifier;

generate, via a cache datastructure via at least one processor, a visualization using the retrieved CI datapoint values, the visualization configured to display a set of metrics, for a set of utilized allowable response question identifiers associated with the selected category identifier, for each selected entity segment identifier.

2. The apparatus of claim 1, further, comprising:
a category identifier is configured to identify a user interface section.

3. The apparatus of claim 1, further, comprising:
an entity segment identifier is configured to identify an entity comprising any of: person, item of manufacture, service, asset, brand, ad, category of manufacture, category of service, category of person, demographic, sentiment.

4. The apparatus of claim 1, further, comprising:
the processor-executable instructions configured to:
obtain, via at least one processor, a third entity segment identifier selection via a third entity segment selection interaction interface mechanism.

5. The apparatus of claim 1, further, comprising:
a CI datapoint identifier is configured to comprise an entity segment identifier and a category identifier.

6. The apparatus of claim 5, further, comprising:
a CI datapoint value is configured as a datastructure comprising a set of module datastructures, each module datastructure corresponding to a module identifier associated with the category identifier specified as part of the associated CI datapoint identifier, each module datastructure comprising a set of metric datastructures, each metric datastructure corresponding to a set of calculated metrics, for an allowable response question identifier associated with the respective module datastructure's module identifier, for an entity segment identifier specified as part of the associated CI datapoint identifier.

7. The apparatus of claim 6, further, comprising:
a CI datapoint value is configured to be stored in the NoSQL database in JSON format.

8. The apparatus of claim 1, further, comprising:
the survey data is configured to comprise any of: ambient social, consumer interaction, point of sale, third party, internet of things, and internal survey data.

9. The apparatus of claim 1, further, comprising:
the processor-executable instructions configured to:
determine, via at least one processor, a set of module identifiers associated with the selected category identifier;
obtain, via at least one processor, a module identifier selection via a module selection interaction interface mechanism, the module selection interaction interface mechanism configured to facilitate selection of a module identifier from the set of module identifiers associated with the selected category identifier; and
determine, via at least one processor, the set of utilized allowable response question identifiers as a set of allowable response question identifiers associated with the selected module identifier.

10. The apparatus of claim 9, further, comprising:
the processor-executable instructions configured to:
obtain, via at least one processor, a second module identifier selection via the module selection interaction interface mechanism;
determine, via at least one processor, a second set of utilized allowable response question identifiers as a set of allowable response question identifiers associated with the selected second module identifier; and
generate, via a cache datastructure via at least one processor, a second visualization using the retrieved CI datapoint values, the second visualization configured to display a second set of metrics, for the second set of utilized allowable response question identifiers associated with the selected category identifier, for each selected entity segment identifier.

11. A cognitive intelligence visualization engine processor-readable, non-transient medium, comprising processor-executable instructions configured to:
obtain, via at least one processor, a category identifier selection via a category selection interaction interface mechanism;
obtain, via at least one processor, a first entity segment identifier selection via a first entity segment selection interaction interface mechanism;
obtain, via at least one processor, a second entity segment identifier selection via a second entity segment selection interaction interface mechanism;
determine, via at least one processor, a set of visualization cognitive intelligence (CI) datapoint identifiers, the set of visualization CI datapoint identifiers configured to include CI datapoint identifiers associated with each combination of: a selected entity segment identifier and the selected category identifier;
retrieve, via at least one processor, for each CI datapoint identifier in the set of visualization CI datapoint identifiers, a CI datapoint value corresponding to the respective CI datapoint identifier from a NoSQL database via a cache datastructure, the NoSQL database configured to act as cache for generating visualizations based on metrics calculated using survey data, a cache datastructure configured as a key-value pair comprising an associated CI datapoint identifier and a CI datapoint value corresponding to the associated CI datapoint identifier;
generate, via a cache datastructure via at least one processor, a visualization using the retrieved CI datapoint values, the visualization configured to display a set of metrics, for a set of utilized allowable response question identifiers associated with the selected category identifier, for each selected entity segment identifier.

12. A cognitive intelligence visualization engine processor-implemented system, comprising:
means to process processor-executable instructions;
means to issue processor-issuable instructions from a processor-executable component collection via the means to process processor-executable instructions, the processor-issuable instructions configured to:
obtain, via at least one processor, a category identifier selection via a category selection interaction interface mechanism;
obtain, via at least one processor, a first entity segment identifier selection via a first entity segment selection interaction interface mechanism;

obtain, via at least one processor, a second entity segment identifier selection via a second entity segment selection interaction interface mechanism;

determine, via at least one processor, a set of visualization cognitive intelligence (CI) datapoint identifiers, the set of visualization CI datapoint identifiers configured to include CI datapoint identifiers associated with each combination of: a selected entity segment identifier and the selected category identifier;

retrieve, via at least one processor, for each CI datapoint identifier in the set of visualization CI datapoint identifiers, a CI datapoint value corresponding to the respective CI datapoint identifier from a NoSQL database via a cache datastructure, the NoSQL database configured to act as cache for generating visualizations based on metrics calculated using survey data, a cache datastructure configured as a key-value pair comprising an associated CI datapoint identifier and a CI datapoint value corresponding to the associated CI datapoint identifier;

generate, via a cache datastructure via at least one processor, a visualization using the retrieved CI datapoint values, the visualization configured to display a set of metrics, for a set of utilized allowable response question identifiers associated with the selected category identifier, for each selected entity segment identifier.

13. A cognitive intelligence visualization engine processor-implemented process, comprising executing processor-executable instructions to:

obtain, via at least one processor, a category identifier selection via a category selection interaction interface mechanism;

obtain, via at least one processor, a first entity segment identifier selection via a first entity segment selection interaction interface mechanism;

obtain, via at least one processor, a second entity segment identifier selection via a second entity segment selection interaction interface mechanism;

determine, via at least one processor, a set of visualization cognitive intelligence (CI) datapoint identifiers, the set of visualization CI datapoint identifiers configured to include CI datapoint identifiers associated with each combination of: a selected entity segment identifier and the selected category identifier;

retrieve, via at least one processor, for each CI datapoint identifier in the set of visualization CI datapoint identifiers, a CI datapoint value corresponding to the respective CI datapoint identifier from a NoSQL database via a cache datastructure, the NoSQL database configured to act as cache for generating visualizations based on metrics calculated using survey data, a cache datastructure configured as a key-value pair comprising an associated CI datapoint identifier and a CI datapoint value corresponding to the associated CI datapoint identifier;

generate, via a cache datastructure via at least one processor, a visualization using the retrieved CI datapoint values, the visualization configured to display a set of metrics, for a set of utilized allowable response question identifiers associated with the selected category identifier, for each selected entity segment identifier.

* * * * *